United States Patent
Baek et al.

(10) Patent No.: US 11,259,150 B2
(45) Date of Patent: *Feb. 22, 2022

(54) METHOD AND APPARATUS FOR PERFORMING DIRECT COMMUNICATION WITH AT LEAST ONE OTHER USER EQUIPMENT

(71) Applicant: Samsung Electronics Co., Ltd., Gyeonggi-do (KR)

(72) Inventors: Yun-Sun Baek, Gyeonggi-do (KR); Hyeon-Mok Ko, Gyeonggi-do (KR); Sung-Jin Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/895,699

(22) Filed: Jun. 8, 2020

(65) Prior Publication Data

US 2020/0344578 A1    Oct. 29, 2020

Related U.S. Application Data

(63) Continuation of application No. 15/752,113, filed as application No. PCT/KR2016/008946 on Aug. 12, 2016, now Pat. No. 10,681,505.

(Continued)

(51) Int. Cl.
*H04W 4/10* (2009.01)
*H04L 29/06* (2006.01)
(Continued)

(52) U.S. Cl.
CPC ............... *H04W 4/10* (2013.01); *H04L 12/18* (2013.01); *H04L 12/1822* (2013.01);
(Continued)

(58) Field of Classification Search
CPC .... H04W 4/10; H04W 76/18; H04L 65/4046; H04L 29/06
(Continued)

(56) References Cited

U.S. PATENT DOCUMENTS

| | | |
|---|---|---|
| 2005/0260988 A1 | 11/2005 | Kauppinen |
| 2005/0282551 A1 | 12/2005 | Tandai |

(Continued)

FOREIGN PATENT DOCUMENTS

| | | | | |
|---|---|---|---|---|
| EP | 2 849 406 | | 3/2015 | |
| EP | 2849406 A1 | * | 3/2015 | ......... H04L 65/4061 |

(Continued)

OTHER PUBLICATIONS

PCT/ISA/210 Search Report dated Nov. 17, 2016 issued on PCT/KR2016/008946 (pp. 8).

(Continued)

*Primary Examiner* — John J Lee
(74) *Attorney, Agent, or Firm* — The Farrell Law Firm, P.C.

(57) ABSTRACT

A method and an apparatus for performing direct communication with at least one other user equipment are provided. The method and apparatus comprises upon generation of an event requiring the direct communication, transmitting a floor request, monitoring whether a response to the floor request is received from at least one adjacent UE, if a response to the floor request is not received until the floor request is transmitted a predetermined number of times at a predetermined interval, determining that a transmission right for the direct communication is granted, and if it is determined that the transmission right is granted, transmitting a signal to the at least one other UE by the direct communication.

8 Claims, 21 Drawing Sheets

Related U.S. Application Data

(60) Provisional application No. 62/279,339, filed on Jan. 15, 2016, provisional application No. 62/275,541, filed on Jan. 6, 2016, provisional application No. 62/258,809, filed on Nov. 23, 2015, provisional application No. 62/241,856, filed on Oct. 15, 2015, provisional application No. 62/238,333, filed on Oct. 7, 2015, provisional application No. 62/235,873, filed on Oct. 1, 2015, provisional application No. 62/204,171, filed on Aug. 12, 2015.

(51) Int. Cl.
| | | |
|---|---|---|
| *H04L 9/40* | (2022.01) | |
| *H04W 72/00* | (2009.01) | |
| *H04L 12/18* | (2006.01) | |
| *H04W 12/08* | (2021.01) | |
| *H04W 76/18* | (2018.01) | |
| *H04W 76/14* | (2018.01) | |
| *H04L 65/403* | (2022.01) | |

(52) U.S. Cl.
CPC .......... *H04L 29/06* (2013.01); *H04L 65/4046* (2013.01); *H04W 12/08* (2013.01); *H04W 72/005* (2013.01); *H04W 76/14* (2018.02); *H04W 76/18* (2018.02)

(58) Field of Classification Search
USPC ... 455/452.1, 41.2, 41.3, 515, 517, 518, 520
See application file for complete search history.

(56) References Cited

U.S. PATENT DOCUMENTS

| | | |
|---|---|---|
| 2007/0143478 A1 | 6/2007 | LoGalbo et al. |
| 2008/0009281 A1 | 1/2008 | Sung et al. |
| 2015/0009865 A1* | 1/2015 | Sharma ................ H04L 65/403 370/277 |
| 2016/0113036 A1* | 4/2016 | Stephens ............... H04L 5/1469 370/312 |
| 2018/0092016 A1* | 3/2018 | Kim .................. H04W 36/0072 |

FOREIGN PATENT DOCUMENTS

| | | |
|---|---|---|
| KR | 101183328 | 9/2012 |
| WO | WO 2014/210185 | 12/2014 |

OTHER PUBLICATIONS

PCT/ISA/237 Written Opinion dated Nov. 17, 2016 issued on PCT/KR2016/008946 (pp. 6).
3GPP TR 23.779 V1.0.0 (Jun. 2015), 3rd Generation Partnership Project; Technical Specification Group Services and System Aspects; Study on Application.
Architecture to Support Mission Critical Push To Talk over LTE (MCPTT) Services (Release 13), Copyright 2014, 3GPP Organizational Partners.
(ARIB, ATIS, CCSA, ETSI, TTA, TTC), pp. 250.

* cited by examiner

METHOD AND APPARATUS FOR PERFORMING DIRECT COMMUNICATION WITH AT LEAST ONE OTHER USER EQUIPMENT

PRIORITY

This application is a Continuation of U.S. patent application Ser. No. 15/752,113, which was filed with the U.S. Patent and Trademark Office on Feb. 12, 2018, as a U.S. National Phase entry of International Application No. PCT/KR2016/008946, filed on Aug. 12, 2016, and claims priority to U.S. Provisional Patent Application Nos. 62/204,171, 62/235,873, 62/238,333, 62/241,856, 62/258,809, 62/275,541, and 62/279,339, filed on Aug. 12, 2015, Oct. 1, 2015, Oct. 7, 2015, Oct. 15, 2015, Nov. 23, 2015, Jan. 6, 2016, and Jan. 15, 2016, respectively, the content of each of which is incorporated herein by reference.

BACKGROUND OF THE INVENTION

1. Field of the Invention

The present disclosure relates schemes for floor control with media burst control protocol for device to device communication.

2. Description of the Related Art

A floor control message is disclosed. Floor control in a conference call, push to talk makes a lot of sense. A number of people are discussing a subject and politely ask for the floor each time they believe that they have something to say. Once they get an indication that the floor is available, they start to talk. A protocol candidate to be used for floor control are the Binary Floor Control Protocol (BFCP) specified in request for comment (RFC) 4582 (An update of RFC 4582 is ongoing in internet engineering task force (IETF) at the moment) and Media Burst Control Protocol (MBCP) specified in open mobile alliance (OMA) Push to Communicate for Public Safety (PCPS).

3rd generation partnership project (3GPP) has started studying to evolve existing networks to LTE (long term evolution)-based public safety solutions, which name is Public Safety LTE (PS-LTE). Public safety network provides communications for public safety services such as police, fire, ambulance, war, natural disaster, and so on. In general, public safety network is mainly used for mission critical text/voice/video communications among large number of users.

Mission Critical Push to Talk (MCPTT) service in PS-LTE is intended to support one-to-one and one-to-many voice/video communications, where each user has the ability to gain an access to the permission to talk in an arbitrated manner. That is, MCPTT is a walkie-talkie-like service and the user can gain the permission to talk by pressing the 'talk button' to start talking. Push-to-talk sessions are basically half-duplex communications: while one user speaks, the others should listen. Some floor control functionalities are required for controlling the talk permission.

In off-network case, the multicast manner is used as efficient communication way for floor control unlike in the on-network. In addition to the feature, a current speaking MCPTT client acts as a floor arbitrator like floor control server in on-network environment. This indicates that floor control manner is server-less without dedicated central server. For this reason, the floor control for off-network requires that the floor arbitrator is delegated to next talker when the current speaking MCPTT client completes speaking and another MCPTT client is waiting for floor. So, a good protocol to be used for floor control of off-network may satisfy these features.

MBCP is tailor made for mission critical applications and is focusing on allowing a participant to talk immediately. The use of real time control protocol (RTCP) allows the "floor control" session to be negotiated in the same speed as the media. No extra message for establishing a floor control session is needed. Further, including floor status message (taken, idle, etc.) in media is very convenient when media is broadcasted. BFCP is focusing on floor control for conference applications. The use of acknowledgement for each and every message in the unreliable mode also when media is broadcasted is not suitable.

SUMMARY

For the reasons above it is proposed to select MBCP as the base for the floor control protocol. However, MBCP is server-based floor control protocol and can't fully support the floor control on device to device communication. So, this invention proposes Server-less floor control supporting the resolution of race condition and floor arbitrator delegation.

According to an embodiment of the present disclosure, a method performed by a user equipment (UE) is provided, with the method including receiving, from an other UE included in a group call in which the UE is included, a first message for requesting permission for transmission; identifying that the permission for transmission is granted to the other UE in case that the UE does not transmit, to the other UE, a second message in response to the first message repeatedly transmitted, and the UE receives, from the other UE, a third message indicating that the permission for transmission is granted to the other UE; and receiving media data from the other UE.

According to another embodiment of the present disclosure, a user equipment (UE) is provided that includes a transceiver and a controller configured to receive, via the transceiver, from an other UE included in a group call in which the UE is included, a first message for requesting permission for transmission, identify that the permission for transmission is granted to the other UE in case that the UE does not transmit, via the transceiver, to the other UE, a second message in response to the first message repeatedly transmitted and the UE receives, via the transceiver, from the other UE, a third message indicating that the permission for transmission is granted to the other UE, and receive, via the transceiver, media data from the other UE.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION

Figure 1:
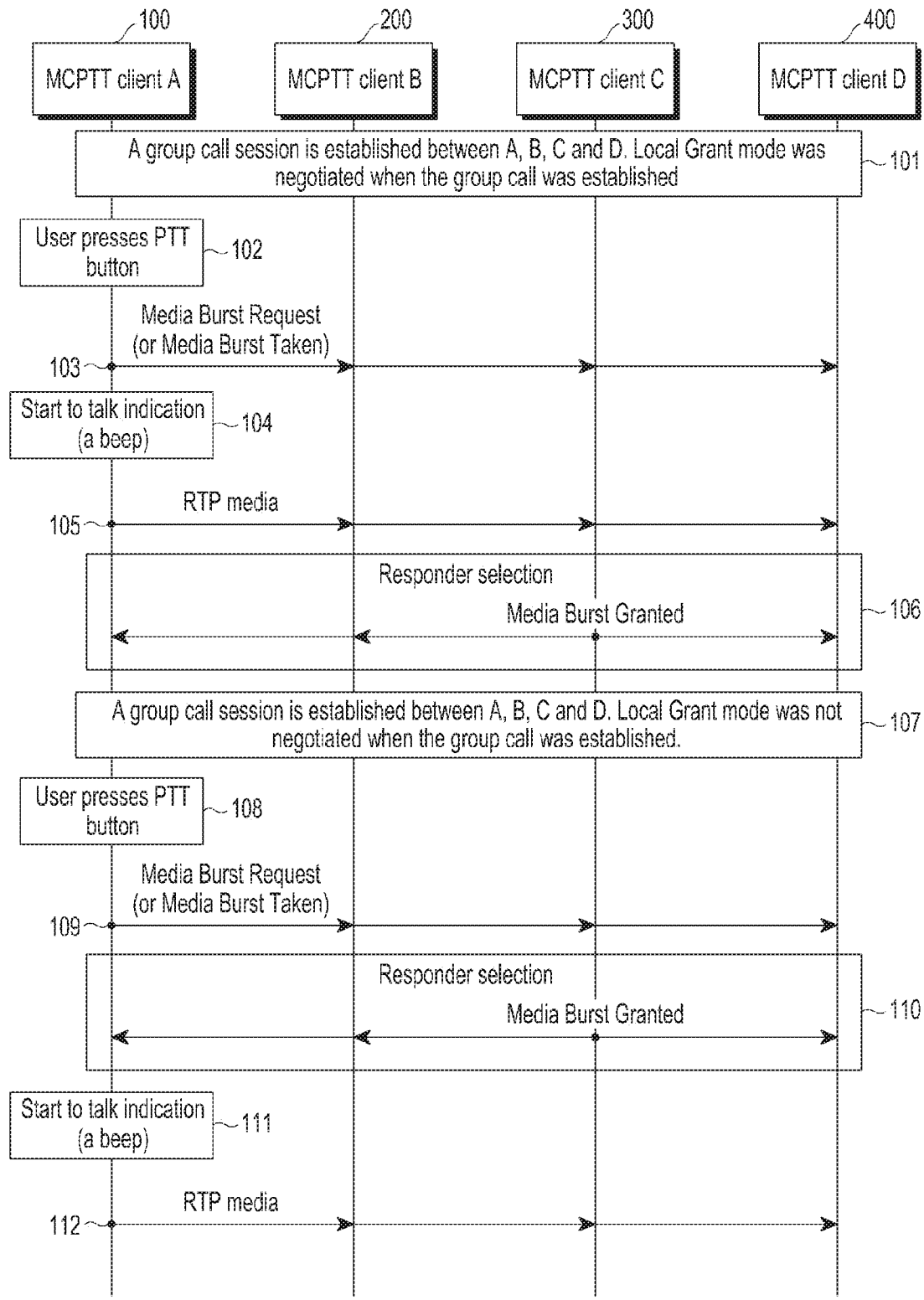
FIG. 1 shows a message flow of requesting permission with granted message.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

A floor control protocol is based on RTCP Application Packets (RTCP: APP), as defined in IETF RFC 3550 and may use ports negotiated at a Session establishment. The RTCP uses the next highest odd port of even port of real-time transport protocol (RTP), as default value.

A MCPTT Client for off-network supports at least one of following basic Media Burst Control Protocol messages, MBCP Media Burst Request, MBCP Media Burst Granted, MBCP Media Burst Deny, and MBCP Media Burst Release. The MBCP Media Burst Request is used by the MCPTT Client to request permission from the other client to send a Media Burst. The MBCP Media Burst Granted is used by the MCPTT Client to notify the MCPTT Client that it has been granted permission to send a Media Burst. The MBCP Media Burst Granted message includes information about a stop talking timer. The MBCP Media Burst Deny is used by the MCPTT Client with permission to send media to notify a MCPTT Client sending floor request message that it has been denied permission to send a Media Burst. The MBCP Media Burst Release is used by the MCPTT Client to notify the other MCPTT Clients that it has completed sending a Media Burst or it cancels the permission before sending the Media Burst or it requests the MCPTT Client with permission to send media to cancel the queued Media Burst request when queuing is supported by the MCPTT Clients.

A MCPTT Client performing supporting queuing of MBCP Media Burst Request messages support the following additional Media Burst Control Protocol messages, MBCP Media Burst Queue Status Request, and MBCP Media Burst Queue Status.

The MBCP Media Burst Queue Status Request is used by the MCPTT Client to get information about the MCPTT Client's position in the floor request queue. The MBCP Media Burst Queue Status is used by the MCPTT Client with permission to send media to notify the MCPTT Client that the MBCP Media Burst Request has been queued.

TABLE 1

| Floor control message | MBCP |
| --- | --- |
| Floor request: used to request a floor for media transfer | Media Burst Request message |
| Floor granted: used to indicate that a request for floor is granted and media transfer is possible. | Media Burst Granted message |
| Floor taken: used to indicate the floor is given to another MCPTT user. | Media Burst Taken message |
| Floor rejected: used to indicate that a request for the floor is rejected. | Media Burst Deny message |
| Floor release: used to indicate the media transfer is completed and floor is released. | Media Burst Release message |
| Request queue position: used to request the queue position about the floor requesting UE. | Media Burst Queue Status Request |
| Queue position: used to indicate the floor request is queued and the queue position to the floor requesting UE. | Media Burst Queue Status |

Message flows are disclosed.

Requesting permission during silence is disclosed.

FIG. 1 shows a message flow of requesting permission with granted message.

Once a group call session is established and when the floor is idle any user can request floor. The flow below shows how a MCPTT client requests the floor, is granted the floor and how media is distributed to other MCPTT clients in the group call session.

The procedure can be two modes of operation according to Granted mode as a result of session establishment: A Local Granted mode and Normal Granted mode. Two modes are needed to receive granted message for permission to talk.

Steps of the flow for the Local Granted mode are explained by referring to FIG. 1 (101).

A user of a MCPTT client A 100 presses the PTT button (102).

The MCPTT client A 100 sends a Media Burst Request message (103), and indicates to the user to start to talk (104).

The MCPTT client A 100 may send a MBCP Media Burst Taken messages instead of the Media Burst Request messages 103. The MBCP Media Burst Request message 103 and the MBCP Media Burst Taken message may include Priority level, Random number for collision resolution of floor requests.

When receiving the request message, a MCPTT client B 200, MCPTT client C 300, and MCPTT client D 400 may prepare receiving RTP media.

The MCPTT client A 100 sends the RTP media to MCPTT clients B 200, C 300, and D 400 (105). The MCPTT clients B 200, C 300, and D 400 receive the RTP media.

The MCPTT client C 300 sends a Media Burst Granted message 106 when receiving the request message 103.

When receiving the floor request message 103, all MCPTT clients 200, 300, 400 may perform the backoff mechanism to avoid sending the same floor grant messages in response to the multicast-based floor request message 103. In the backoff mechanism, the MCPTT clients randomly choose the backoff value in the range [0, maxBackoff] for sending the floor grant message 106. That is, clients 200, 300, 400 may defer their transmission for the chosen backoff time period. Eventually, one of MCPTT clients, choosing the smallest number, firstly sends the floor grant message. If MCPTT clients receive the floor grant message which is sent from other MCPTT client, then the MCPTT clients may not send the floor grant message in order to prevent the feedback message implosions.

Steps of the flow when Local Granted mode is not used are explained by referring to FIG. 1 (107).

A user of a MCPTT client A 100 presses the PTT button (108).

The MCPTT client A 100 sends a Media Burst Request message (109).

The MCPTT client A 100 may send a MBCP Media Burst Taken messages instead of the Media Burst Request messages 109. The MBCP Media Burst Request message 109 and the MBCP Media Burst Taken messages may include Priority level, Random number for collision resolution of floor requests.

A MCPTT client C 300 sends a Media Burst Granted message 110 when receiving the request message 109.

When receiving the floor request message 109, all MCPTT clients 200, 300, 400 may perform the backoff mechanism to avoid sending the same floor grant messages in response to the multicast-based floor request message 109. In the backoff mechanism, the MCPTT clients randomly choose the backoff value in the range [0, maxBackoff] for sending the floor grant message 110. One of MCPTT clients, choosing the smallest number, firstly sends the floor grant message. If MCPTT clients receive the floor grant message which is sent from other MCPTT client, then the MCPTT clients may not send the floor grant message.

In case of on-network, a MBCP server may send a Media Burst Taken message indicating "taken" to MCPTT client B 200, C 300, and D 400 for acknowledgement. But it is unnecessary to send the Media Burst Taken message as the MCPTT client can already know the 'Listening' status as receiving the Media Burst Granted message indicating 'Talking' via multicast communication.

When the Media Burst Granted message is received, the MCPTT client A 100 may send RTP media (112). The MCPTT clients B, C and D receive the RTP media.

Figure 2:
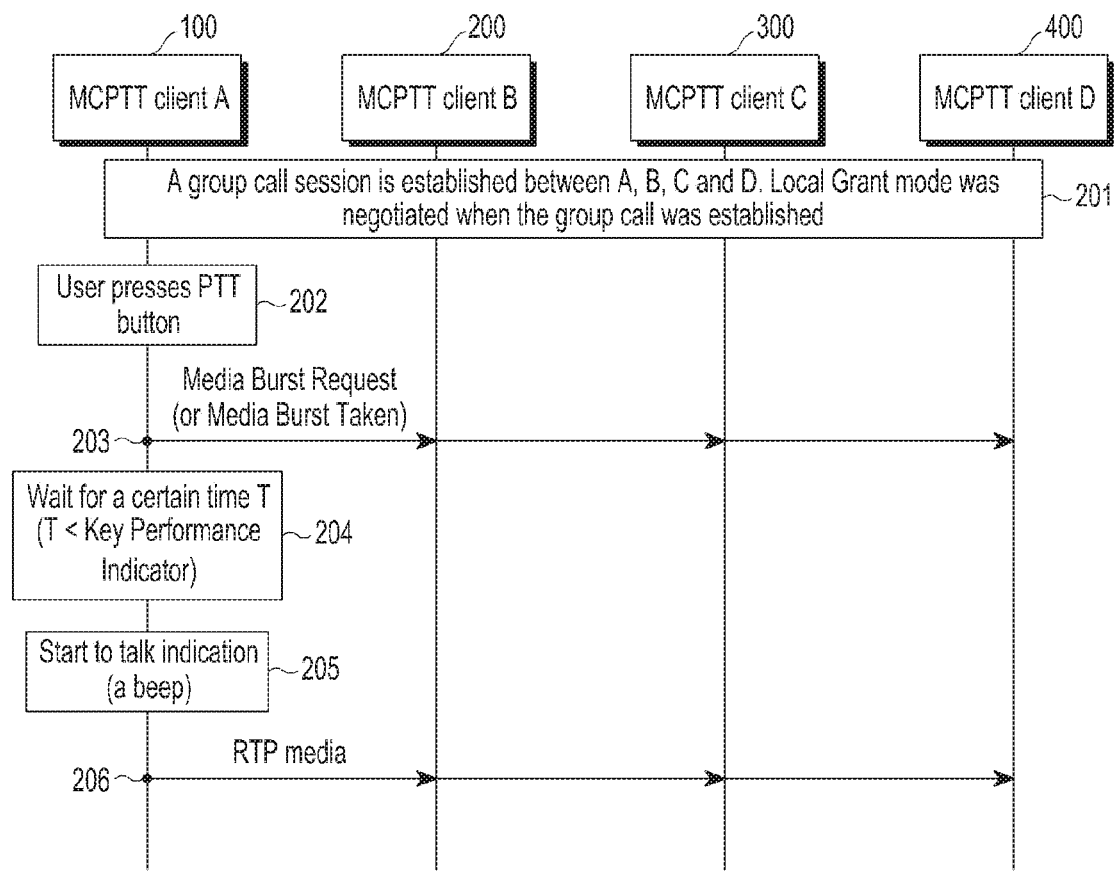
FIG. 2 shows a message flow of requesting permission without granted message.

Requesting permission without granted message is disclosed. FIG. 2 shows a message flow of requesting permission without granted message.

Once group call session is established and when the floor is idle, any user can request floor. The flow below shows how a MCPTT client requests the floor, how the floor is granted, and how media is distributed to other MCPTT clients in the group call session.

The procedure can be two modes of operation according to Granted mode as a result of session establishment: A Local Granted mode and Normal Granted mode. Two modes are needed to wait a certain time (i.e., key performance indicator (KPI): MCPTT Access Time) instead of receiving granted message for permission to talk.

A user of a MCPTT client A 100 presses the PTT button (202).

The MCPTT client A 100 may send a Media Burst Request message (203).

The MCPTT client A 100 may send a MBCP Media Burst Taken messages instead of the Media Burst Request messages 203. The MBCP Media Burst Request message 203 and the MBCP Media Burst Taken message may include Priority level, Random number for collision resolution of floor requests.

After a T timer is expired (204), the MCPTT client A 100 may send RTP media (205) if the MCPTT client A doesn't receive a MBCP Media Burst Request messages from other MCPTT clients. The MCPTT clients B 200, C 300, and D 400 receive the RTP media.

Auto resolution for request collision on local granted mode with granted message is disclosed.

Figure 3:
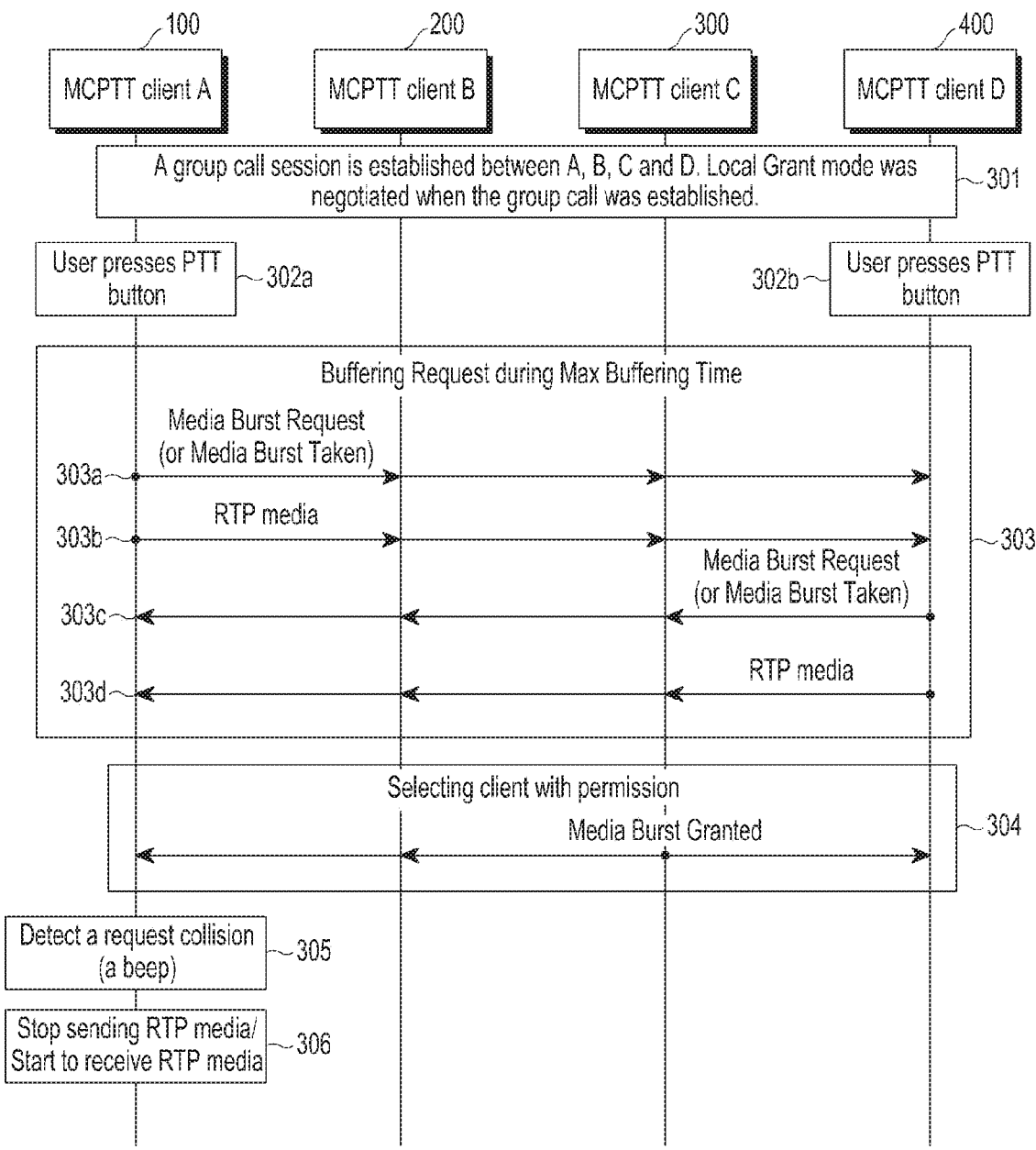
FIG. 3 show a flow of auto resolution for request collision on local granted mode with granted message.

FIG. 3 show a flow of auto resolution for request collision on local granted mode with granted message.

Once a group call session is established and when the floor is idle, any user can request floor.

FIG. 3 shows how a MCPTT client requests the floor, how the floor is granted, and how media is distributed to other MCPTT clients in the group call session.

When two or more MCPTT clients request the floor simultaneously, collision may occur since MCPTT clients cannot detect and avoid other MCPTT client's floor request messages.

MCPTT client A 100 and D 400 may send MBCP Media Burst Request messages 303a, 303c simultaneously to the same group. The MBCP Media Burst Request message 303a, 303c may contain at least one of a Priority levels (will be specified below) and a Random number (e.g., synchronization source (SSRC) of RTP/RTCP).

The MCPTT client A 100 and D 400 may send MBCP Media Burst Taken messages instead of the MBCP Media Burst Request messages. The MBCP Media Burst Taken messages may include Priority level, Random number.

The MCPTT client A 100 and D 400 may send RTP media (303b, 303d) without receiving MBCP Media Burst Granted message.

When receiving the MBCP Media Burst Request messages, all MCPTT clients may buffer the received MBCP Media Burst Requests 303a, 303c and check whether or not another MBCP Media Burst Requests are transmitted for a certain time (i.e., transmitting time of the messages to the service coverage).

When receiving the MBCP Media Burst Request messages, the MCPTT clients B 200 and C 300 may receive the RTP media 303b, 303d.

When the two or more Floor requests 303a, 303c are transmitted simultaneously, the receiving MCPTT clients may perform the operation of selecting a next talker based on the priority level and the random number. The MCPTT client (i.e., the next talker) may be chosen with higher priority in the MBCP Media Burst Requests. If the priority is same, then the MCPTT client with the higher Random number (e.g. SSRC of RTP/RTCP) may be chosen as the next talker.

The MCPTT client C 300 may send a Floor Grant message 304 after selecting the talker.

When receiving the floor request message 303a or 303d, all MCPTT clients may perform the backoff mechanism to avoid sending the same floor grant messages in response to the multicast-based floor request message 303a or 303c. In the backoff mechanism, the MCPTT clients randomly choose the backoff value in the range [0, maxBackoff] for sending the floor grant message 304. That is, the clients may defer their transmission for the chosen backoff time period. Eventually, one of MCPTT clients, choosing the smallest number, firstly sends the floor grant message 304. If MCPTT clients receive the floor grant message 304 which is sent from other MCPTT client, then the MCPTT clients may not send the floor grant message in order to prevent the feedback message implosions.

When the Media Burst Granted message 304 is received, the MCPTT client A 100 may revoke the floor (305).

The MCPTT client A 100 stops sending RTP media and receives RTP media (306).

For the procedure above, users of the MCPTT clients can automatically resolve the request collision without pressing the PTT button again.

Auto resolution for request collision on local granted mode without granted message is disclosed.

Figure 4:
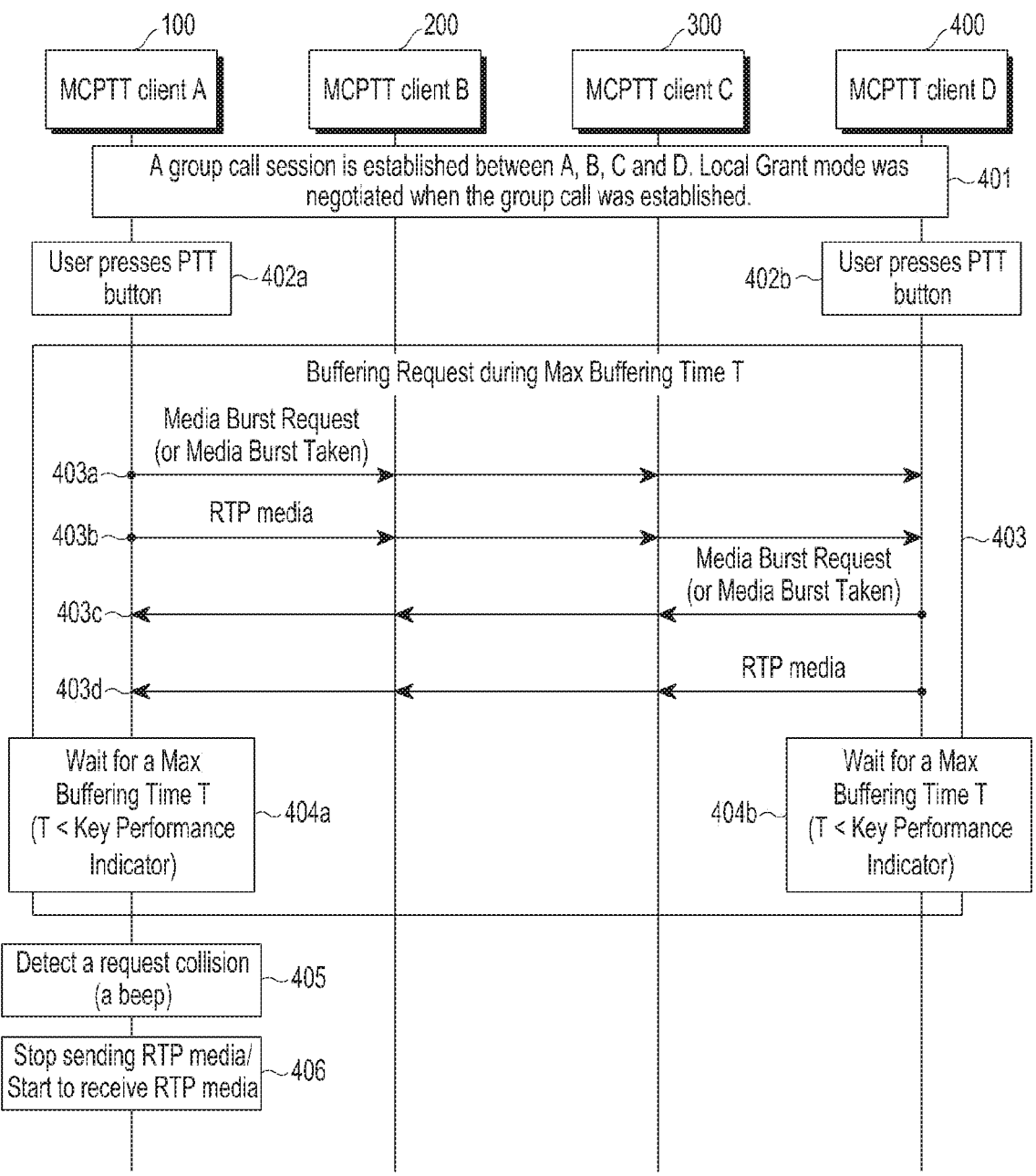
FIG. 4 show a flow of auto resolution for request collision on local granted mode without granted message.

FIG. 4 shows a flow of auto resolution for request collision on local granted mode without granted message.

Once a group call session is established and when the floor is idle, any user can request floor.

FIG. 4 shows how a MCPTT client requests the floor, how the floor is granted, and how media is distributed to other MCPTT clients in the group call session.

When two or more MCPTT clients request the floor simultaneously, collision may occur since MCPTT clients cannot detect and avoid other MCPTT client's floor request messages.

MCPTT client A 100 and D 400 may send MBCP Media Burst Request messages 303a, 303c simultaneously to the same group. The MBCP Media Burst Request message 303a, 303c may contain at least one of a Priority level (will be specified below) and a Random number (e.g.

SSRC of RTP/RTCP).

The MCPTT client A 100 and D 400 may send the MBCP Media Burst Taken messages instead of the MBCP Media Burst Request messages. The MBCP Media Burst Taken messages may include Priority level, Random number.

The MCPTT client A 100 and D 400 may send RTP media (403b, 403d) without receiving MBCP Media Burst Granted message. When receiving the MBCP Media Burst Request messages, the MCPTT clients B 200 and C 300 receive the RTP media.

When the two or more Floor requests 403a, 403c are transmitted simultaneously, the receiving MCPTT clients may perform the operation of selecting a next talker based on the priority level and the random number. After the T timer is expired, the MCPTT client A 100 and D 400 choose the next talker with higher priority in the MBCP Media Burst Requests. If the priority is same, then the MCPTT client with the higher Random number (e.g. SSRC of RTP/RTCP) may be chosen as the next talker. In this case, The MCPTT client D 400 may be chosen as the next talker.

The MCPTT client A 100 may revoke the floor (405).

The MCPTT client A 100 stops sending RTP media and receives RTP media (406).

For the procedure above, users of the MCPTT clients can automatically resolve the request collision without pressing the PTT button again.

Manual resolution for request collision on local granted mode is disclosed.

Figure 5:
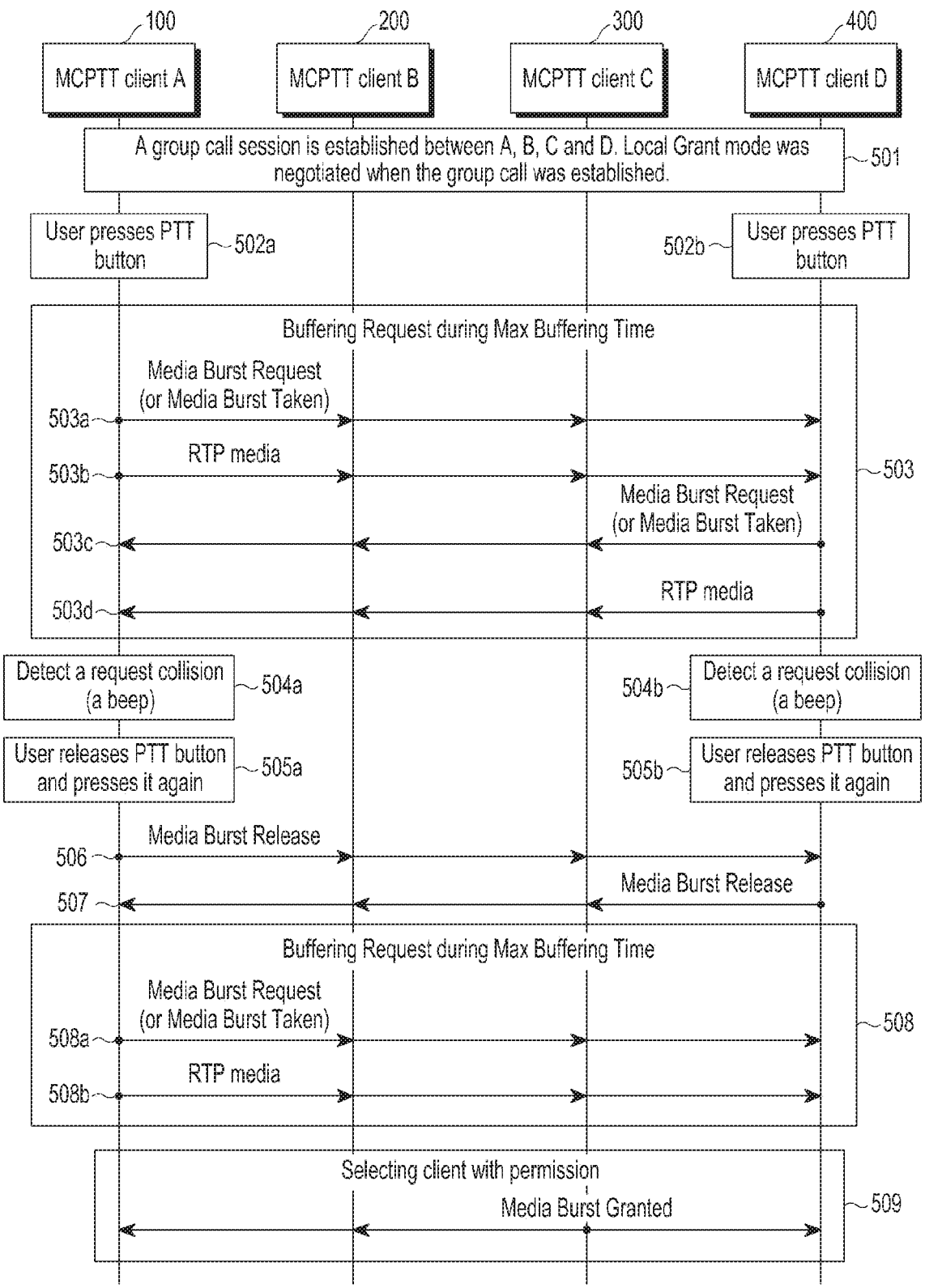
FIG. 5 shows a flow of manual resolution for request collision on local granted mode.

FIG. 5 shows a flow of Manual resolution for request collision on local granted mode.

Once a group call session is established and when the floor is idle, any user can request floor. FIG. 5 shows how a MCPTT client requests the floor, is granted the floor and how media is distributed to other MCPTT clients in the group call session.

When two or more MCPTT clients request the floor simultaneously, collision occurs since MCPTT clients cannot detect and avoid other MCPTT client's floor request messages.

MCPTT client A 100 and D 400 may send MBCP Media Burst Request messages 503a, 503c simultaneously to the same group. The MBCP Media Burst Request message 503a, 503c may contain a Priority level (will be specified below).

The MCPTT client A 100 and D 400 may send MBCP Media Burst Taken messages instead of the MBCP Media Burst Request messages. The MBCP Media Burst Taken messages may contain a Priority level.

The MCPTT client A 100 and D 400 may send RTP media without receiving MBCP Media Burst Granted message.

When receiving the MBCP Media Burst Requests 503a, 503c, all MCPTT clients may buffer the received MBCP Media Burst Requests 503a, 503c and check whether or not another MBCP Media Burst Requests are transmitted for a certain time (i.e., transmitting time of the messages to the service coverage).

When receiving the MBCP Media Burst Request messages 503a, 503c, the MCPTT clients B 200 and C 300 may receive the RTP media.

When the two or more Floor requests 503a, 503c are transmitted simultaneously, receiving MCPTT client A 100 and D 400 may perform the operation of notification 504a, 504b (e.g. beep or message) of collision and send the MBCP Media Burst Request messages by releasing PTT button 505a, 505b. If the MCPTT client can use the priority level in floor request messages, it chooses highest priority of client as next talker. The user may be notified of the collision condition as a beep or message if it is not highest priority.

The MCPTT client A 100 may send the MBCP Media Burst Request messages to the same group by pressing PTT button again (505a).

When receiving the MBCP Media Burst Requests, all MCPTT clients may buffer the received MBCP Media Burst Requests and check whether or not another MBCP Media Burst Requests are transmitted for a certain time.

The MCPTT client C 300 may send Floor Grant message 509 after selecting the talker.

When receiving the floor request message, all MCPTT clients may perform the backoff mechanism to avoid sending the same floor grant messages in response to the multicast-based floor request message. In the backoff mechanism, the MCPTT clients randomly choose the backoff value in the range [0, maxBackoff] for sending the floor grant message. That is, the clients may defer their transmission for the chosen backoff time period. Eventually, one of MCPTT clients, choosing the smallest number, firstly sends the floor grant message. If MCPTT clients receive the floor grant message to be sent from other MCPTT client, then the MCPTT clients may not send the floor grant message in order to prevent the feedback message implosions Auto resolution for request collision on normal granted mode with granted message is disclosed.

Figure 6:
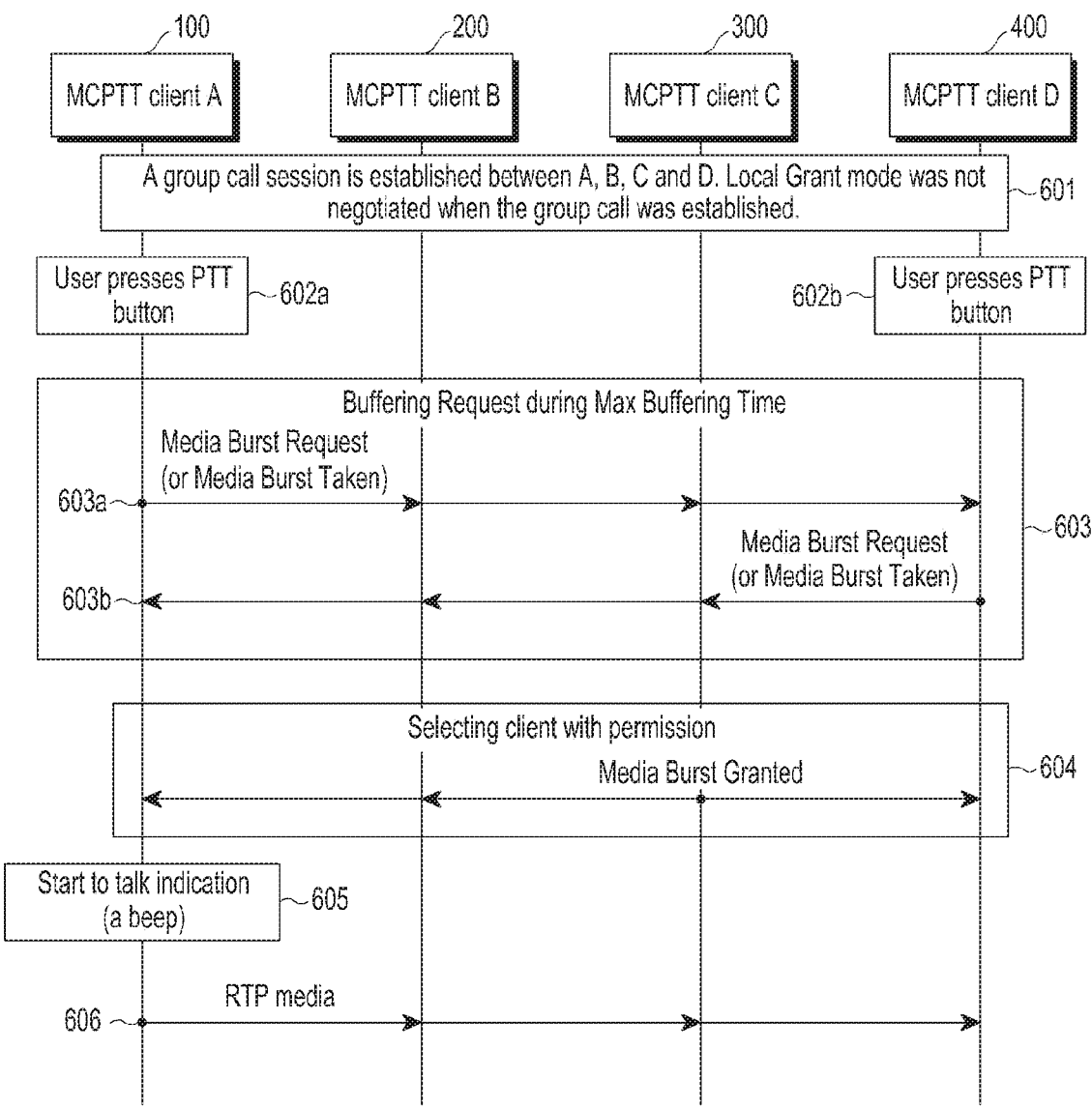
FIG. 6 shows a flow of auto resolution for request collision on normal granted mode with granted message.

FIG. 6 shows a flow of auto resolution for request collision on normal granted mode with granted message.

Once a group call session is established and when the floor is idle, any user can request floor. FIG. 6 shows how a MCPTT client requests the floor, how the floor is granted, and how media is distributed to other MCPTT clients in the group call session.

When two or more MCPTT clients request the floor simultaneously, collision may occur since MCPTT clients cannot detect and avoid other MCPTT client's floor request messages.

MCPTT client A 100 and D 400 may send MBCP Media Burst Request messages 603*a*, 603*b* simultaneously to the same group. The MBCP Media Burst Request messages 603*a*, 603*b* may contain at least one of a Priority level (will be specified below) and a Random number (e.g. SSRC of RTP/RTCP).

The MCPTT client A 100 and D 400 may send MBCP Media Burst Taken messages instead of the MBCP Media Burst Request messages. The MBCP Media Burst Taken messages may include Priority level, Random number.

When receiving the MBCP Media Burst Requests, all MCPTT clients may buffer the received MBCP Media Burst Requests and check whether or not another MBCP Media Burst Requests are transmitted for a certain time (i.e., transmitting time of the messages to the service coverage).

When the two or more Floor requests 603*a*, 603*b* are transmitted simultaneously, receiving MCPTT clients may perform the operation of selecting a next talker based on the priority level and random number. The MCPTT client (i.e., the next talker) may be chosen with higher priority in the MBCP Media Burst Requests. If the priority is same, then the MCPTT client with the higher Random number (e.g. SSRC of RTP/RTCP) may be chosen as the next talker.

Referring to FIG. 6, in operation 601, a group call session is established between the MCPTT clients A 100, B 200, C 300, and D 400. Local Grant mode was not negotiated when the group call was established. In operations 602*a* and 602*b*, the MCPTT clients A 100 and D 400 detect that a user presses PTT button respectively.

In operations 603*a* and 603*b*, the MCPTT clients A 100 and D 400 send the MBCP Media Burst Request messages simultaneously to the same group. The message contains a Priority level and a Random number (e.g. SSRC of RTP/RTCP) The MCPTT clients A 100 and D 400 can send the MBCP Media Burst Taken messages instead of Request messages. The MBCP Media Burst Taken messages may include a Priority level, and a Random number.

When receiving the MBCP Media Burst Requests, all MCPTT clients may buffer the received the MBCP Media Burst Requests and check whether or not another MBCP Media Burst Requests are transmitted for a certain time (i.e., transmitting time of the messages to the service coverage).

When the two or more Floor requests are transmitted simultaneously, the receiving MCPTT clients perform the operation of selecting next talker based on the priority level and random number. The MCPTT client is chosen with higher priority in the MBCP Media Burst Requests. If the priority is same, then the MCPTT client A 100 with the higher Random number (e.g. SSRC of RTP/RTCP) is chosen as the next talker.

In operation 604, the MCPTT client C 300 sends the Floor Grant message after selecting the talker.

When receiving the floor request message, all MCPTT clients perform the backoff mechanism to avoid sending the same floor grant messages in response to the multicast-based floor request message. In the backoff mechanism, the MCPTT clients randomly choose the backoff value in the range [0, maxBackoff] for sending the floor grant message. That is, the clients may defer their transmission for the chosen backoff time period. Eventually, one of MCPTT clients, choosing the smallest number, firstly sends the floor grant message. If MCPTT clients receive the floor grant message to be sent from other MCPTT client, then the MCPTT clients do not send the floor grant message in order to prevent the feedback message implosions When the Media Burst Granted message is received, in operations 605 and 606, the MCPTT client A 100 may start to talk indication and send RTP media.

The MCPTT clients B, C and D receive the RTP media.

For the procedure above users can automatically resolve the request collision without pressing PTT button again.

Auto resolution for request collision on normal granted mode without granted message is disclosed.

Once a group call session is established and when the floor is idle any user can request floor.

Figure 7:
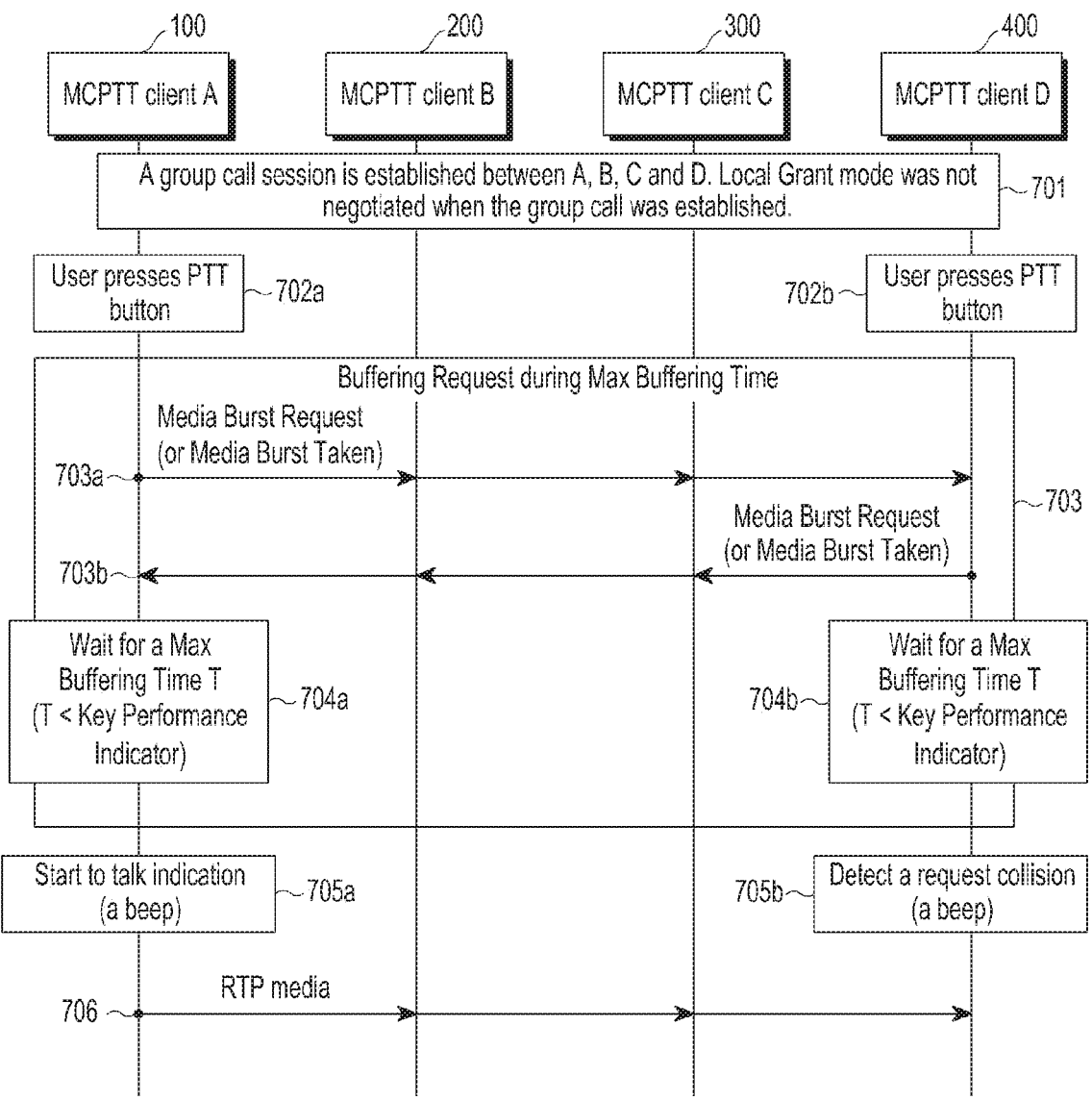
FIG. 7 shows a flow of auto resolution for request collision on normal granted mode without granted message.

FIG. 7 shows how a MCPTT client requests the floor, is granted the floor and how media is distributed to other MCPTT clients in the group call session.

When two or more MCPTT clients request the floor simultaneously, collision occurs since MCPTT clients cannot detect and avoid other MCPTT client's floor request messages.

Referring to FIG. 7, in operation 701, a group call session is established between the MCPTT clients A 100, B 200, C 300, and D 400. Local Grant mode was not negotiated when the group call was established. In operations 702*a* and 702*b*, the MCPTT clients A 100 and D 400 detect that a user presses PTT button respectively.

In operation 703 (including 703*a* and 703*b*), the MCPTT clients A 100 and D 400 send the MBCP Media Burst Request messages simultaneously to the same group. The message may contain the following: Priority levelRandom number (e.g. SSRC of RTP/RTCP) The MCPTT clients A 100 and D 400 can send the MBCP Media Burst Taken messages instead of Request messages. The MBCP Media Burst Taken messages may include Priority level, Random number. The MCPTT clients A 100 and D 400 can wait for a max buffering time T. (where, T<the key performance indicator) When the two or more Floor requests are transmitted simultaneously, the receiving MCPTT clients perform the operation of selecting next talker based on the priority level and random number. After the T timer is expired, the MCPTT clients A 100 and D 400 choose the next talker with higher priority in the MBCP Media Burst Requests. If the priority is same, then the MCPTT client with the higher Random number (e.g. SSRC of RTP/RTCP) is chosen as the next talker. In this case, in operation 705*a*, the MCPTT client A is chosen as the next talker and may start to talk indication (a beep).

In operation 406, the MCPTT client A sends RTP media. The MCPTT clients B, C and D receive the RTP media.

For the procedure of FIG. 7, users can automatically resolve the request collision without pressing PTT button again.

Manual resolution for request collision on normal granted mode is disclosed.

Once a group call session is established and when the floor is idle any user can request floor.

Figure 8:
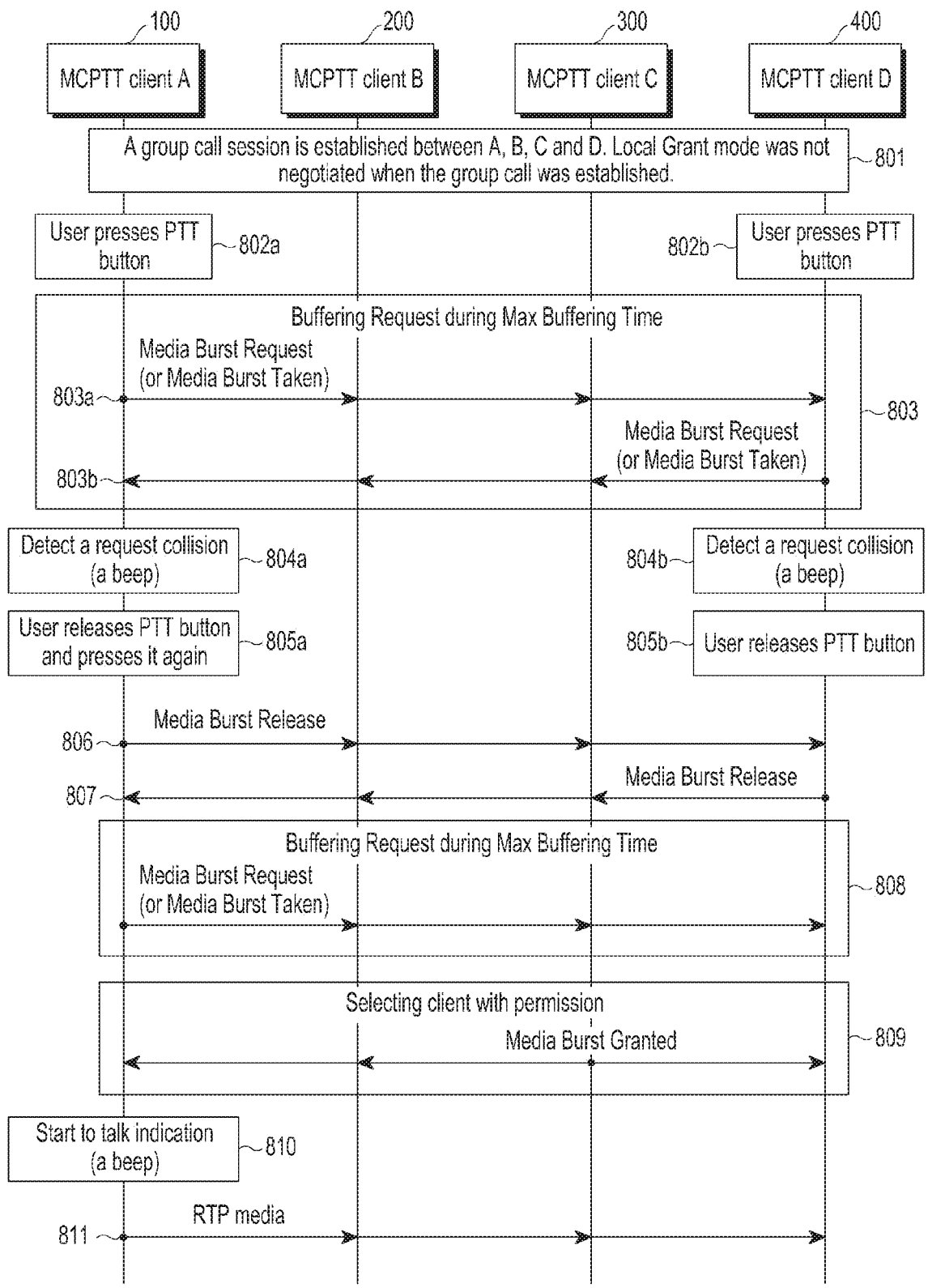
FIG. 8 shows a flow of manual resolution for request collision on normal granted mode.

FIG. 8 shows how a MCPTT client requests the floor, is granted the floor and how media is distributed to other MCPTT clients in the group call session.

When two or more MCPTT clients request the floor simultaneously, collision occurs since MCPTT clients cannot detect and avoid other MCPTT client's floor request messages.

Referring to FIG. 8, in operation 801, a group call session is established between the MCPTT clients A 100, B 200, C 300, and D 400. Local Grant mode was not negotiated when the group call was established. In operations 802a and 802b, the MCPTT clients A 100 and D 400 detect that a user presses PTT button respectively.

In operation 803 (including 803a and 803b) the MCPTT clients A 100 and D 400 send the MBCP Media Burst Request messages simultaneously to the same group. The message may contain the following information element Priority level The MCPTT clients A 100 and D 400 can send the MBCP Media Burst Taken messages instead of Request messages. The MBCP Media Burst Taken messages may contain Priority level.

When receiving the MBCP Media Burst Requests, all MCPTT clients may buffer the received the MBCP Media Burst Requests and check whether or not another MBCP Media Burst Requests are transmitted for a certain time (i.e., transmitting time of the messages to the service coverage).

When the two or more Floor requests are transmitted simultaneously, the receiving MCPTT clients A 100 and D 400 perform the operation of notification (e.g. beep or message) of collision in operations 804a and 804b and send the MBCP Media Burst Request messages in operations 806 and 807 by releasing PTT button by its user in operations 805a and 805b. If the MCPTT client 100 or 400 can use the priority level in floor request messages, it chooses highest priority of client as next talker. The user must be notified of the collision condition as a beep or message if it is not highest priority.

MCPTT client A 100 sends the MBCP Media Burst Request messages to the same group by pressing PTT button again.

When receiving the MBCP Media Burst Requests, all MCPTT clients may buffer the received the MBCP Media Burst Requests and check whether or not another MBCP Media Burst Requests are transmitted for a certain time.

In operation 809, the MCPTT client C 300 sends the Floor Grant message after selecting the talker.

When receiving the floor request message, all MCPTT clients perform the backoff mechanism to avoid sending the same floor grant messages in response to the multicast-based floor request message. In the backoff mechanism, the MCPTT clients randomly choose the backoff value in the range [0, maxBackoff] for sending the floor grant message. That is, the clients may defer their transmission for the chosen backoff time period. Eventually, one of MCPTT clients, choosing the smallest number, firstly sends the floor grant message. If MCPTT clients receive the floor grant message to be sent from other MCPTT client, then the MCPTT clients do not send the floor grant message in order to prevent the feedback message implosions When the Media Burst Granted message is received, in operations 810 and 811, the MCPTT client A may start to talk indication and send RTP media.

The MCPTT clients B, C and D receive the RTP media.

Requesting permission during speech is disclosed.

Once a group call session is established and when the floor is taken any user can request floor.

Figure 9:
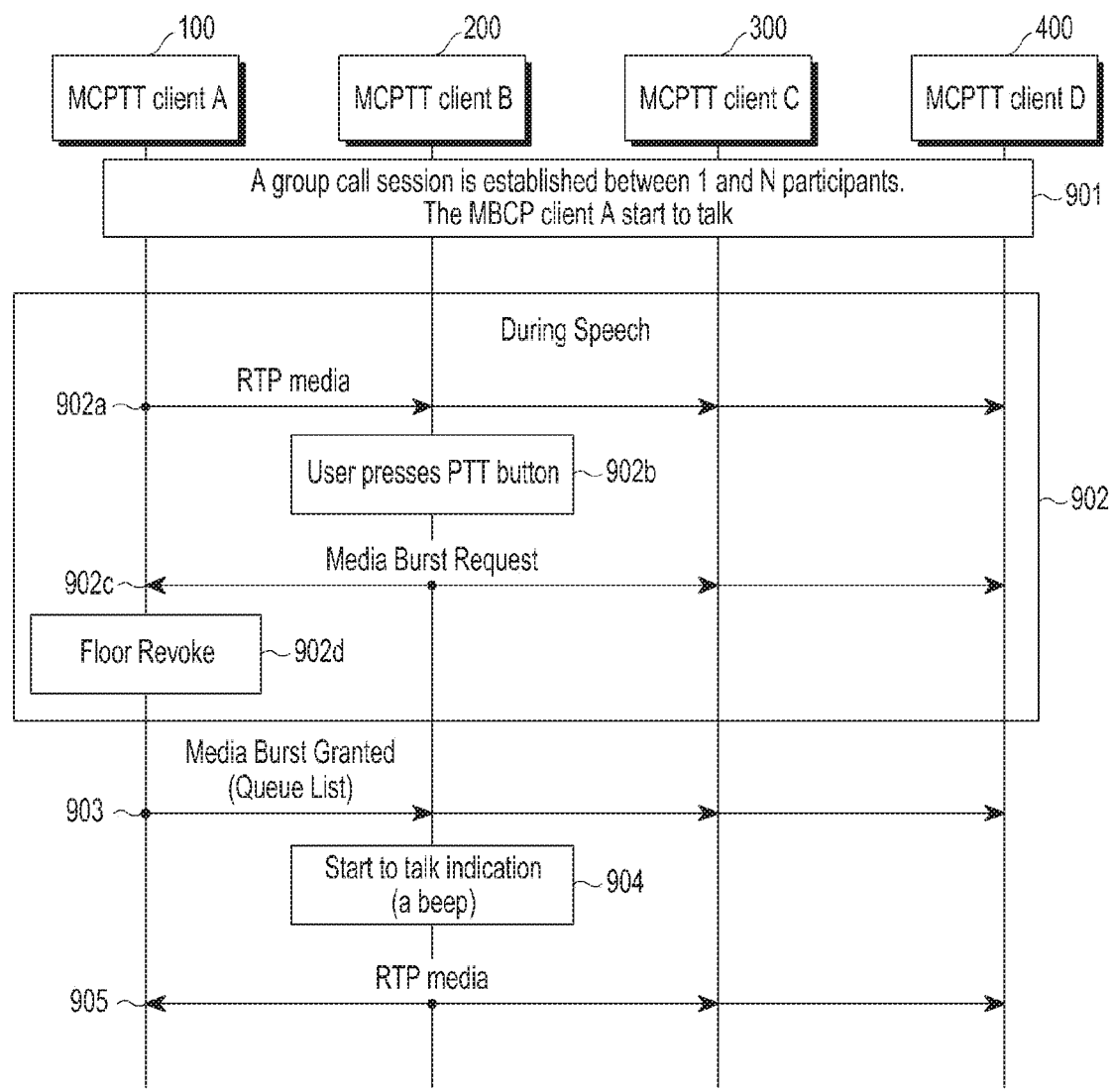
FIG. 9 shows a flow for requesting permission during speech.

FIG. 9 shows how a MCPTT client requests the floor, is granted the floor and how media is distributed to other MCPTT clients in the group call session.

Referring to FIG. 9, in operation 901, a group call session is established between 1 and N participants. The N participants may include the MBCP clients A 100, B 200, C 300, and D 400.

And the MBCP client A 100 starts to talk.

Operation 902 (including 902a, 902b, 902c, and 902d) is performed during speech of the MBCP client A 100.

In operation 902a, the MBCP client A sends RTP media and in operation 902b, the user at the MBCP client B 200 presses the PTT button during the speech of MCPTT client A 100.

In operation 902c, the MBCP client B 200 sends the MBCP Media Burst Request message with the pre-emption priority.

In operation 902d, the MBCP client A 100 revokes locally when receiving the MBCP Media Burst Request message. If the priority of the MBCP client A 100 is same as the MBCP client B 200, the MCPTT client A 100 may send the MBCP Media Burst deny message.

In operation 903, the MBCP client A 100 sends the MBCP Media Burst Granted message with Queue list indicating MBCP clients waiting for next floor. The Queue list includes set of priority, queue position, userID of MBCP clients requesting to get permission to talk.

In operation 905, the MBCP client B 200 starts to talk indication and sends the RTP media. The MBCP clients A, C and D receive the RTP media.

Floor control procedures are disclosed.

The floor participant may support the state diagram and the following state transitions.

Figure 10:
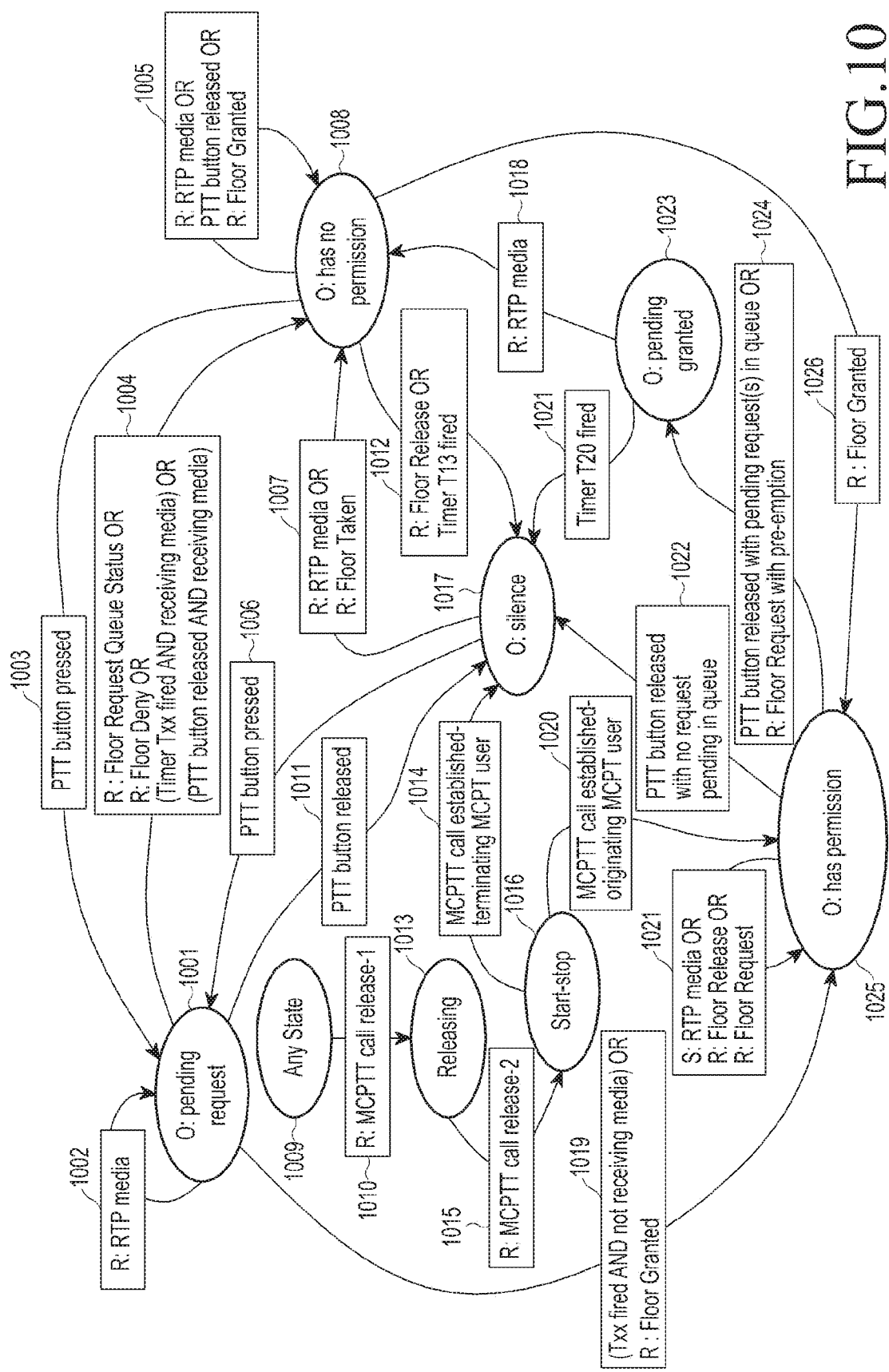
FIG. 10 shows a floor participant state diagram.

FIG. 10 shows the floor participant state diagram.

Referring to FIG. 10, if an RTP media packet or a floor control message arrives in a state where there is no specific procedure specified for the RTP media or the received floor control message, the floor participant may discard the floor control message or the RTP media packet and may remain in the current state. A badly formatted RTP packet or floor control message received in any state is ignored by the floor participant and does not cause any change of the current state.

An operation in the state "Start-stop" 1016 is described.

In this state no state machine exists.

In the state "Start-stop" 1016, the MCPTT call may be established by an originating MCPTT user.

When a MCPTT call is established with session announcement including an explicit floor request, in operation 1020, the originating floor participants may create an instance of a floor participant state transition diagram for basic operation state machine, and send Floor Taken message towards other floor participants, and enter the 'O: has permission' state 1025.

In the state "Start-stop" 1016, the MCPTT call may be established by a terminating MCPTT user.

When a MCPTT call is established, in operation 1014, the terminating floor participant may create an instance of a floor participant state transition diagram for basic operation state machine, and enter the 'O: silence' state 1017.

An operation in the state: 'O: silence' 1017 is described.

In this state a none of the MCPTT clients in the session is acting as a floor control server.

If the floor participant receives an indication from the MCPTT user to send media in the state: 'O: silence' 1017, in operation 1006, the floor participant may send the Floor Request message (PTT button pressed) to other floor participants, and enter 'O: pending request' state 1027.

Upon receiving RTP media packets (R: RTP media) in the state: 'O: silence' 1017, in operation 1007, the floor participant may provide a floor taken notification to the MCPTT user, and enter 'O: has no permission' state 1008.

Upon receiving Floor Taken message (R: Floor Taken) in the state: 'O: silence' 1017, in operation 1007, the floor participant may provide a floor taken notification to the MCPTT user, and enter 'O: has no permission' state 1008.

An operation in the state: 'O: has no permission' 1008 is described.

In this state another MCPTT client does not have permission to send media.

If the floor participant receives an indication from the MCPTT user to send media in the state: 'O: has no permission' 1008, in operation 1003, the floor participant may send the Floor Request message (PTT button pressed) to other floor participants, and enter 'O: pending request' state 1027.

When a Floor Release message is received (R: Floor Release) in the state: 'O: has no permission' 1008, in operation 1012, the floor participant may instruct the MCPTT client to stop receiving RTP media packets, enter 'O: silence' state 1017, and, provide floor idle notification to the MCPTT user.

When a Floor Granted message is received (R: Floor Granted) in the state: 'O: has no permission' 1008 (i.e. when a Floor Request is pending in the queue or a higher priority request is pending), in operation 1026, the floor participant may instruct the MCPTT client to stop receiving RTP media packets, if any, if the User ID in the floor grant message matches its own User ID, enter the state 'O: has permission' 1025, remain in 'O: has no permission' state, if the User ID in the floor grant message don't match its own User ID, and update the queue status and notify the MCPTT user, Upon receiving RTP media packets (R: RTP media) in the state: 'O: has no permission' 1008, in operation 1005, the floor participant may instruct the MCPTT client to render the RTP media packets, and remain in 'O: has no permission' state 1008.

Upon receiving an indication from the MCPTT user to release the pending request for the floor in the state: 'O: has no permission' 1008, in operation 1005, the floor participant may send a Floor Release message (PTT button released) towards other floor participants, and remain in 'O: has no permission' state 1008.

On firing of T13 (No RTP Media) timer in the state: 'O: has no permission' 1008, in operation 1012, the PoC Client may instruct the MCPTT client to stop receiving RTP media, enter 'O: silence' state 1017, and, provide floor idle notification to the MCPTT user.

An operation in the state: 'O: has permission' 1025 is described.

In this state the MCPTT client is acting as a floor control server and has the permission to send media.

Upon receiving encoded media from the MCPTT user or if encoded media is already buffered in the state: 'O: has permission' 1025, in operation 1021, the floor participant may instruct the MCPTT client to start sending RTP media packets (S: RTP Media) towards other MCPTT clients. The RTP media packet may include, media packets and payload attributes as defined in IETF RFC 3550, And the floor participant may remain in the 'O: has permission' state 1025.

Upon receiving a Floor Release message (R: Floor Release) in the state: 'O: has permission' 1025, in operation 1021, the floor participant may remove the sender of the Floor Release message from the queue, if the User ID in the floor release message matches the queued request of User ID, and, remain in the 'O: has permission' state 1025.

When a Floor Request message is received (R: Floor Request) in a session where queuing mode is not used in the state: 'O: has permission' 1025, in operation 1021, the floor participant may send the Floor Deny message including reason field toward the other floor participants, and remain in the 'O: has permission' state 1025.

When a Floor Request message is received in a session where queuing mode is used and if the priority level of the message is not higher in the state: 'O: has permission' 1025, in operation 1021, the floor participant may store the received Floor Request messages, send the Floor Request Queue Status message. The Floor Request Queue Status message may be populated by indicating the User ID of the MCPTT client in the floor request queue, indicating the SSRC of the MCPTT client in the floor request queue, indicating the position of the MCPTT client in the floor request queue, and indicating the priority level of the MCPTT client in the in the floor request queue. And the floor participant may remain in the 'O: has permission' state 1025.

Upon receiving an indication from the MCPTT user to release permission to send RTP media in the state: 'O: has permission' 1025, in operation 1022, the floor participant may send a Floor Release message (PTT button released) towards other floor participants, if no queued requests exist. The Floor Release message may be populated by including the sequence number of the last RTP media packet that was sent, if at least 1 RTP Media packet was sent. The floor participant is expected to provide the sequence number in all cases when the floor participant knows the sequence number of the RTP media packets may set the sequence number ignore field to 1, if no RTP media were sent or if the floor participant is not capable of providing the correct sequence number. And the floor participant may enter the 'O: silence' state 1017.

When no more encoded media is received from the MCPTT user and if at least one Floor Request message is stored in the state: 'O: has permission' 1025 (i.e. queuing mode is used in the session), in operation 1024, the floor participant may instruct the MCPTT client to stop sending RTP media packets towards other MCPTT clients, and send the Floor Granted message (PTT button released) toward the other floor participant. The Floor Granted message may be populated by indicating the User ID of the MCPTT client in the floor request queue, indicating the SSRC of the MCPTT client in the floor request queue, indicating the position of the MCPTT client in the floor request queue, and indicating the priority level of the MCPTT client in the in the floor request queue. And the floor participant may enter the 'O: pending granted' state 1023.

When a Floor Request message is received with a pre-emption priority (R: Floor Request with pre-emption) in the state: 'O: has permission' 1025, in operation 1024, the floor participant may instruct the MCPTT client to stop sending RTP media packets towards other MCPTT clients, and send a Floor Granted message.

If floor control queuing mode is used in the session, the Floor Granted message may be populated by indicating the User ID of the MCPTT client in the floor request queue, indicating the SSRC of the MCPTT client in the floor request queue, indicating the position of the MCPTT client in the floor request queue, and indicating the priority level of the MCPTT client in the in the floor request queue. And the floor participant may enter the 'O: pending granted' state 1023.

An operation in the state: 'O: pending request' 1027 is described.

In this state the MCPTT client is waiting for a response to a Floor request message. The timer Txx (waiting time for collision detection of requests) is running in this state.

Upon receiving RTP media packets (R: RTP media) in the state: 'O: pending request' 1027, in operation 1002, the floor participant may instruct the MCPTT client to render the RTP media packets, and remain in 'O: pending request' state 1027.

Upon receiving Floor Request Queue Status message (R: Floor Request Queue Statue) in the state: 'O: pending request' 1027, in operation 1004, the floor participant may update the queue status, if the User ID in the Floor Request Queue Status message matches its own User ID, notify the MCPTT user about the queue position, stop the timer Txx (waiting time for collision detection of requests); and enter 'O: has no permission' state 1008.

Upon receiving Floor Deny message matching the MCPTT client own User ID (R: Floor Deny) in the state: 'O: pending request' 1027, in operation 1004, the floor participant may stop the timer Txx (waiting time for collision detection of requests), if the User ID in the Floor Deny message matches its own User ID, and enter 'O: has no permission' state 1008.

When the MCPTT client is receiving RTP Media and if Txx timer is fired in the state: 'O: pending request' 1027, in operation 1004, the floor participant may enter 'O: has no permission' state 1008, and provide floor idle notification to the MCPTT user.

When an indication from the MCPTT user to release the pending request for the floor is received and if RTP media is received (PTT button released and receiving media) in the state: 'O: pending request' 1027, in operation 1004, the floor participant may send a Floor Release message towards other floor participants, stop the timer Txx (waiting time for collision detection of requests), and enter 'O: has no permission' state 1008.

When an indication from the MCPTT user to release the pending request for the floor is received and if no RTP media is received in the state: 'O: pending request' 1027, in operation 1011, the floor participant may send a Floor Release message (PTT button released) towards other floor participants, stop the timer Txx (waiting time for collision detection of requests), and enter 'O: silence' state 1017.

If no RTP media is received until expiry of timer Txx in the state: 'O: pending request' 1027, in operation 1019, the floor participant may send Floor Taken message towards other floor participants, and enter 'O: has permission' state 1025.

Upon receiving Floor Granted message (R: Floor Granted) in the state: 'O: pending request' 1027, in operation 1019, the floor participant may stop the timer Txx (waiting time for collision detection of requests), if the User ID in the Floor Granted message matches its own User ID, and enter 'O: has permission state' 1025.

An operation in the state: 'O: pending granted' 1023 is described.

In this state the MCPTT client is waiting for another client to take over the role of Floor controller. The Timer T20 (No RTP Media) is running in this state.

Upon receiving the RTP media in the state: 'O: pending granted' 1023, in operation 1018 the floor participant may request the MCPTT client to start receiving RTP media packets, and enter 'O: has no permission' state 1008.

On expiry of T20 (Granted re-send) timer in the state: 'O: pending granted' 1023, in operation 1021, the floor participant may enter 'O: silence' state 1017.

An operation in the state: Any state 1009 is described.

This state relates to the actions to be taken in all states defined for the basic state diagram with the exception of the 'Start-stop' state 1016 and the 'Releasing' state 1013.

Upon receiving a MCPTT call release step 1 request from the application and signaling plane when the MCPTT call is going to be released or when the floor participant is leaving the MCPTT call in the state: Any state 1009, in operation 1010, the floor participant may stop sending floor control messages other floor participants, request to the MCPTT client to stop sending and receiving RTP media packets, and enter the 'Releasing' state 1013.

An operation in the state: 'Releasing' 1013 is described.

The floor participant uses this state while waiting for the application and signaling plane to finalize the disconnection of a MCPTT call.

Upon receiving a MCPTT call release step 2 request from the application and signaling in the state: 'Releasing' 1013, in operation 1015 the floor participant may release all resources including any running timers associated with the MCPTT call, and enter the 'Start-stop' state 1016 and terminate the 'Floor control state machine—basic' Hereinafter, A detailed method of floor control procedures with timer for enhancing reliability will be described.

The floor participant may support the state diagram and the state transitions specified in this subclause.

FIG. 10 illustrates the floor participant state diagram.

Figure 11:
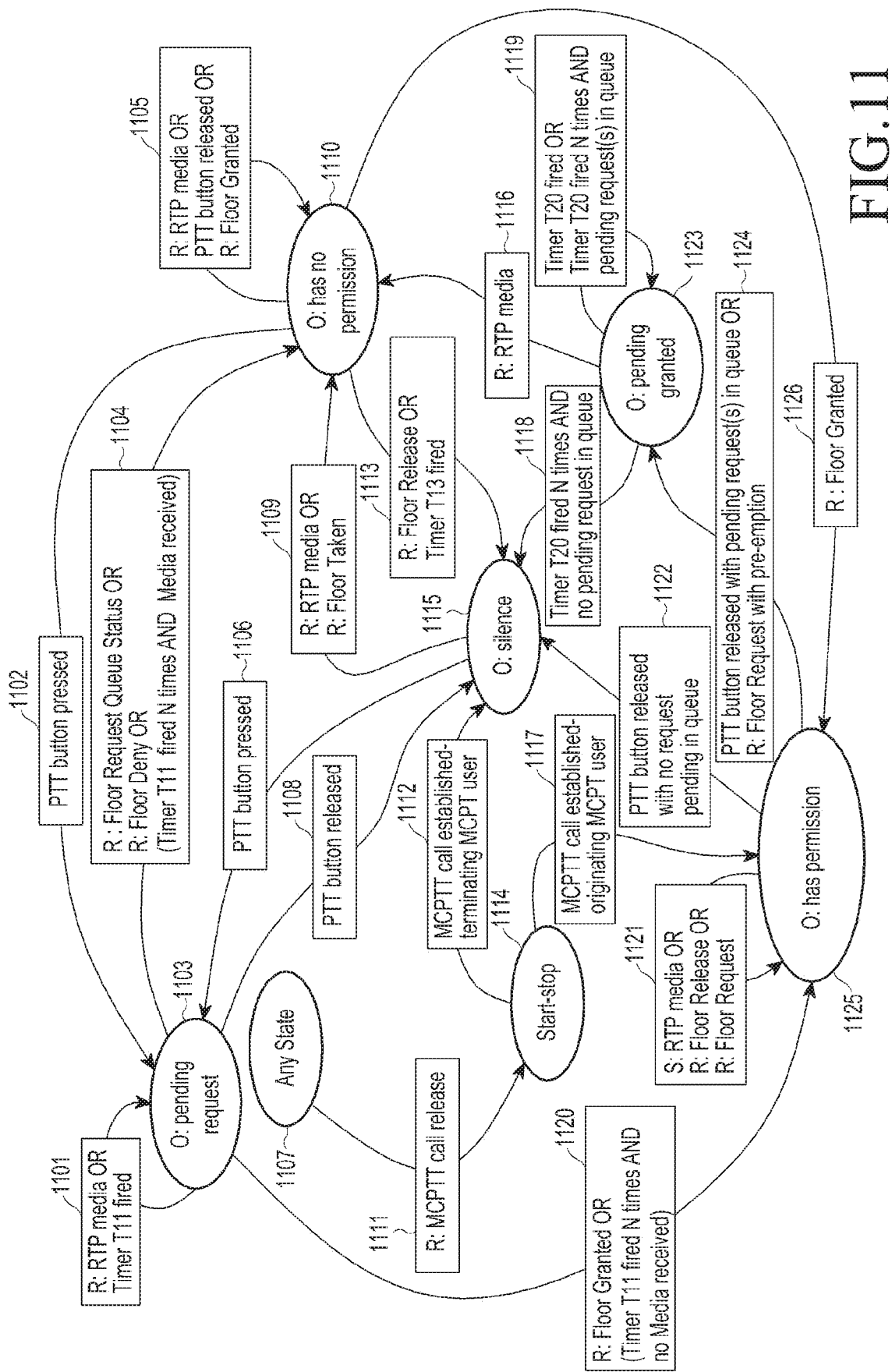
FIG. 11 shows a floor participant state diagram (enhanced operation).

FIG. 11 illustrates the floor participant state diagram—enhanced operation. State details are explained in the following subclauses.

If an RTP media packet or a floor control message arrives in a state where there is no specific procedure specified for the RTP media or the received floor control message, the floor participant may discard the floor control message or the RTP media packet and may remain in the current state.

It is noted that a badly formatted RTP packet or a floor control message received in any state is ignored by the floor participant and does not cause any change of the current state.

Hereinafter, referring to the FIG. 11, enhanced operations in connection with the floor participant state diagram will be described in detail.

As to a state of "Start-stop" (1114)

In this state no state machine exists.

In the FIG. 11, an operation for MCPTT call established—originating MCPTT user (1117) is performed as follows:

When a MCPTT call is established with session announcement including an explicit floor request, the originating floor participant: may create an instance of a floor participant state transition diagram for basic operation state machine; and may send Floor Taken message towards other floor participants; and may enter the 'O: has permission' state (1125).

In the FIG. 11, an operation for MCPTT call established—terminating MCPTT user (1112) is performed as follows:

When a MCPTT call is established the terminating floor participant:

may create an instance of a floor participant state transition diagram for basic operation state machine; and may enter the 'O: silence' state (1115).

AS to a state of 'O: silence' (1115)

In this state a none of the MCPTT clients in the session is acting as a floor control server.

In the FIG. 11, an operation for sending floor request message (PTT button pressed) (1106) is performed as follows:

If the floor participant receives an indication from the MCPTT user to send media, the floor participant:

may send the Floor Request message to other floor participants; and may enter 'O: pending request' state (1103).

In the FIG. 11, an operation for receiving RTP media (R: RTP media) (1109) is performed as follows:

Upon receiving RTP media packets, the floor participant:

may provide a floor taken notification to the MCPTT user;

may start timer T13 (No RTP Media);

may request the MCPTT client to start rendering received RTP media packets; and, may enter 'O: has no permission' state (1110).

In the FIG. 11, an operation for receiving a floor taken message (R: Floor Taken) (1109) is performed as follows:

Upon receiving Floor Taken message, the floor participant:

may provide a floor taken notification to the MCPTT user;

may start timer T13 (No RTP Media); and, may enter 'O: has no permission' state (1110).

As to a state of 'O: has no permission' (1110)

In this state another floor participant does not have permission to send media.

In the FIG. 11, an operation for sending a floor request message (PTT button pressed) (1102) is performed as follows:

If the floor participant receives an indication from the user that the user wants to send media, the floor participant:

may send the Floor Request message to other clients; and, may enter 'O: pending request' state (1101).

In the FIG. 11, an operation for receiving a floor release message (R: Floor Release) (1113) is performed as follow:

When a Floor Release message is received, the floor participant:

1. may request the MCPTT client to stop rendering received RTP media packets;

may stop timer T13 (No RTP Media);

may enter 'O: silence' state (1115); and, may provide floor idle notification to the MCPTT user.

In the FIG. 11, an operation for T13 (No RTP Media) timer fired (1113) is performed as follows:

On firing of T13 (No RTP Media) timer, the floor participant:

may request the MCPTT client to stop rendering received RTP media packets;

may enter 'O: silence' state (1115); and, may provide floor idle notification to the MCPTT user.

In the FIG. 11, an operation for receiving a floor granted message (R: Floor Granted) (1105) is performed as follows:

When a Floor Granted message is received (i.e. when a Floor Request is pending in the queue or a higher priority request is pending), the floor participant:

may request the MCPTT client to stop rendering received RTP media packets, if any, if the User ID in the floor grant message matches its own User ID;

may stop timer T13 (No RTP Media);

may enter the state 'O: has permission' (1125).

may remain in 'O: has no permission' state (1110), if the User ID in the floor grant message don't match its own User ID; and, may update the queue status and notify the MCPTT user;

In the FIG. 11, an operation for receiving RTP media (R: RTP media) (1105) is performed as follows:

Upon receiving RTP media packets, the floor participant:

may request the MCPTT client to render the received RTP media packets;

may restart timer T13 (No RTP Media); and, may remain in 'O: has no permission' state (1110).

In the FIG. 11, an operation for sending a floor release message (PTT button released) is performed as follows:

Upon receiving an indication from the MCPTT user to release the pending request for the floor, the floor participant:

may send a Floor Release message towards other floor participants; and, may remain in 'O: has no permission' state (1110).

As to a state of 'O: has permission' (1125)

In this state the MCPTT client is acting as a floor control server and has the permission to send media.

In the FIG. 11, an operation for sending RTP Media packets (S: RTP Media) (1121) is performed as follows:

Upon receiving encoded media from the user or if encoded media is already buffered the floor participant:

may request the MCPTT client to start sending RTP media packets towards other MCPTT clients; and, may remain in the 'O: has permission' state (1125).

In the FIG. 11, an operation for receiving a floor release message (R: Floor Release) (1121) is performed as follows:

Upon receiving a Floor Release message, the floor participant:

may remove the sender of the Floor Release message from the queue, if the User ID in the floor release message matches the queued request of User ID; and, may remain in the 'O: has permission' state (1125).

In the FIG. 11, an operation for receiving a floor request (R: Floor Request) (1121) is performed as follows:

When a Floor Request message is received in a session where queuing mode is not used, the floor participant:

may send the Floor Deny message including reason field toward the other floor participants; and, may remain in the 'O: has permission' state (1125).

When a Floor Request message is received in a session where queuing mode is used and if the priority level of the message is not higher, the floor participant:

may store the received Floor Request messages;

may send the Floor Request Queue Status message. The Floor Request Queue Status message may be populated as follows:

may indicate the User ID of the MCPTT client in the floor request queue;

may indicate the SSRC of the MCPTT client in the floor request queue;

may indicate the position of the MCPTT client in the floor request queue;

may indicate the priority level of the MCPTT client in the in the floor request queue; and, may remain in the 'O: has permission' state (1125).

In the FIG. 11, an operation for sending a floor release message (PTT button released with no pending request in queue) (1122) is performed as follows:

Upon receiving an indication from the MCPTT user to release permission to send RTP media, the floor participant:

may send a Floor Release message towards other floor participants, if no queued requests exist;

may enter the 'O: silence' state (1115).

In the FIG. 11, an operation for sending a floor granted message (PTT button released with pending request(s) in queue) (1124) is performed as follows:

When no more encoded media is received from the user and if at least one Floor Request message is stored (i.e. queuing mode is used in the session), the floor participant:

may request the MCPTT client to stop sending RTP media packets towards other MCPTT clients;

may send the Floor Granted message toward the other floor participants. The Floor Granted message may be populated as follows:

may indicate the User ID of the MCPTT client in the floor request queue;

may indicate the SSRC of the MCPTT client in the floor request queue;

may indicate the position of the MCPTT client in the floor request queue;

may indicate the priority level of the MCPTT client in the in the floor request queue; and, may enter the 'O: pending granted' state (1123).

In the FIG. 11, an operation for receiving a floor request with pre-emption indication (R: Floor Request with pre-emption) (1124) is performed as follows:

When a Floor Request message is received with a pre-emption priority higher than priority of the floor participant, the floor participant:

may request the MCPTT client to stop sending RTP media packets towards other MCPTT clients;

may send a Floor Granted message;

if floor control queuing mode is used in the session, the Floor Granted message may be populated as follows:

may indicate the User ID of the MCPTT client in the floor request queue;

may indicate the SSRC of the MCPTT client in the floor request queue;

may indicate the position of the MCPTT client in the floor request queue;

may indicate the priority level of the MCPTT client in the in the floor request queue; and, may enter the 'O: pending granted' state (1123).

As to a state of 'O: pending request' (1103)

In this state the MCPTT client is waiting for a response to a Floor request message. The timer T11 (Request re-send) is running in this state.

In the FIG. 11, an operation for receiving RTP media (R: RTP media) (1101) is performed as follows:

Upon receiving RTP media packets, the floor participant:

may request the MCPTT client to render the RTP media packets; and, may remain in 'O: pending request' state (1103).

In the FIG. 11, an operation for receiving Floor Request Queue Status message (R: Floor Request Queue Status) is performed as follows;

Upon receiving Floor Request Queue Status message, the floor participant:

may update the queue status, if the User ID in the Floor Request Queue Status message matches its own User ID;

may notify the MCPTT user about the queue position;

may stop the timer T11 (Request re-send); and, may enter 'O: has no permission' state.

In the FIG. 11, an operation for receiving a floor deny message (R: Floor Deny) (1104) is performed as follows:

Upon receiving Floor Deny message, the floor participant:

may stop the timer T11 (Request re-send), if the User ID in the Floor Deny message matches its own User ID; and, may enter 'O: has no permission' state (1110).

In the FIG. 11, an operation for sending a floor release message (PTT button released) (1106) is performed as follows:

When an indication from the MCPTT user to release the pending request for the floor is received, the floor participant:

may send a Floor Release message towards other floor participants;

may stop the timer T11 (request re-send); and, may enter 'O: silence' state (1115).

In the FIG. 11, an operation for sending a floor taken message (Timer T11 fired N times and no media received) (1120) is performed as follows:

If no RTP media packet is received before the expiry of timer T11 (request re-send) N times, the floor participant:

may send Floor Taken message towards other floor participants; and, may enter 'O: has permission' state (1125).

In the FIG. 11, an operation for Timer T11 fired N times and Media received is (1104) performed as follows:

If RTP media packet is received before the expiry of timer T11 (Request re-send) N times, the floor participant: may enter 'O: has no permission' state (1110).

In the FIG. 11, an operation for receiving a floor granted message (R: Floor Granted) (1120) is performed as follows:

Upon receiving Floor Granted message, the floor participant:

may stop timer T13 (No RTP Media), if the User ID in the Floor Granted message matches its own User ID;

may stop the timer T11 (request re-send); and, may enter 'O: has permission state' (1125)

In the FIG. 11, an operation for a T11 (Request re-send) timer fired (T11 timer fired) (1101) is performed as follows:

On firing of timer T11 (Request re-send), the floor participant:

may send the Floor Request message to other floor participants;

may restart the timer T11 (Request re-send); and, may remain 'O: pending request' state (1103).

As to a state of 'O: pending granted' (1123)

In this state the MCPTT client is waiting for another client to take over the role of floor controller. The Timer T20 (Granted re-send) is running in this state.

In the FIG. 11, an operation for receiving RTP Media (R: RTP Media) is performed as follows:

Upon receiving the RTP media, the floor participant:

may stop timer T20 (Granted re-send);

may start timer T13 (no RTP media); and, may enter 'O: has no permission' state (1110).

In the FIG. 11, an operation for a T20 (Granted re-send) timer fired (T20 timer fired) is performed as follows:

On firing of timer T20 (Granted re-send), the floor participant:

may send again the Floor Granted message toward the other floor participants. The Floor Granted message may be populated as follows:

may indicate the User ID of the MCPTT client in the floor request queue;

may indicate the SSRC of the MCPTT client in the floor request queue;

may indicate the position of the MCPTT client in the floor request queue;

may indicate the priority level of the MCPTT client in the in the floor request queue;

may restart the timer T20 (Granted re-send); and, may remain 'O: pending granted' state (1123).

In the FIG. 11, an operation for a T20 (Granted re-send) timer fired N times with pending request(s) in the queue (T20 timer fired N times AND pending request(s) in queue) (1119) is performed as follows:

On the $N^{th}$ firing of timer T20 (Granted re-send) with more request(s) pending in the queue, the floor participant:

may reset the count of N;

may send the Floor Granted message for the next pending request in the queue towards other floor participants. The Floor Granted message may be populated as follows:

may indicate the User ID of the MCPTT client next in the floor request queue;

may indicate the SSRC of the MCPTT client next in the floor request queue;

may indicate the position of the MCPTT client next in the floor request queue;

may indicate the priority level of the MCPTT client next in the in the floor request queue;

may start the timer T20 (Granted re-send); and, may remain 'O: pending granted' state (1123).

In the FIG. 11, an operation for a T20 (Granted re-send) timer fired N times with no pending request in the queue (T20 timer fired N times AND no pending request in queue) is performed as follows:

On the Nth firing of timer T20 (Granted re-send) and no pending request in the queue, the floor participant:

may stop timer T20 (Granted re-send); and, may enter 'O: silence' state (1115).

As to "Any state" (1107)

This subclause describes the actions to be taken in all states defined for the basic state diagram with the exception of the 'Start-stop' state and the 'Releasing' state.

In the FIG. 11, an operation for receiving MCPTT call release (R: MCPTT call release) is performed as follows:

Upon receiving a MCPTT call release request from the application and signaling plane when the MCPTT call is going to be released or when the floor participant is leaving the MCPTT call, the floor participant:

may stop sending floor control messages towards other floor participants;

may request the MCPTT client to stop sending and receiving RTP media packets;

may release all resources including any running timers associated with the MCPTT call;

may terminate the instance of floor participant state transition diagram; and, may enter the 'Start-stop' state (1114).

In accordance with an aspect of the present disclosure, a detailed method of a floor participant state diagram with release state will be described.

The floor participant may support the state diagram and the state transitions specified in this subclause. When floor participant releases the permission sending media data, it may remain 'O: release' state.

Figure 12:
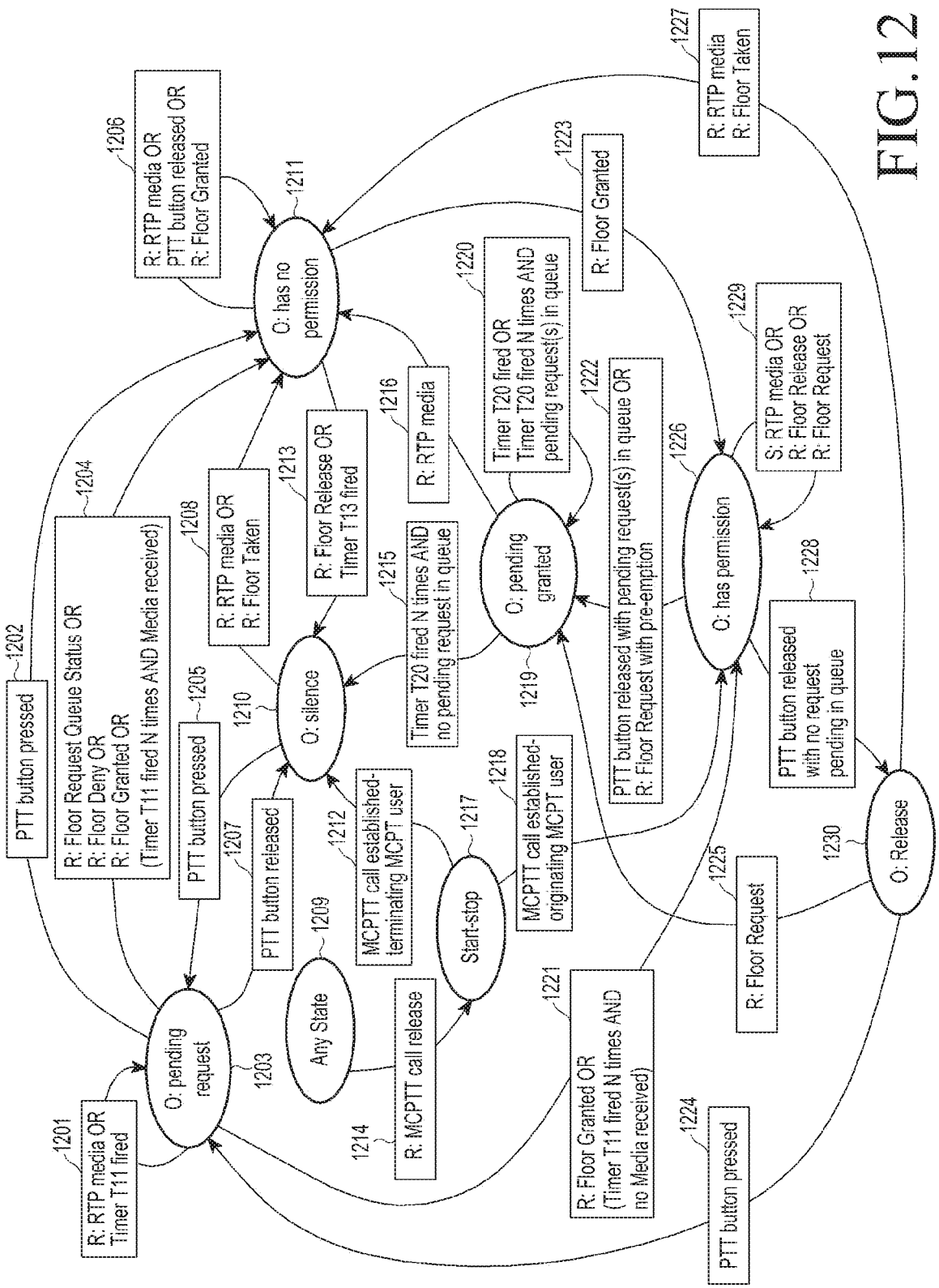
FIG. 12 shows a floor participant state diagram with release state.

FIG. 12 illustrates the floor participant state diagram with release state. State details are explained in the following subclauses.

If an RTP media packet or a floor control message arrives in a state where there is no specific procedure specified for the RTP media or the received floor control message, the floor participant may discard the floor control message or the RTP media packet and may remain in the current state.

NOTE: A badly formatted RTP packet or floor control message received in any state is ignored by the floor participant and does not cause any change of the current state.

Hereinafter, referring to the FIG. 12, operations in connection with the floor participant state diagram with release state will be described in detail.

As to a state of "Start-stop" (12174)

In this state no state machine exists.

In the FIG. 12, an operation for MCPTT call established—originating MCPTT user (1218) is performed as follows:

When a MCPTT call is established with session announcement including an explicit floor request, the originating floor participant:

may create an instance of a floor participant state transition diagram for basic operation state machine; and may send Floor Taken message towards other floor participants; and may enter the 'O: has permission' state (1226).

In the FIG. 12, an operation for MCPTT call established—terminating MCPTT user (1212) is performed as follows:

When a MCPTT call is established the terminating floor participant:

may create an instance of a floor participant state transition diagram for basic operation state machine; and may enter the 'O: silence' state (1210).

As to a state of 'O: silence' (1210)

In this state a none of the MCPTT clients in the session is acting as a floor control server.

In the FIG. 12, an operation for sending a floor request message (PTT button pressed) (1205) is performed as follows:

If the floor participant receives an indication from the MCPTT user to send media, the floor participant:

may send the Floor Request message to other floor participants; and may enter 'O: pending request' state (1203).

In the FIG. 12, an operation for receiving RTP media (R: RTP media) (1201) is performed as follows:

Upon receiving RTP media packets, the floor participant:

may provide a floor taken notification to the MCPTT user;

may start timer T13 (No RTP Media);

may request the MCPTT client to start rendering received RTP media packets; and, may enter 'O: has no permission' state (1211).

In the FIG. 12, an operation for receiving a floor taken message (R: Floor Taken) is performed as follows:

Upon receiving Floor Taken message, the floor participant:

may provide a floor taken notification to the MCPTT user;

may start timer T13 (No RTP Media); and, may enter 'O: has no permission' state (1211).

As to a state of 'O: has no permission' (1211)

In this state another floor participant does not have permission to send media.

In the FIG. 12, an operation for sending a floor request message (PTT button pressed) (1205) is performed as follows:

If the floor participant receives an indication from the user that the user wants to send media, the floor participant:

may send the Floor Request message to other clients; and, may enter 'O: pending request' state (1203).

In the FIG. 12, an operation for receiving a floor release message (R: Floor Release) is performed as follows:

When a Floor Release message is received, the floor participant:

may request the MCPTT client to stop rendering received RTP media packets;

may stop timer T13 (No RTP Media);

may enter 'O: silence' state (1210); and, may provide floor idle notification to the MCPTT user.

In the FIG. 12, an operation for a T13 (No RTP Media) timer fired (1213) is performed as follows:

On firing of T13 (No RTP Media) timer, the floor participant:

may request the MCPTT client to stop rendering received RTP media packets;

may enter 'O: silence' state (1210); and, may provide floor idle notification to the MCPTT user.

In the FIG. 12, an operation for receiving a floor granted message (R: Floor Granted) (1204) is performed as follows:

When a Floor Granted message is received (i.e. when a Floor Request is pending in the queue or a higher priority request is pending), if the User ID in the floor grant message matches its own User ID, the floor participant:

may request the MCPTT client to stop rendering received RTP media packets;

may stop timer T13 (No RTP Media);

may enter the state 'O: has permission (1226); and, may update the queue status and notify the MCPTT user.

Otherwise the floor participant:

may request the MCPTT client to stop rendering received RTP media packets;

may restart timer T13 (No RTP Media);

may enter the state 'O: has no permission' (1211); and, may update the queue status and notify the MCPTT user.

In the FIG. 12, an operation for receiving RTP media (R: RTP media) (1227) is performed as follows:

Upon receiving RTP media packets, the floor participant:

may request the MCPTT client to render the received RTP media packets;

may restart timer T13 (No RTP Media); and, may remain in 'O: has no permission' state (1211).

In the FIG. 12, an operation for sending a floor release message (PTT button released) (1206) is performed as follows:

Upon receiving an indication from the MCPTT user to release the pending request for the floor, the floor participant:

may send a Floor Release message towards other floor participants and, may remain in 'O: has no permission' state (1211).

As to a state of 'O: has permission' (1226)

In this state the MCPTT client is acting as a floor control server and has the permission to send media.

In the FIG. 12, an operation for sending RTP Media packets (S: RTP Media) (1227) is performed as follows:

Upon receiving encoded media from the user or if encoded media is already buffered the floor participant:

may request the MCPTT client to start sending RTP media packets towards other MCPTT clients; and, may remain in the 'O: has permission' state (1226).

In the FIG. 12, an operation for receiving a floor release message (R: Floor Release) (1204) is performed as follows:

Upon receiving a Floor Release message, the floor participant:

may remove the sender of the Floor Release message from the queue, if the User ID in the floor release message matches the queued request of User ID; and, may remain in the 'O: has permission' state (1226).

In the FIG. 12, an operation for receiving a floor request (R: Floor Request) (1204) is performed as follows:

When a Floor Request message is received in a session where queuing mode is not used, the floor participant:

may send the Floor Deny message including reason field toward the other floor participants; and, may remain in the 'O: has permission' state (1226).

When a Floor Request message is received in a session where queuing mode is used and if the priority level of the message is not higher, the floor participant:

may store the received Floor Request messages;

may send the Floor Request Queue Status message. The Floor Request Queue Status message may be populated as follows:

may indicate the User ID of the MCPTT client in the floor request queue;

may indicate the SSRC of the MCPTT client in the floor request queue;

may indicate the position of the MCPTT client in the floor request queue;

may indicate the priority level of the MCPTT client in the in the floor request queue; and, may remain in the 'O: has permission' state (1226).

In the FIG. 12, an operation for sending a floor release message (PTT button released with no pending request in queue) is performed as follows:

Upon receiving an indication from the MCPTT user to release permission to send RTP media, the floor participant:

may send a Floor Release message towards other floor participants, if no queued requests exist;

may enter the 'O: release' state (1230).

In the FIG. 12, an operation for sending a floor granted message (PTT button released with pending request(s) in queue) (1222) is performed as follows:

When no more encoded media is received from the user and if at least one Floor Request message is stored (i.e. queuing mode is used in the session), the floor participant:

may request the MCPTT client to stop sending RTP media packets towards other MCPTT clients;

may send the Floor Granted message toward the other floor participants. The Floor Granted message may be populated as follows:

may indicate the User ID of the MCPTT client in the floor request queue;

may indicate the SSRC of the MCPTT client in the floor request queue;

may indicate the position of the MCPTT client in the floor request queue;

may indicate the priority level of the MCPTT client in the in the floor request queue; and, may enter the 'O: pending granted' state (1219).

Receive Floor Request with pre-emption indication (R: Floor Request with pre-emption) (1222) will be described below.

When a Floor Request message is received with a pre-emption priority higher than priority of the floor participant, the floor participant:

1. shall request the MCPTT client to stop sending RTP media packets towards other MCPTT clients;

2. shall send a Floor Granted message;

3. if floor control queuing mode is used in the session, the Floor Granted message may be populated as follows:

may indicate the User ID of the MCPTT client in the floor request queue;

may indicate the SSRC of the MCPTT client in the floor request queue;

may indicate the position of the MCPTT client in the floor request queue;

may indicate the priority level of the MCPTT client in the in the floor request queue; and, 4. may enter the 'O: pending granted' state (1219).

State: 'O: pending request' (1203) will be described below.

In this state the MCPTT client is waiting for a response to a Floor request message.

The timer T11 (Request re-send) is running in this state.

Receive RTP media (R: RTP media) (1201) will be described below.

Upon receiving RTP media packets, the floor participant:
may request the MCPTT client to render the RTP media packets; and,
may remain in 'O: pending request' state (1203).

Receive Floor Request Queue Status message (R: Floor Request Queue Status) (1204) will be described below.

Upon receiving Floor Request Queue Status message, the floor participant:
may update the queue status, if the User ID in the Floor Request Queue Status message matches its own User ID;
may notify the MCPTT user about the queue position;
may stop the timer T11 (Request re-send); and,
may enter 'O: has no permission' state (1211).

Receive Floor Deny message (R: Floor Deny) (1204) will be described below.

Upon receiving Floor Deny message, the floor participant:
may stop the timer T11 (Request re-send), if the User ID in the Floor Deny message matches its own User ID; and,
may enter 'O: has no permission' state (1211).

Send Floor Release message (PTT button released) (1207) will be described below.

When an indication from the MCPTT user to release the pending request for the floor is received, the floor participant:
may send a Floor Release message towards other floor participants;
may stop the timer T11 (request re-send); and,
may enter 'O: silence' state (1210).

Send Floor Taken message (Timer T11 fired N times and no media received) (1221) will be described below.

If no RTP media packet is received before the expiry of timer T11 (request re-send) N times, the floor participant:
may send Floor Taken message towards other floor participants; and,
may enter 'O: has permission' state (1226)

Timer T11 fired N times and Media received (1204) will be described below.

If RTP media packet is received before the expiry of timer T11 (Request re-send) N times, the floor participant:
may enter 'O: has no permission' state (1211).

Receive Floor Granted message (R: Floor Granted) (1204) will be described below.

Upon receiving Floor Granted message, if the User ID in the Floor Granted message matches its own User ID, the floor participant:
may stop timer T13 (No RTP Media);
may stop the timer T11 (request re-send); and,
may enter 'O: has permission state' (1226);

Otherwise the floor participant:
may stop the timer T11 (request re-send); and,
may enter 'O: has no permission' state (1211).

T11 (Request re-send) timer fired (T11 timer fired) (1201) will be described below.

On firing of timer T11 (Request re-send), the floor participant:
may send the Floor Request message to other floor participants;
may restart the timer T11 (Request re-send); and,
may remain 'O: pending request' state (1203).

State: 'O: pending granted' (1219) will be described below.

In this state the MCPTT client is waiting for another client to take over the role of floor controller.
The Timer T20 (Granted re-send) is running in this state.

Receive RTP Media (R: RTP Media) (1216) will be described below.

Upon receiving the RTP media, the floor participant:
may stop timer T20 (Granted re-send);
may start timer T13 (no RTP media); and,
may enter 'O: has no permission' state (1211).

T20 (Granted re-send) timer fired (T20 timer fired) (1220) will be described below.

On firing of timer T20 (Granted re-send), the floor participant:
may send again the Floor Granted message toward the other floor participants. The Floor Granted message shall be populated as follows:
may indicate the User ID of the MCPTT client in the floor request queue;
may indicate the SSRC of the MCPTT client in the floor request queue;
may indicate the position of the MCPTT client in the floor request queue;
may indicate the priority level of the MCPTT client in the in the floor request queue;
may restart the timer T20 (Granted re-send); and,
may remain 'O: pending granted' state (1219).

T20 (Granted re-send) timer fired N times with pending request(s) in the queue (T20 timer fired N times AND pending request(s) in queue) (1220) will be described below.

On the $N^{th}$ firing of timer T20 (Granted re-send) with more request(s) pending in the queue, the floor participant:
may reset the count of N;
may send the Floor Granted message for the next pending request in the queue towards other floor participants. The Floor Granted message shall be populated as follows:
may indicate the User ID of the MCPTT client next in the floor request queue;
may indicate the SSRC of the MCPTT client next in the floor request queue;
may indicate the position of the MCPTT client next in the floor request queue;
may indicate the priority level of the MCPTT client next in the in the floor request queue;
may start the timer T20 (Granted re-send); and,
may remain 'O: pending granted' state (1219).

T20 (Granted re-send) timer fired N times with no pending request in the queue (T20 timer fired N times AND no pending request in queue) (1215) will be described below.

On the $N^{th}$ firing of timer T20 (Granted re-send) and no pending request in the queue, the floor participant:
may stop timer T20 (Granted re-send); and,
may enter 'O: silence' state (1210).

State: 'O: Release' (1230) will be described below.

In this state a MCPTT client in the session is acting as a floor control server before other MCPTT client has the permission to send media.

Send Floor Request message (PTT button pressed) (1224) will be described below.

If the floor participant receives an indication from the MCPTT user to send media, the floor participant:
may send the Floor Request message to other floor participants; and
may enter 'O: pending request' state (1203).

Receive RTP media (R: RTP media) (1227) will be described below.

Upon receiving RTP media packets, the floor participant:
may provide a floor taken notification to the MCPTT user;
may start timer T13 (No RTP Media);

may request the MCPTT client to start rendering received RTP media packets; and, may enter 'O: has no permission' state (1211).

Receive Floor Taken message (R: Floor Taken) (1227) will be described below.

Upon receiving Floor Taken message, the floor participant:

may provide a floor taken notification to the MCPTT user;

may start timer T13 (No RTP Media); and, may enter 'O: has no permission' state (1211).

Receive Floor Request (R: Floor Request) (1229) will be described below.

When a Floor Request message is received, the floor participant:

may send a Floor Granted message;

if floor control queuing mode is used in the session, the Floor Granted message shall be populated as follows:

may indicate the User ID of the MCPTT client in the floor request queue;

may indicate the SSRC of the MCPTT client in the floor request queue;

may should indicate the position of the MCPTT client in the floor request queue;

may indicate the priority level of the MCPTT client in the in the floor request queue; and, may enter the 'O: pending granted' state (1219).

State: Any state (1209) will be described below.

This subclause describes the actions to be taken in all states defined for the basic state diagram with the exception of the 'Start-stop' state and the 'Releasing' state.

Receive MCPTT call release (R: MCPTT call release) (1214) will be described below.

Upon receiving a MCPTT call release request from the application and signaling plane when the MCPTT call is going to be released or when the floor participant is leaving the MCPTT call, the floor participant:

may stop sending floor control messages towards other floor participants;

may request the MCPTT client to stop sending and receiving RTP media packets;

may release all resources including any running timers associated with the MCPTT call;

may terminate the instance of floor participant state transition diagram: and, may enter the 'Start-stop' state (1217)

Next, Floor participant state diagram with release and queued state will be described below.

The floor participant may support the state diagram and the state transitions specified in this subclause.

Floor participant state diagram with release and queued state according to an embodiment of the present disclosure will be described with reference to FIG. 13

The floor participant state diagram—basic operation according to an embodiment of the present disclosure will be described with reference to FIG. 13.

Figure 13:
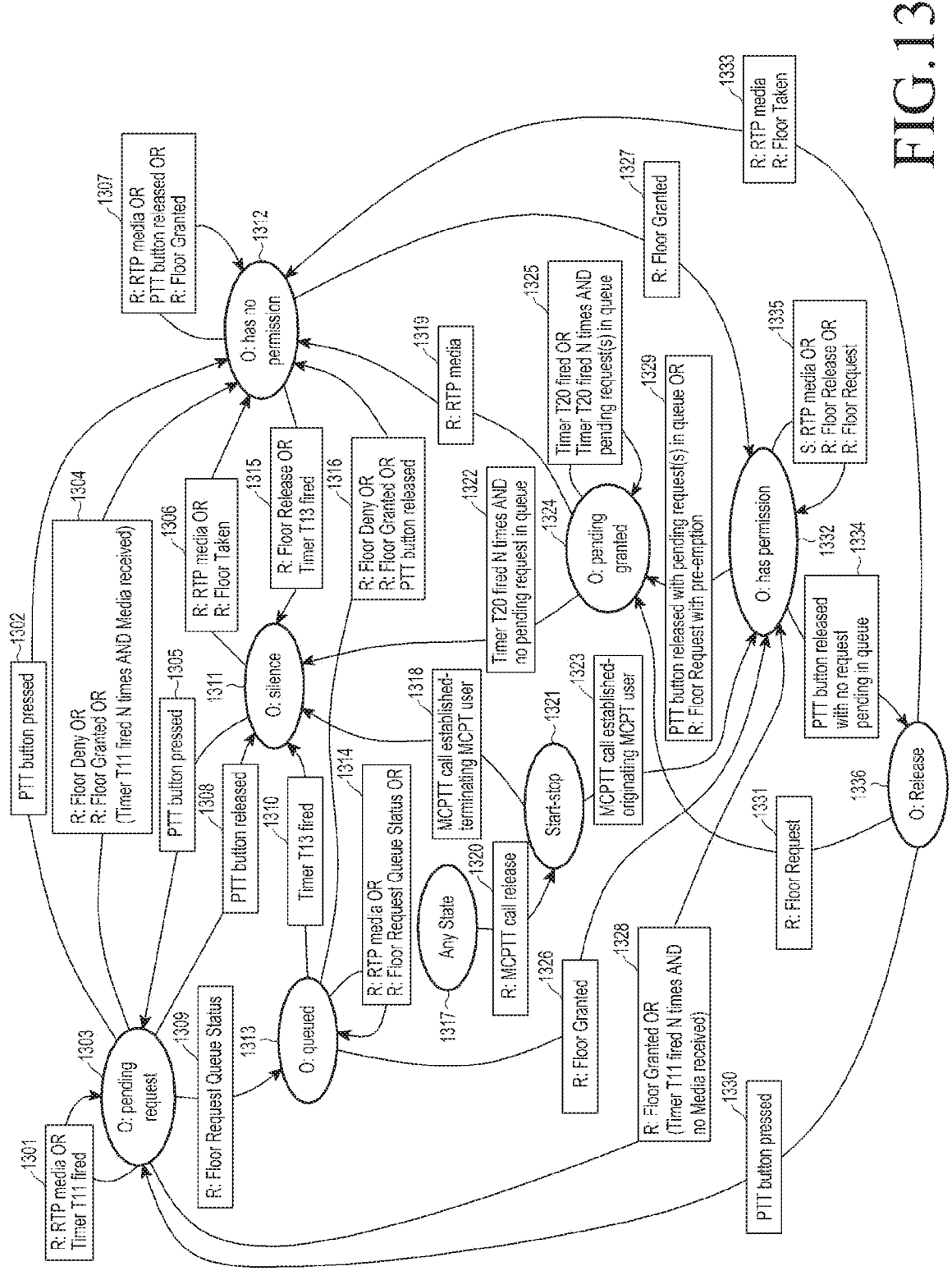
FIG. 13 shows a floor participant state diagram with release and queue state.

FIG. 13 illustrates Floor participant state diagram with release and queue state according to an embodiment of the present disclosure.

Referring to FIG. 13, State details are explained in the following subclauses.

If an RTP media packet or a floor control message arrives in a state where there is no specific procedure specified for the RTP media or the received floor control message, the floor participant shall discard the floor control message or the RTP media packet and shall remain in the current state.

NOTE: A badly formatted RTP packet or floor control message received in any state is ignored by the floor participant and does not cause any change of the current state.

State "Start-stop" (1321) will be described below

In this state no state machine exists.

MCPTT call established—originating MCPTT user (1323) will be described below When a MCPTT call is established with session announcement including an explicit floor request, the originating floor participant:

may create an instance of a floor participant state transition diagram for basic operation state machine; and 2. may send Floor Taken message towards other floor participants; and 3. may enter the 'O: has permission' state (1332).

MCPTT call established—terminating MCPTT user (1318) will be described below.

When a MCPTT call is established the terminating floor participant:

may create an instance of a floor participant state transition diagram for basic operation state machine; and may enter the 'O: silence' state (1311).

Next, State: 'O: silence' (1311) will be described below.

In this state a none of the MCPTT clients in the session is acting as a floor control server.

Send Floor Request message (PTT button pressed) (1305) will be described below.

If the floor participant receives an indication from the MCPTT user to send media, the floor participant:

may send the Floor Request message to other floor participants; and may enter 'O: pending request' state (1303).

Receive RTP media (R: RTP media) (1306) will be described below

Upon receiving RTP media packets, the floor participant:

may provide a floor taken notification to the MCPTT user;

may start timer T13 (No RTP Media);

may request the MCPTT client to start rendering received RTP media packets; and, may enter 'O: has no permission' state (1312).

Receive Floor Taken message (R: Floor Taken) (1306) will be described below.

Upon receiving Floor Taken message, the floor participant:

may provide a floor taken notification to the MCPTT user;

may start timer T13 (No RTP Media); and, may enter 'O: has no permission' state (1312).

State: 'O: has no permission' (1312) will be described below.

In this state another floor participant does not have permission to send media.

Sending Floor Request message (PTT button pressed) (1307) will be described below.

If the floor participant receives an indication from the user that the user wants to send media, the floor participant:

may send the Floor Request message to other clients; and, may enter 'O: pending request' state (1303).

Receive Floor Release message (R: Floor Release) (1315) will be described below.

When a Floor Release message is received, the floor participant:

may request the MCPTT client to stop rendering received RTP media packets;

may stop timer T13 (No RTP Media);

may enter 'O: silence' state (1311); and, may provide floor idle notification to the MCPTT user.

T13 (No RTP Media) timer fired (1315) will be described below.

On firing of T13 (No RTP Media) timer, the floor participant:

1. may request the MCPTT client to stop rendering received RTP media packets;

may enter 'O: silence' state (1311); and, may provide floor idle notification to the MCPTT user.

Receiving Floor Granted message (R: Floor Granted) (1307) will be described below.

When a Floor Granted message is received (i.e. when a Floor Request is pending in the queue or a higher priority request is pending), if the User ID in the floor grant message matches its own User ID, the floor participant:

may request the MCPTT client to stop rendering received RTP media packets;

may stop timer T13 (No RTP Media);

may enter the state 'O: has permission (1332); and, may update the queue status and notify the MCPTT user.

Otherwise the floor participant:

may request the MCPTT client to stop rendering received RTP media packets;

may restart timer T13 (No RTP Media);

may enter the state 'O: has no permission' (1312); and may update the queue status and notify the MCPTT user.

Receiving RTP media (R: RTP media) (1306) will be described below.

Upon receiving RTP media packets, the floor participant:

may request the MCPTT client to render the received RTP media packets;

may restart timer T13 (No RTP Media); and, may remain in 'O: has no permission' state (1312).

Send Floor Release message (PTT button released) (1307) will be described below.

Upon receiving an indication from the MCPTT user to release the pending request for the floor, the floor participant:

may send a Floor Release message towards other floor participants; and, may remain in 'O: has no permission' state (1312).

State: 'O: has permission' (1332) will be described below.

In this state the MCPTT client is acting as a floor control server and has the permission to send media.

Send RTP Media packets (S: RTP Media) (1335) will be described below.

Upon receiving encoded media from the user or if encoded media is already buffered the floor participant:

may request the MCPTT client to start sending RTP media packets towards other MCPTT clients; and, may remain in the 'O: has permission' state (1332).

Receive Floor Release message (R: Floor Release) (1335) will be described below.

Upon receiving a Floor Release message, the floor participant:

may remove the sender of the Floor Release message from the queue, if the User ID in the floor release message matches the queued request of User ID; and, may remain in the 'O: has permission' state (1332).

Receive Floor Request (R: Floor Request) (1335) will be described below.

When a Floor Request message is received in a session where queuing mode is not used, the floor participant:

may send the Floor Deny message including reason field toward the other floor participants; and, may remain in the 'O: has permission' state (1332).

When a Floor Request message is received in a session where queuing mode is used and if the priority level of the message is not higher, the floor participant:

may store the received Floor Request messages;

may send the Floor Request Queue Status message. The Floor Request Queue Status message shall be populated as follows:

may indicate the User ID of the MCPTT client in the floor request queue;

may indicate the SSRC of the MCPTT client in the floor request queue;

may indicate the position of the MCPTT client in the floor request queue;

may indicate the priority level of the MCPTT client in the in the floor request queue; and, may remain in the 'O: has permission' state (1332).

Send Floor Release message (PTT button released with no pending request in queue) (1334) will be described below.

Upon receiving an indication from the MCPTT user to release permission to send RTP media, the floor participant:

may send a Floor Release message towards other floor participants, if no queued requests exist;

may enter the 'O: release' state (1336).

Send Floor Granted message (PTT button released with pending request(s) in queue) (1329) will be described below.

When no more encoded media is received from the user and if at least one Floor Request message is stored (i.e. queuing mode is used in the session), the floor participant:

may request the MCPTT client to stop sending RTP media packets towards other MCPTT clients;

may send the Floor Granted message toward the other floor participants. The Floor Granted message shall be populated as follows:

may indicate the User ID of the MCPTT client in the floor request queue;

may indicate the SSRC of the MCPTT client in the floor request queue;

may indicate the position of the MCPTT client in the floor request queue;

may indicate the priority level of the MCPTT client in the in the floor request queue; and, may enter the 'O: pending granted' state (1324).

Receive Floor Request with pre-emption indication (R: Floor Request with pre-emption) (1329) will be described below.

When a Floor Request message is received with a pre-emption priority higher than priority of the floor participant, the floor participant:

may request the MCPTT client to stop sending RTP media packets towards other MCPTT clients;

may send a Floor Granted message;

if floor control queuing mode is used in the session, the Floor Granted message shall be populated as follows:

may indicate the User ID of the MCPTT client in the floor request queue;

may indicate the SSRC of the MCPTT client in the floor request queue;

may indicate the position of the MCPTT client in the floor request queue;

may indicate the priority level of the MCPTT client in the in the floor request queue; and, may enter the 'O: pending granted' state (1324).

State: 'O: pending request' (1303) will be described below.

In this state the MCPTT client is waiting for a response to a Floor request message.

The timer T11 (Request re-send) is running in this state.

Receive RTP media (R: RTP media) (1301) will be described below.

Upon receiving RTP media packets, the floor participant:
may request the MCPTT client to render the RTP media packets; and,
may remain in 'O: pending request' state (1303).

Receive Floor Request Queue Status message (R: Floor Request Queue Status) (1309) will be described below.

Upon receiving Floor Request Queue Status message, the floor participant:
may update the queue status, if the User ID in the Floor Request Queue Status message matches its own User ID;
may notify the MCPTT user about the queue position;
may stop the timer T11 (Request re-send); and,
may enter 'O: queued' state (1313).

Receive Floor Deny message (R: Floor Deny) (1304) will be described below.

Upon receiving Floor Deny message, the floor participant:
may stop the timer T11 (Request re-send), if the User ID in the Floor Deny message matches its own User ID; and,
may enter 'O: has no permission' state (1312).

Send Floor Release message (PTT button released) (1302) will be described below.

When an indication from the MCPTT user to release the pending request for the floor is received, the floor participant:
may send a Floor Release message towards other floor participants;
may stop the timer T11 (request re-send); and,
may enter 'O: silence' state (1311).

Send Floor Taken message (Timer T11 fired N times and no media received) (1328)

If no RTP media packet is received before the expiry of timer T11 (request re-send) N times, the floor participant:
may send Floor Taken message towards other floor participants; and,
may enter 'O: has permission' state (1332).

Timer T11 fired N times and Media received (1304) will be described below.

If RTP media packet is received before the expiry of timer T11 (Request re-send) N times, the floor participant:
may enter 'O: has no permission' state (1312).

Receive Floor Granted message (R: Floor Granted) (1328) will be described below.

Upon receiving Floor Granted message, if the User ID in the Floor Granted message matches its own User ID, the floor participant:
may stop timer T13 (No RTP Media);
may stop the timer T11 (request re-send); and
may enter 'O: has permission state' (1332);
Otherwise the floor participant:
may stop the timer T11 (request re-send); and
may enter 'O: has no permission' state (1312)

T11 (Request re-send) timer fired (T11 timer fired) (1301) will be described below.

On firing of timer T11 (Request re-send), the floor participant:
may send the Floor Request message to other floor participants;
may restart the timer T11 (Request re-send); and,
may remain 'O: pending request' state (1303).

State: 'O: pending granted' (1324) will be described below.

In this state the MCPTT client is waiting for another client to take over the role of floor controller.

The Timer T20 (Granted re-send) is running in this state.

Receive RTP Media (R: RTP Media) (1319) will be described below.

Upon receiving the RTP media, the floor participant:
may stop timer T20 (Granted re-send);
may start timer T13 (no RTP media); and,
may enter 'O: has no permission' state (1312)

T20 (Granted re-send) timer fired (T20 timer fired) (1325) will be described below.

On firing of timer T20 (Granted re-send), the floor participant:
may send again the Floor Granted message toward the other floor participants. The Floor Granted message shall be populated as follows:
may indicate the User ID of the MCPTT client in the floor request queue;
may indicate the SSRC of the MCPTT client in the floor request queue;
may indicate the position of the MCPTT client in the floor request queue;
may indicate the priority level of the MCPTT client in the in the floor request queue;
may restart the timer T20 (Granted re-send); and,
may remain 'O: pending granted' state (1324).

T20 (Granted re-send) timer fired N times with pending request(s) in the queue (T20 timer fired N times AND pending request(s) in queue) (1325) will be described below.

On the $N^{th}$ firing of timer T20 (Granted re-send) with more request(s) pending in the queue, the floor participant:
may reset the count of N;
may send the Floor Granted message for the next pending request in the queue towards other floor participants. The Floor Granted message shall be populated as follows:
may indicate the User ID of the MCPTT client next in the floor request queue;
may indicate the SSRC of the MCPTT client next in the floor request queue;
may indicate the position of the MCPTT client next in the floor request queue;
may indicate the priority level of the MCPTT client next in the in the floor request queue;
may start the timer T20 (Granted re-send); and,
may remain 'O: pending granted' state.

On the $N^{th}$ firing of timer T20 (Granted re-send) with more request(s) pending in the queue (T20 timer fired N times AND pending request(s) in queue) 1325, the floor participant may reset the count of N, and may send the Floor Granted message for the next pending request in the queue towards other floor participants. The Floor Granted message may be populated as follows. The Floor Granted message should indicate the User ID of the MCPTT client next in the floor request queue. The Floor Granted message should indicate the SSRC of the MCPTT client next in the floor request queue. The Floor Granted message should indicate the position of the MCPTT client next in the floor request queue. The Floor Granted message should indicate the priority level of the MCPTT client next in the in the floor request queue. Then, the floor participant may start the timer T20 (Granted re-send). Then, the floor participant may remain 'O: pending granted' state 1324.

On the $N^{th}$ firing of timer T20 (Granted re-send) and no pending request in the queue (T20 timer fired N times AND no pending request in queue) 1322, the floor participant may stop timer T20 (Granted re-send). Then, the floor participant may enter 'O: silence' state 1311.

A state 'O: Release' 1336 will be described below.

In this state, a MCPTT client in the session is acting as a floor control server before other MCPTT client has the permission to send media.

If the floor participant receives an indication from the MCPTT user to send media, the floor participant may send the Floor Request message (PTT button pressed) 1330 to other floor participants, and may enter 'O: pending request' state 1303.

Upon receiving RTP media packets (R: RTP media) 1333, the floor participant may provide a floor taken notification to the MCPTT user, may start timer T13 (No RTP Media), may request the MCPTT client to start rendering received RTP media packets, and then, may enter 'O: has no permission' state 1312.

Upon receiving Floor Taken message (R: Floor Taken) 1333, the floor participant may provide a floor taken notification to the MCPTT user, may start timer T13 (No RTP Media), and then, may enter 'O: has no permission' state 1312.

When a Floor Request message is received (R: Floor Request) 1331, the floor participant may send a Floor Granted message. If floor control queuing mode is used in the session, the Floor Granted message may be populated as follows. The Floor Granted message should indicate the User ID of the MCPTT client in the floor request queue. The Floor Granted message should indicate the SSRC of the MCPTT client in the floor request queue. The Floor Granted message should indicate the position of the MCPTT client in the floor request queue. The Floor Granted message should indicate the priority level of the MCPTT client in the in the floor request queue. Then, the floor participant may enter the 'O: pending granted' state 1324.

A State 'O: queued' 1313 will be described below.

In this state the MCPTT client is waiting for a response to a pending request.

Upon receiving RTP media packets (R: RTP media) 1314, the floor participant may request the MCPTT client to render the RTP media packets, and may then, remain in 'O: queued' state 1313.

Upon receiving Floor Request Queue Status message (R: Floor Request Queue Status) 1314, the floor participant may update the queue status, if the User ID in the Floor Request Queue Status message matches its own User ID, may notify the MCPTT user about the queue position, and then, may remain in 'O: queued' state 1313.

Upon receiving Floor Deny message (R: Floor Deny) 1316, the floor participant may enter 'O: has no permission' state 1312.

When an indication from the MCPTT user to release the pending request for the floor is received, the floor participant may send a Floor Release message (PTT button released) 1316 towards other floor participants, and then, may enter 'O: has no permission' state 1312.

Upon receiving Floor Granted message (R: Floor Granted) 1316, if the User ID in the Floor Granted message matches its own User ID, the floor participant may stop timer T13 (No RTP Media), and, may enter 'O: has permission state' 1332. Otherwise the floor participant may enter 'O: has no permission' state 1312.

On firing of T13 (No RTP Media) timer 1310, the floor participant may request the MCPTT client to stop rendering received RTP media packets, may enter 'O: silence' state 1311, and then, may provide floor idle notification to the MCPTT user.

A state 'Any state' 1317 will be described below.

The actions to be taken in all states defined for the basic state diagram with the exception of the 'Start-stop' state and the 'Releasing' state will be described below.

Upon receiving a MCPTT call release request (R: MCPTT call release) 1320 from the application and signaling plane when the MCPTT call is going to be released or when the floor participant is leaving the MCPTT call, the floor participant may stop sending floor control messages towards other floor participants, may request the MCPTT client to stop sending and receiving RTP media packets, may release all resources including any running timers associated with the MCPTT call, may terminate the instance of floor participant state transition diagram, and then, may enter the 'Start-stop' state 1321.

Figure 14:
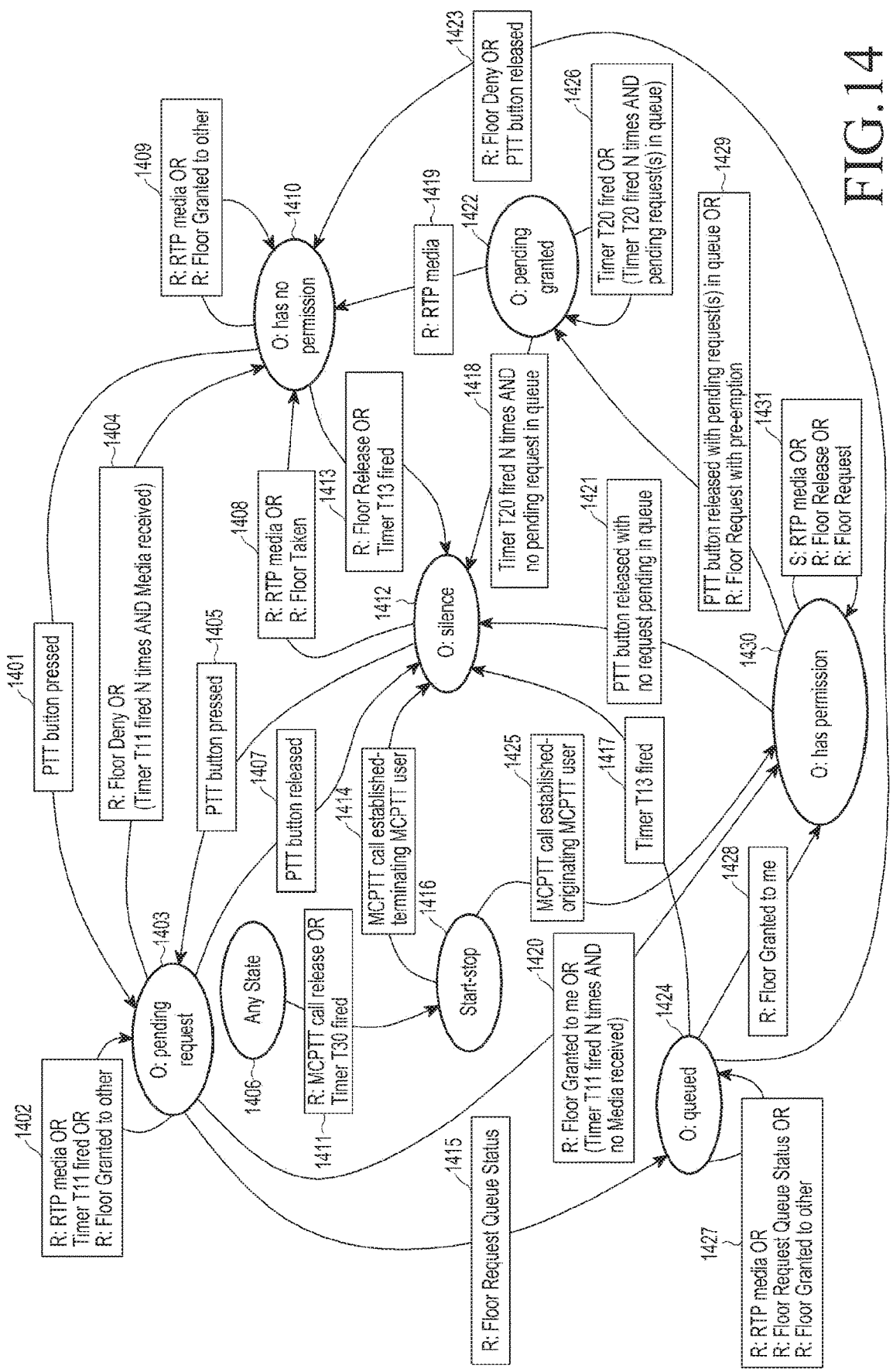
FIG. 14 shows a floor participant state diagram (queuing operation of automatic way).

FIG. 14 is a floor participant state diagram with queuing operation of automatic way. Referring to FIG. 14, The floor participant may support the state diagram and the state transitions specified below.

If an RTP media packet or a floor control message arrives in a state where there is no specific procedure specified for the RTP media or the received floor control message, the floor participant may discard the floor control message or the RTP media packet and may remain in the current state. A badly formatted RTP packet or floor control message received in any state is ignored by the floor participant and does not cause any change of the current state.

A State "Start-stop" 1416 will be described below.

In this state no state machine exists.

When a MCPTT call originating MCPTT user is established with session announcement including an explicit floor request 1425, the originating floor participant may create an instance of a floor participant state transition diagram for basic operation state machine, may send Floor Taken message towards other floor participants, may start timer T30 (During silence), and may enter the 'O: has permission' state 1430.

When a MCPTT call terminating MCPTT user is established 1414, the terminating floor participant may create an instance of a floor participant state transition diagram for basic operation state machine, may start timer T30 (During silence), and may enter the 'O: silence' state 1412.

A State: 'O: silence' 1412 will be described below.

In this state a none of the MCPTT clients in the session is acting as a floor control server.

If the floor participant receives an indication from the MCPTT user to send media, the floor participant may send the Floor Request message (PTT button pressed) to other floor participants 1405, may start the timer T11 (Request re-send), and may enter 'O: pending request' state 1402.

Upon receiving RTP media packets (R: RTP media) 1408, the floor participant may provide a floor taken notification to the MCPTT user, may restart timer T30 (During silence), may restart (or start, if not running already) timer T13 (No RTP Media), may request the MCPTT client to start rendering received RTP media packets; and then may enter 'O: has no permission' state 1410.

Upon receiving Floor Taken message (R: Floor Taken) 1408, the floor participant may provide a floor taken notification to the MCPTT user, may start timer T13 (No RTP Media), and then may enter 'O: has no permission' state 1410.

A State 'O: has no permission' 1409 will be described below.

In this state another floor participant does not have permission to send media.

If the floor participant receives an indication from the user that the user wants to send media, the floor participant may send the Floor Request message to other clients (PTT button pressed) 1401, may start the timer T11 (Request re-send), and may enter 'O: pending request' state 1403.

When a Floor Release message is received (R: Floor Release) 1413, the floor participant may request the MCPTT client to stop rendering received RTP media packets, may stop timer T13 (No RTP Media), may enter 'O: silence' state 1412, and may provide floor idle notification to the MCPTT user.

On firing of T13 (No RTP Media) timer 1413, the floor participant may request the MCPTT client to stop rendering received RTP media packets may enter 'O: silence' state 1412, and then, may provide floor idle notification to the MCPTT user.

When a Floor Granted message is received (R: Floor Granted to other) 1409 and if the User ID in the Floor Granted message dose not match its own User ID, the floor participant may request the MCPTT client to stop rendering received RTP media packets, and may remain in 'O: has no permission' state 1410.

Upon receiving RTP media packets (R: RTP media) 1409, the floor participant may request the MCPTT client to render the received RTP media packets, may restart timer T30 (During silence), may restart timer T13 (No RTP Media), and then, may remain in 'O: has no permission' state 1410.

A State 'O: has permission' 1430 will be described below.

In this state the MCPTT client is acting as a floor control server and has the permission to send media.

Upon receiving encoded media from the user or if encoded media is already buffered, the floor participant may request the MCPTT client to start sending RTP media packets towards other MCPTT clients (S: RTP Media) 1431, may restart timer T30 (During silence), and then, may remain in the 'O: has permission' state 1430.

Upon receiving a Floor Release message (R: Floor Release) 1431, the floor participant may remove the sender of the Floor Release message from the queue, if the User ID in the floor release message matches the queued request of User ID, and then, may remain in the 'O: has permission' state 1430.

When a Floor Request message is received (R: Floor Request) 1431 in a session where queuing mode is not used, the floor participant may send the Floor Deny message including reason field toward the other floor participants, and then, may remain in the 'O: has permission' state 1430.

When a Floor Request message is received (R: Floor Request) 1431 in a session where queuing mode is used and if the priority level of the message is not higher, the floor participant may store the received Floor Request messages, may send the Floor Request Queue Status message. The Floor Request Queue Status message may be populated as follows. The Floor Request Queue Status message should indicate the User ID of the MCPTT client in the floor request queue. The Floor Request Queue Status message should indicate the SSRC of the MCPTT client in the floor request queue. The Floor Request Queue Status message should indicate the position of the MCPTT client in the floor request queue. The Floor Request Queue Status message should indicate the priority level of the MCPTT client in the in the floor request queue. Then, floor participant may remain in the 'O: has permission' state 1431.

Upon receiving an indication from the MCPTT user to release permission to send RTP media, the floor participant may send a Floor Release message towards other floor participants, if no queued requests exist (PTT button released with no pending request in queue) 1421, and then, may enter the 'O: silence' state 1412.

When no more encoded media is received from the user and if at least one Floor Request message is stored (i.e. queuing mode is used in the session), the floor participant may request the MCPTT client to stop sending RTP media packets towards other MCPTT clients, and may send the Floor Granted message toward the other floor participants (PTT button released with pending request(s) in queue) 1429. The Floor Granted message may be populated as follows. The Floor Granted message should indicate the list of User IDs of the MCPTT clients in the floor request queue. The Floor Granted message should indicate the list of SSRCs of the MCPTT clients in the floor request queue. The Floor Granted message should indicate the list of positions of the MCPTT clients in the floor request queue. The Floor Granted message should indicate the list of priority levels of the MCPTT clients in the in the floor request queue. Then, the floor participant may start timer T20 (Granted re-send), and then, may enter the 'O: pending granted' state 1422.

When a Floor Request message is received with a pre-emption priority higher than priority of the floor participant (R: Floor Request with pre-emption) 1429, the floor participant may request the MCPTT client to stop sending RTP media packets towards other MCPTT clients, may send a Floor Granted message may start timer T20 (Granted re-send), and if floor control queuing mode is used in the session, the Floor Granted message may be populated as follows. The Floor Granted message should indicate the list of User IDs of the MCPTT clients in the floor request queue. The Floor Granted message should indicate the list of SSRCs of the MCPTT clients in the floor request queue. The Floor Granted message should indicate the list of positions of the MCPTT clients in the floor request queue. The Floor Granted message should indicate the list of priority levels of the MCPTT clients in the in the floor request queue. Then, the floor participant may enter the 'O: pending granted' state 1422.

A State 'O: pending request' 1403 will be described below.

In this state the MCPTT client is waiting for a response to a Floor request message.

Upon receiving RTP media packets (R: RTP media) 1402, the floor participant may request the MCPTT client to render the RTP media packets, may restart timer T30 (During silence), may restart (or start, if not running already) the timer T13 (No RTP media), and then, may remain in 'O: pending request' state 1403.

Upon receiving Floor Request Queue Status message (R: Floor Request Queue Status) 1415, the floor participant may update the queue status, if the User ID in the Floor Request Queue Status message matches its own User ID, may notify the MCPTT user about the queue position, may stop the timer T11 (Request re-send); and then, may enter 'O: queued' state 1424.

Upon receiving Floor Deny message (R: Floor Deny) 1404, the floor participant may stop the timer T11 (Request re-send), if the User ID in the Floor Deny message matches its own User ID, and then, may enter 'O: has no permission' state 1410.

When an indication from the MCPTT user to release the pending request for the floor is received, the floor participant may send a Floor Release message (PTT button released) 1405 towards other floor participants may stop the timer T11 (request re-send), and then, may enter 'O: silence' state 1412.

If no RTP media packet is received before the expiry of timer T11 (request re-send) N times (Timer T11 fired N times and no media received) 1420, the floor participant may send Floor Taken message towards other floor participants, may stop timer T13 (no RTP media), if running, and then, may enter 'O: has permission' state 1430.

If RTP media packet is received before the expiry of timer T11 (Request re-send) N times 1404, the floor participant may enter 'O: has no permission' state 1410.

Upon receiving Floor Granted message (R: Floor Granted to me) 1420, if the User ID in the Floor Granted message matches its own User ID, the floor participant may stop timer T13 (No RTP Media), if running, may stop the timer T11 (request re-send), and then, may enter 'O: has permission state' 1430.

Upon receiving Floor Granted message (R: Floor Granted to other) 1402 and if the User ID in the Floor Granted message does not match its own User ID, the floor participant may request the MCPTT client to stop rendering received RTP media packets, and then, may remain in 'O: pending request' state 1403.

On firing of timer T11 (Request re-send) (T11 timer fired) 1402, the floor participant may send the Floor Request message to other floor participants, may restart the timer T11 (Request re-send), and then may remain 'O: pending request' state 1403.

A State 'O: pending granted' 1422 will be described below.

In this state the MCPTT client is waiting for another client to take over the role of floor controller. The Timer T20 (Granted re-send) is running in this state.

Upon receiving the RTP media (R: RTP Media) 1419, the floor participant may request the MCPTT client to render the received RTP media packets, may stop timer T20 (Granted re-send), may restart timer T30 (During silence), may start timer T13 (no RTP media), and then, may enter 'O: has no permission' state 1410.

On firing of timer T20 (Granted re-send) (T20 timer fired) 1436, the floor participant may send again the Floor Granted message toward the other floor participants. The Floor Granted message may be populated as follows. The Floor Granted message should indicate the list of User IDs of the MCPTT clients in the floor request queue. The Floor Granted message should indicate the list of SSRCs of the MCPTT clients in the floor request queue. The Floor Granted message. The Floor Granted message should indicate the list of positions of the MCPTT clients in the floor request queue. The Floor Granted message should indicate the list of priority levels of the MCPTT clients in the in the floor request queue. Then, the floor participant may restart the timer T20 (Granted re-send), and, may remain 'O: pending granted' state 1422.

On the N$^{th}$ firing of timer T20 (Granted re-send) with more request(s) pending in the queue (T20 timer fired N times AND pending request(s) in queue) 1436, the floor participant may reset the count of N, and may send the Floor Granted message for the next pending request in the queue towards other floor participants. The Floor Granted message may be populated as follows. The Floor Granted message should indicate the list of User IDs of the MCPTT clients next in the floor request queue. The Floor Granted message should indicate the list of SSRCs of the MCPTT clients next in the floor request queue. The Floor Granted message should indicate the list of positions of the MCPTT clients next in the floor request queue. The Floor Granted message should indicate the list of priority levels of the MCPTT clients next in the in the floor request queue. Then, the floor participant may start the timer T20 (Granted re-send), and, may remain 'O: pending granted' state 1422.

On the N$^{th}$ firing of timer T20 (Granted re-send) and no pending request in the queue (T20 timer fired N times AND no pending request in queue) 1418, the floor participant may stop timer T20 (Granted re-send), and then, may enter 'O: silence' state 1412.

A State: 'O: queued' 1424 will be described below.

In this state the MCPTT client is waiting for a response to a pending request.

Upon receiving RTP media packets (R: RTP media) 1427, the floor participant may request the MCPTT client to render the RTP media packets, may restart timer T30 (During silence), may restart timer T13 (no RTP media), and then, may remain in 'O: queued' state 1424.

Upon receiving Floor Request Queue Status message (R: Floor Request Queue Status) 1427, the floor participant may update the queue status, if the User ID in the Floor Request Queue Status message matches its own User ID, may notify the MCPTT user about the queue position, and then, may remain in 'O: queued' state.

Upon receiving Floor Deny message (R: Floor Deny) 1423, the floor participant may enter 'O: has no permission' state 1410.

When an indication from the MCPTT user to release the pending request for the floor is received, the floor participant may send a Floor Release message towards other floor participants (PTT button released) 1423, and then, may enter 'O: has no permission' state 1410.

Upon receiving Floor Granted message (R: Floor Granted to me) 1428, if the User ID in the Floor Granted message matches its own User ID, the floor participant may request the MCPTT client to stop rendering received RTP media packets, may stop timer T13 (No RTP Media), and, may enter 'O: has permission' state 1430.

Upon receiving Floor Granted message (R: Floor Granted to other) 1427 and if the User ID in the Floor Granted message does not match its own User ID, the floor participant may request the MCPTT client to stop rendering received RTP media packets, and then, may remain in 'O: queued' state 1427.

On firing of T13 (No RTP Media) timer 1417, the floor participant may request the MCPTT client to stop rendering received RTP media packets, may enter 'O: silence' state 1412, and then, may provide floor idle notification to the MCPTT user.

On firing of T13 (No RTP Media) timer 1417, the floor participant may request the MCPTT client to stop rendering received RTP media packets, may enter 'O: silence' state, and then, may provide floor idle notification to the MCPTT user.

As to State: Any state is disclosed.

Figure 15:
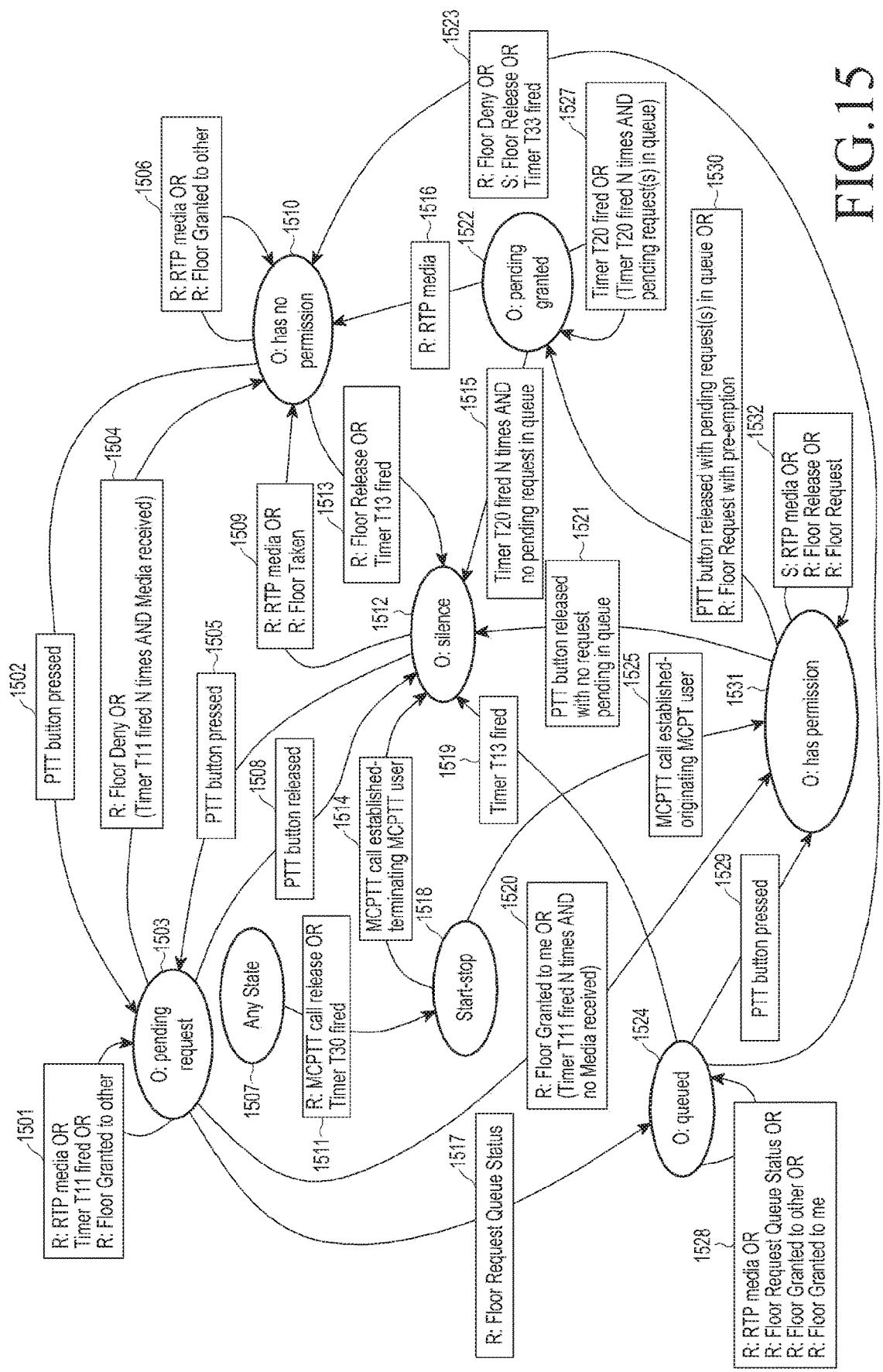
FIG. 15 shows a floor participant state diagram (queuing operation of manual way).

FIG. 15 show the floor participant state diagram.

This subclause describes the actions to be taken in all states defined for the basic state diagram with the exception of the 'Start-stop' state (1518).

Receive MCPTT call release (R: MCPTT call release) (1511) Upon receiving a MCPTT call release request from the application and signaling plane when the MCPTT call is going to be released or when the floor participant is leaving the MCPTT call, the floor participant: may stop sending floor control messages towards other floor participants; may request the MCPTT client to stop sending and receiving RTP media packets; may release all resources including any running timers associated with the MCPTT call; may terminate the instance of floor participant state transition diagram; and, may enter the 'Start-stop' state (1518).

As to Floor participant state diagram with queuing operation of manual way

The floor participant may support the state diagram and the state transitions specified in this subclause.

State details are explained in the following subclauses.

If an RTP media packet or a floor control message arrives in a state where there is no specific procedure specified for the RTP media or the received floor control message, the floor participant may discard the floor control message or the RTP media packet and may remain in the current state.

A badly formatted RTP packet or floor control message received in any state is ignored by the floor participant and does not cause any change of the current state.

As to State "Start-stop" (1518)

In this state no state machine exists.

As to MCPTT call established—originating MCPTT user (1525)

When a MCPTT call is established with session announcement including an explicit floor request, the originating floor participant:
  may create an instance of a floor participant state transition diagram for basic operation state machine;
  may send Floor Taken message towards other floor participants;
  may start timer T30 (During silence); and,
  may enter 'O: has permission' state (1531).

As to MCPTT call established—terminating MCPTT user (1514)

When a MCPTT call is established the terminating floor participant:
  may create an instance of a floor participant state transition diagram for basic operation state machine;
  may start timer T30 (During silence); and,
  may enter 'O: silence' state (1512).

As to State: 'O: silence' (1512)

In this state a none of the MCPTT clients in the session is acting as a floor control server.

As to Send Floor Request message (PTT button pressed) (1508)

If the floor participant receives an indication from the MCPTT user to send media, the floor participant:
  may send the Floor Request message to other floor participants;
  may start the timer T11 (Request re-send); and,
  may enter 'O: pending request' state (1503).

As to Receive RTP media (R: RTP media) (1501)

Upon receiving RTP media packets, the floor participant:
  may provide a floor taken notification to the MCPTT user;
  may restart timer T30 (During silence);
  may restart (or start, if not running already) timer T13 (No RTP Media);
  may request the MCPTT client to start rendering received RTP media packets; and,
  may enter 'O: has no permission' state (1510).

As to Receive Floor Taken message (R: Floor Taken) (1509)

Upon receiving Floor Taken message, the floor participant:
  may provide a floor taken notification to the MCPTT user;
  may start timer T13 (No RTP Media); and,
  may enter 'O: has no permission' state (1510).

As to State: 'O: has no permission' (1510)

In this state another floor participant does not have permission to send media.

As to Sending Floor Request message (PTT button pressed)(1502)

If the floor participant receives an indication from the user that the user wants to send media, the floor participant:
  may send the Floor Request message to other clients;
  may start the timer T11 (Request re-send); and,
  may enter 'O: pending request' state (1503).

As to Receive Floor Release message (R: Floor Release) (1513)

When a Floor Release message is received, the floor participant:
  may request the MCPTT client to stop rendering received RTP media packets;
  may stop timer T13 (No RTP Media);
  may enter 'O: silence' state; and,
  may provide floor idle notification to the MCPTT user.

As to T13 (No RTP Media) timer fired (1513)

On firing of T13 (No RTP Media) timer, the floor participant:
  may request the MCPTT client to stop rendering received RTP media packets;
  may enter 'O: silence' state (1512); and,
  may provide floor idle notification to the MCPTT user.

As to Receiving Floor Granted message (R: Floor Granted to other) (1506)

When a Floor Granted message is received and if the User ID in the Floor Granted message dosen't match its own User ID, the floor participant:
  may request the MCPTT client to stop rendering received RTP media packets; and,
  may remain in 'O: has permission' state.

As to Receiving RTP media (R: RTP media) (1506)

Upon receiving RTP media packets, the floor participant:
  may request the MCPTT client to render the received RTP media packets;
  may restart timer T30 (During silence);
  may restart timer T13 (No RTP Media); and,
  may remain in 'O: has no permission' state (1510).

As to State: 'O: has permission' (1531)

In this state the MCPTT client is acting as a floor control server and has the permission to send media.

As to Send RTP Media packets (S: RTP Media) (1532)

Upon receiving encoded media from the user or if encoded media is already buffered the floor participant:
  may request the MCPTT client to start sending RTP media packets towards other MCPTT clients;
  may restart timer T30 (During silence); and,
  may remain in 'O: has permission' state (1531).

As to Receive Floor Release message (R: Floor Release) (1532)

Upon receiving a Floor Release message, the floor participant:
  may remove the sender of the Floor Release message from the queue, if the User ID in the floor release message matches the queued request of User ID; and,
  may remain in 'O: has permission' state (1531).

As to Receive Floor Request (R: Floor Request) (1532)

When a Floor Request message is received in a session where queuing mode is not used, the floor participant:
  may send the Floor Deny message including reason field toward the other floor participants; and,
  may remain in 'O: has permission' state (1531).

When a Floor Request message is received in a session where queuing mode is used and if the priority level of the message is not higher, the floor participant:

may store the received Floor Request messages;
may send the Floor Request Queue Status message. The Floor Request Queue Status message may be populated as follows:
may indicate the User ID of the MCPTT client in the floor request queue;
may indicate the SSRC of the MCPTT client in the floor request queue;
may indicate the position of the MCPTT client in the floor request queue;
may indicate the priority level of the MCPTT client in the in the floor request queue; and,
may remain in 'O: has permission' state (1531).

As to Send Floor Release message (PTT button released with no pending request in queue) (1521)
Upon receiving an indication from the MCPTT user to release permission to send RTP media, the floor participant:
may send a Floor Release message towards other floor participants, if no queued requests exist; and,
may enter 'O: silence' state (1512).

As to Send Floor Granted message (PTT button released with pending request(s) in queue) (1530)
When no more encoded media is received from the user and if at least one Floor Request message is stored (i.e. queuing mode is used in the session), the floor participant:
may request the MCPTT client to stop sending RTP media packets towards other MCPTT clients;
may send the Floor Granted message toward the other floor participants.

The Floor Granted message may be populated as follows:
may indicate the list of User IDs of the MCPTT clients in the floor request queue;
may indicate the list of SSRCs of the MCPTT clients in the floor request queue;
may indicate the list of positions of the MCPTT clients in the floor request queue;
may indicate the list of priority levels of the MCPTT clients in the in the floor request queue;
may start timer T20 (Granted re-send); and,
may enter 'O: pending granted' state (1522).

As to Receive Floor Request with pre-emption indication (R: Floor Request with pre-emption) (1530)
When a Floor Request message is received with a pre-emption priority higher than priority of the floor participant, the floor participant:
may request the MCPTT client to stop sending RTP media packets towards other MCPTT clients;
may send a Floor Granted message;
may start timer T20 (Granted re-send);
if floor control queuing mode is used in the session, the Floor Granted message may be populated as follows:
may indicate the list of User IDs of the MCPTT clients in the floor request queue;
may indicate the list of SSRCs of the MCPTT clients in the floor request queue;
may indicate the list of positions of the MCPTT clients in the floor request queue;
may indicate the list of priority levels of the MCPTT clients in the in the floor request queue; and,
may enter 'O: pending granted' state (1522).

As to State: 'O: pending request' (1503)
In this state the MCPTT client is waiting for a response to a Floor request message.

As to Receive RTP media (R: RTP media) (1501)
Upon receiving RTP media packets, the floor participant:
may request the MCPTT client to render the RTP media packets;

may restart timer T30 (During silence);
may restart (or start, if not running already) the timer T13 (No RTP media); and,
may remain in 'O: pending request' state (1503).

As to Receive Floor Request Queue Status message (R: Floor Request Queue Status) (1517)
Upon receiving Floor Request Queue Status message, the floor participant:
may update the queue status, if the User ID in the Floor Request Queue Status message matches its own User ID;
may notify the MCPTT user about the queue position;
may stop the timer T11 (Request re-send); and,
may enter 'O: queued' state (1524).

As to Receive Floor Deny message (R: Floor Deny) (1504)
Upon receiving Floor Deny message, the floor participant:
may stop the timer T11 (Request re-send), if the User ID in the Floor Deny message matches its own User ID; and,
may enter 'O: has no permission' state (1510).

As to Send Floor Release message (PTT button released) (1508)
When an indication from the MCPTT user to release the pending request for the floor is received, the floor participant:
may send a Floor Release message towards other floor participants;
may stop the timer T11 (request re-send); and,
may enter 'O: silence' state (1512).

As to Send Floor Taken message (Timer T11 fired N times and no media received) (1520)
If no RTP media packet is received before the expiry of timer T11 (request re-send) N times, the floor participant:
may send Floor Taken message towards other floor participants;
may stop timer T13 (no RTP media), if running; and,
may enter 'O: has permission' state (1531).

As to Receive Floor Granted message (R: Floor Granted to me) (1520)
Upon receiving Floor Granted message and if the User ID in the Floor Granted message matches its own User ID, the floor participant:
may request the MCPTT client to stop rendering received RTP media packets;
may stop timer T13 (No RTP Media), if running;
may stop the timer T11 (request re-send); and,
may enter 'O: has permission' state (1531).

As to Receive Floor Granted message (R: Floor Granted to other) (1501)
Upon receiving Floor Granted message and if the User ID in the Floor Granted message does not match its own User ID, the floor participant:
may request the MCPTT client to stop rendering received RTP media packets; and,
may remain in 'O: pending request' state (1503).

As to T11 (Request re-send) timer fired (T11 timer fired) (1501)
On firing of timer T11 (Request re-send), the floor participant:
may send the Floor Request message to other floor participants;
may restart the timer T11 (Request re-send); and,
may remain in 'O: pending request' state (1503).

As to Timer T11 fired N times and Media received (1504)
If RTP media packet is received before the expiry of timer T11 (Request re-send) N times, the floor participant:
may enter 'O: has no permission' state (1510).

As to State: 'O: pending granted' (1522)

In this state the MCPTT client is waiting for another client to take over the role of floor controller.

The Timer T20 (Granted re-send) is running in this state.

As to Receive RTP Media (R: RTP Media) (1516)

Upon receiving the RTP media, the floor participant:

may request the MCPTT client to render the received RTP media packets;

may stop timer T20 (Granted re-send);

may restart timer T30 (During silence);

may start timer T13 (no RTP media); and, may enter 'O: has no permission' state (1510).

As to T20 (Granted re-send) timer fired (T20 timer fired) (1527)

On firing of timer T20 (Granted re-send), the floor participant:

may send again the Floor Granted message toward the other floor participants. The Floor Granted message may be populated as follows:

may indicate the list of User IDs of the MCPTT clients in the floor request queue;

may indicate the list of SSRCs of the MCPTT clients in the floor request queue;

may indicate the list of positions of the MCPTT clients in the floor request queue;

may indicate the list of priority levels of the MCPTT clients in the in the floor request queue;

may restart the timer T20 (Granted re-send); and, may remain in 'O: pending granted' state (1522).

As to T20 (Granted re-send) timer fired N times (1527)

On the N$^{th}$ firing of timer T20 (Granted re-send) with more request(s) pending in the queue, the floor participant:

may reset the count of N;

may start the timer T33 (Pending user action); and, may remain in 'O: pending granted' state (1522).

As to T33 (Pending user action) timer fired with no pending request in the queue (T33 timer fired AND no pending request in queue) (1515)

On the firing of timer T33 (Pending user action) with no pending request in the queue, the floor participant:

may send a Floor Release message towards other floor participants; and, may enter 'O: silence' state (1512).

As to T33 (Pending user action) timer fired with pending request(s) in the queue (T33 timer fired AND pending request(s) in queue)

On the firing of timer T33 (Pending user action) with more request(s) pending in the queue, the floor participant:

may send the Floor Granted message for the next pending request in the queue towards other floor participants. The Floor Granted message may be populated as follows:

may indicate the list of User IDs of the MCPTT clients next in the floor request queue;

may indicate the list of SSRCs of the MCPTT clients next in the floor request queue;

may indicate the list of positions of the MCPTT clients next in the floor request queue;

may indicate the list of priority levels of the MCPTT clients next in the in the floor request queue;

may start the timer T20 (Granted re-send); and, may remain in 'O: pending granted' state (1522).

As to State: 'O: queued (1524)

In this state the MCPTT client is waiting for a response to a pending request.

As to Receive RTP media (R: RTP media) (1528)

Upon receiving RTP media packets, the floor participant:

16. may request the MCPTT client to render the RTP media packets;

17. may restart timer T30 (During silence);

18. may restart timer T13 (no RTP media); and, 19. may remain in 'O: queued' state (1524).

As to Receive Floor Request Queue Status message (R: Floor Request Queue Status) (1528)

Upon receiving Floor Request Queue Status message, the floor participant:

may update the queue status, if the User ID in the Floor Request Queue Status message matches its own User ID;

may notify the MCPTT user about the queue position; and, may remain in 'O: queued' state (1524).

As to Receive Floor Deny message (R: Floor Deny) (1523)

Upon receiving Floor Deny message, the floor participant:

may enter 'O: has no permission' state (1510).

As to Send Floor Release message (S: Floor Release) (1523)

When an indication from the MCPTT user to release the pending request for the floor is received, the floor participant:

may send a Floor Release message towards other floor participants; and, may enter 'O: has no permission' state (1510).

As to Receiving Floor Granted message (R: Floor Granted to me) (1528)

Upon receiving Floor Granted message and if the User ID in the Floor Granted message matches its own User ID, the floor participant:

may request the MCPTT client to stop rendering received RTP media packets;

may start timer T33 (Pending user action); and, may remain in 'O: queued' state (1524).

As to T33 (Pending user action) timer fired (1523)

1. may start timer T30 (During silence); and, may enter 'O: has no permission' state (1510).

As to PTT button pressed (1529)

If the floor participant receives an indication from the user that the user wants to send media, the floor participant:

may stop the timer T33 (Pending user action); and, may enter 'O: has permission' state (1531).

As to Receive Floor Granted message (R: Floor Granted to other) (1528)

Upon receiving Floor Granted message and if the User ID in the Floor Granted message does not match its own User ID, the floor participant:

may request the MCPTT client to stop rendering received RTP media packets; and, may stop timer T30 (During silence); and;

may remain in 'O: queued' state (1524).

As to T13 (No RTP Media) timer fired (1519)

On firing of T13 (No RTP Media) timer, the floor participant:

may request the MCPTT client to stop rendering received RTP media packets;

may enter 'O: silence' state (1512); and, may provide floor idle notification to the MCPTT user.

As to State: Any state (1507)

This subclause describes the actions to be taken in all states defined for the basic state diagram with the exception of the 'Start-stop' state.

As to Receive MCPTT call release (R: MCPTT call release) (1511)

Upon receiving a MCPTT call release request from the application and signaling plane when the MCPTT call is going to be released or firing of timer T30 (During silence), the floor participant:

may stop sending floor control messages towards other floor participants;

may request the MCPTT client to stop sending and receiving RTP media packets;

may release all resources including any running timers associated with the MCPTT call;

may terminate the instance of floor participant state transition diagram; and, may enter 'Start-stop' state (1518).

As to Floor participant state diagram with resolving race condition of multiple floor request The floor participant may support the state diagram and the state transitions specified in this subclause.

Figure 16:
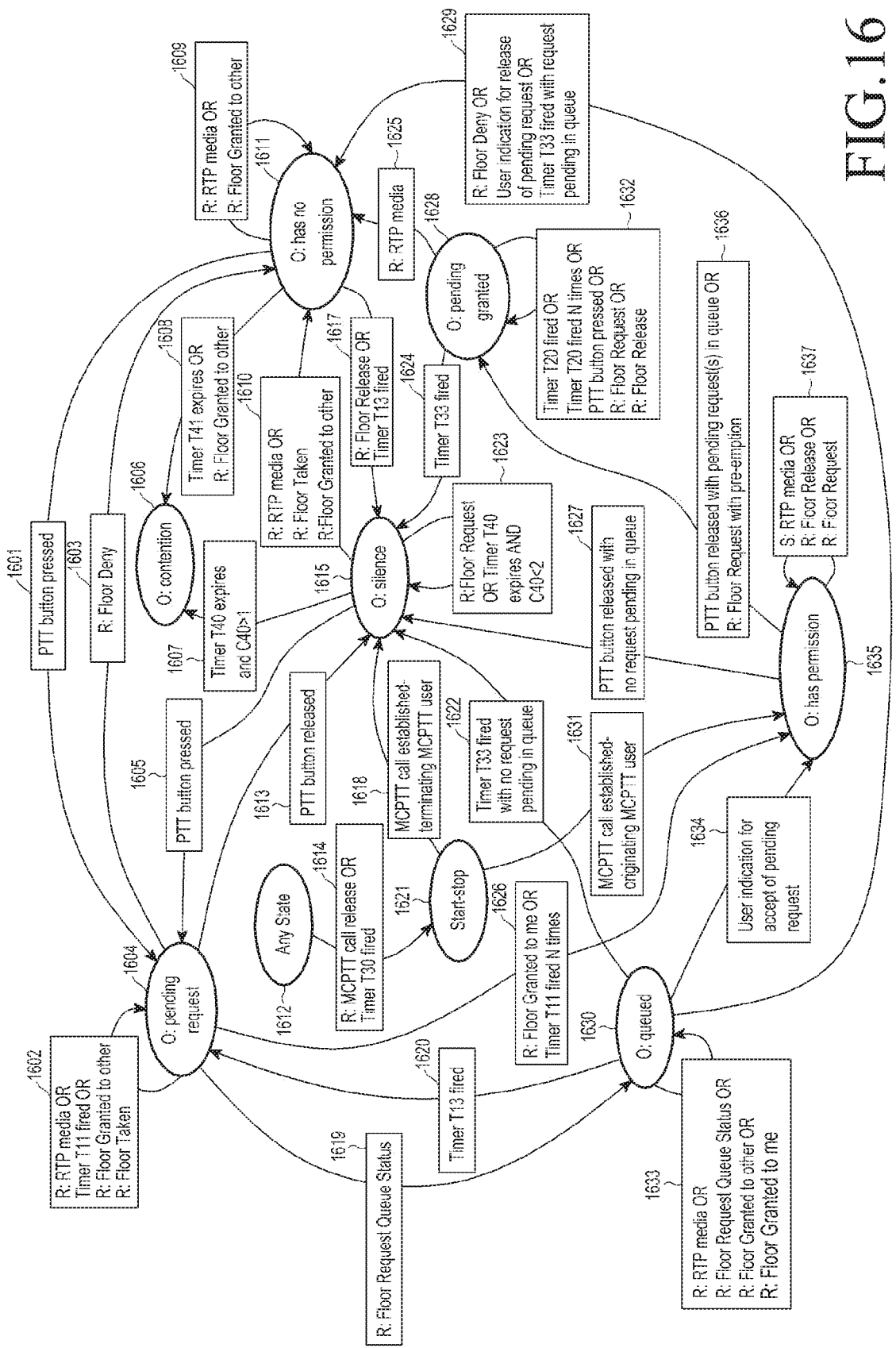
FIG. 16 shows a floor participant state diagram (basic operation).

FIG. 16 show the 'Floor participant state diagram—basic operation'.

State details are explained in the following subclauses.

If an RTP media packet or a floor control message arrives in a state where there is no specific procedure specified for the RTP media or the received floor control message, the floor participant shall discard the floor control message or the RTP media packet and shall remain in the current state.

NOTE: A badly formatted RTP packet or floor control message received in any state is ignored by the floor participant and does not cause any change of the current state.

State "Start-stop" (1621) will be described below.

In this state no state machine exists.

MCPTT call established—originating MCPTT user (1631) will be described below.

When an MCPTT call is established with session announcement including an explicit floor request, the originating floor participant: shall create an instance of a floor participant state transition diagram for basic operation state machine;

shall send Floor Taken message towards other floor participants;

shall start timer T30 (During silence); and shall enter 'O: has permission' state (1635).

MCPTT call established—terminating MCPTT user (1618) will be described below.

When an MCPTT call is established the terminating floor participant:

shall create an instance of a floor participant state transition diagram for basic operation state machine;

shall start timer T30 (During silence); and shall enter 'O: silence' state (1615).

State: 'O: silence' (1615) will be described below.

In this state a none of the MCPTT clients in the session is acting as a floor control server.

Send Floor Request message (PTT button pressed) (1605) will be described below.

If the floor participant receives an indication from the MCPTT user to send media, the floor participant:

shall send the Floor Request message to other floor participants;

shall start the timer T11 (Request re-send); and shall enter 'O: pending request' state (1604).

Receive RTP media (R: RTP media) (1610) will be described below.

Upon receiving RTP media packets, the floor participant:

may provide a floor taken notification to the MCPTT user;

shall restart timer T30 (During silence);

shall restart (or start, if not running already) timer T13 (No RTP Media);

shall request the MCPTT client to start rendering received RTP media packets; and shall enter 'O: has no permission' state (1611).

Receive Floor Taken message (R: Floor Taken) (1610) will be described below.

Upon receiving Floor Taken message, the floor participant:

may provide a floor taken notification to the MCPTT user;

shall start timer T13 (No RTP Media); and

Shall enter 'O: has no permission' state (1611).

Receive Floor Granted message (R: Floor Granted to other) (1610) will be described below.

Upon receiving Floor Granted message and if the User ID in the Floor Granted message does not match its own User ID, the floor participant:

may provide a floor taken notification to the MCPTT user;

shall start timer T13 (No RTP Media); and, shall enter 'O: has no permission' state (1611).

Receive Floor Request message (R: Floor request) (1623) will be described below.

Upon receiving Floor Request message, the floor participant:

shall start timer T40 (request buffer);

shall increment the counter C40 by 1;

shall buffer the received request; and shall remain in 'O: silence' state (1615).

Timer T40 (request buffer) expires AND counter C40<2 (1623) will be described below.

Upon expiry of timer T40 while number of received Floor Request messages is less than 2, the floor participant:

shall reset the counter C40;

shall discard the buffered Floor Request messages; and, shall remain in 'O: silence' state (1615).

Timer T40 (request buffer) expires AND counter C40>1 (1607) will be described below.

Upon expiry of timer T40 while number of received Floor Request messages is more than 1, the floor participant:

shall reset the counter C40;

shall start timer T41 (back-off) with a random value between [a, b]; and, shall enter 'O: contention' state (1606).

State: 'O: has no permission' (1611) will be described below.

In this state another floor participant does not have permission to send media.

Sending Floor Request message (PTT button pressed) (1601) will be described below.

If the floor participant receives an indication from the user that the user wants to send media, the floor participant:

shall send the Floor Request message to other clients. The Floor Request message shall be populated as follows:

shall start the timer T11 (Request re-send); and shall enter 'O: pending request' state (1604).

Receive Floor Release message (R: Floor Release) (1617) will be described below.

When a Floor Release message is received and if the SSRC in the Floor Release message matches the SSRC in the last RTP media packet received, the floor participant:

shall request the MCPTT client to stop rendering received RTP media packets;

shall stop timer T13 (No RTP Media);

shall enter 'O: silence' state (1615); and may provide floor idle notification to the MCPTT user.

T13 (No RTP Media) timer fired (1617) will be described below.

On firing of T13 (No RTP Media) timer, the floor participant:

shall request the MCPTT client to stop rendering received RTP media packets;

shall enter 'O: silence' state (1615); and may provide floor idle notification to the MCPTT user.

Receiving Floor Granted message (R: Floor Granted) (1609) will be described below.

When a Floor Granted message is received and if the User ID in the Floor Granted message doesn't match its own User ID, the floor participant:

shall remain in the 'O: has no permission' state (1611).

Receiving Floor Deny message (R: Floor Granted)

When a Floor Deny message is received (i.e. after sending a Floor Request in this state), the floor control client:

shall stay in the state 'O: has no permission' (1611).

Receiving RTP media (R: RTP media) (1609) will be described below.

Upon receiving RTP media packets, the floor participant:

shall request the MCPTT client to render the received RTP media packets;

shall restart timer T30 (During silence);

shall restart timer T13 (No RTP Media); and shall remain in 'O: has no permission' state (1611).

State: 'O: has permission' (1635) will be described below.

In this state the MCPTT client is acting as a floor control server and has the permission to send media.

Send RTP Media packets (S: RTP Media) (1637) will be described below.

Upon receiving encoded media from the user or if encoded media is already buffered the floor participant:

shall request the MCPTT client to start sending RTP media packets towards other MCPTT clients;

shall restart timer T30 (During silence); and shall remain in the current state.

Receive Floor Release message (R: Floor Release) (1637) will be described below.

Upon receiving a Floor Release message, the floor participant:

shall remove the sender of the Floor Release message from the queue, if the User ID in the floor release message matches the queued request of User ID; and shall remain in 'O: has permission' state (1635).

Receive Floor Request (R: Floor Request) (1637) will be described below.

When a Floor Request message is received in a session where queuing mode is not used, the floor participant:

shall send the Floor Deny message including reason field toward the other floor participants; and shall remain in 'O: has permission' state (1635).

When a Floor Request message is received in a session where queuing mode is used and if the priority level of the message is not higher, the floor participant:

shall store the received Floor Request messages, shall send the Floor Request Queue Status message. The Floor Request Queue Status message shall be populated as follows:

should indicate the User ID of the MCPTT client in the floor request queue;

should indicate the SSRC of the MCPTT client in the floor request queue;

should indicate the position of the MCPTT client in the floor request queue; and should indicate the priority level of the MCPTT client in the in the floor request queue and shall remain in 'O: has permission' state (1635).

Send Floor Release message (PTT button released with no pending request in queue) (1627) will be described below.

Upon receiving an indication from the MCPTT user to release permission to send RTP media, the floor participant:

shall send a Floor Release message towards other floor participants, if no queued requests exist: The Floor Release message shall be populated as follows:

shall start timer T30 (During silence); and shall enter 'O: silence' state (1615).

Send Floor Granted message (PTT button released with pending request(s) in queue) (1636) will be described below.

When no more encoded media is received from the user and if at least one Floor Request message is stored (i.e. queuing mode is used in the session), the floor participant:

shall request the MCPTT client to stop sending RTP media packets towards other MCPTT clients;

shall send the Floor Granted message toward the other floor participants. The Floor Granted message shall be populated as follows:

should indicate the User IDs of the MCPTT clients in the floor request queue;

should include the SSRCs of the floor participants in the floor request queue;

should include the positions of the floor participants in the floor request queue; and should include the priority levels of the floor participants in the in the floor request queue;

shall start timer T20 (Granted re-send);

shall start timer T30 (During silence); and shall enter the 'O: pending granted' state (1628).

Receive Floor Request with pre-emption indication (R: Floor Request with pre-emption) (1636) will be described below.

When a Floor Request message is received with a pre-emption priority higher than priority of the floor participant, the floor participant:

shall request the MCPTT client to stop sending RTP media packets towards other MCPTT clients;

shall send a Floor Granted message;

shall start timer T20 (Granted re-send);

if floor control queuing mode is used in the session, the Floor Granted message shall be populated as follows:

should include User IDs of the floor participants in the floor request queue;

should include SSRCs of the floor participants in the floor request queue;

should include queue positions of the floor participants in the floor request queue; and should include the priority levels of the floor participants in the in the floor request queue;

shall start timer T30 (During silence); and shall enter the 'O: pending granted' state (1628).

State: 'O: pending request' (1604) will be described below.

In this state the MCPTT client is waiting for a response to a Floor request message.

Receive RTP media (R: RTP media) (1602) will be described below.

Upon receiving RTP media packets, the floor participant:

shall request the MCPTT client to render the RTP media packets;

shall reset the counter associated with T11 (request re-send);

shall restart timer T30 (During silence);

shall restart (or start, if not running already) the timer T13 (No RTP media); and shall remain in 'O: pending request' state (1604).

Receive Floor Request Queue Status message (R: Floor Request Queue Status) (1619) will be described below.

Upon receiving Floor Request Queue Status message, the floor participant:

shall update the queue status, if the User ID in the Floor Request Queue Status message matches its own User ID;

may notify the MCPTT user about the queue position;

shall stop the timer T11 (Request re-send); and shall enter 'O: queued' state (1630).

Receive Floor Deny message (R: Floor Deny) (1603) will be described below.

Upon receiving Floor Deny message, the floor participant:

shall stop the timer T11 (Request re-send), if the User ID in the Floor Deny message matches its own User ID; and, shall enter 'O: has no permission' state (1611).

Send Floor Release message (PTT button released) (1613) will be described below.

When an indication from the MCPTT user to release the pending request for the floor is received, the floor participant:

shall send a Floor Release message towards other floor participants;

shall stop the timer T11 (request re-send): and shall enter 'O: silence' state (1615).

Send Floor Taken message (Timer T11 fired N times) (1626) will be described below.

On the $N^{th}$ firing of timer T11 (request re-send), the floor participant:

shall send Floor Taken message towards other floor participants;

shall stop timer T13 (no RTP media), if running;

shall stop timer T30 (During silence), if running; and shall enter 'O: has permission' state (1635).

Receive Floor Granted message (R: Floor Granted to me) (1626) will be described below.

Upon receiving Floor Granted message and if the User ID in the Floor Granted message matches its own User ID, the floor participant:

shall request the MCPTT client to stop rendering received RTP media packets;

shall stop timer T13 (No RTP Media), if running;

shall stop the timer T11 (request re-send);

shall stop timer T30 (During silence), if running; and shall enter 'O: has permission' state (1635).

Receive Floor Granted message (R: Floor Granted to other) (1602) will be described below.

Upon receiving Floor Granted message and if the User ID in the Floor Granted message does not match its own User ID, the floor participant:

shall request the MCPTT client to stop rendering received RTP media packets;

shall reset the counter associated with T11 (request re-send); and shall remain in 'O: pending request' state (1604).

T11 (Request re-send) timer fired (T11 timer fired) (1602) will be described below.

On firing of timer T11 (Request re-send), the floor participant:

shall send the Floor Request message to other floor participants;

shall restart the timer T11 (Request re-send); and shall remain in the 'O: pending request' state (1604).

Receive Floor Taken message (R: Floor Taken) (1602) will be described below.

Upon receiving Floor Taken message, the floor participant:

shall request the MCPTT client to stop rendering received RTP media packets, if rendering;

shall reset the counter associated with T11 (request re-send);

shall remain in 'O: pending request' state (1604).

Receive Floor Request message (R: Floor request)

Upon receiving Floor Request message, if the priority of request is higher than priority of the floor participant or if the SSRC of request is higher than SSRC of the floor participant with same priority, the floor participant:

shall reset the counter associated with T11 (request re-send); and shall remain in 'O: pending request' state (1604).

State: 'O: pending granted' (1628) will be described below.

In this state the MCPTT client is waiting for another client to take over the role of floor controller.

The Timer T20 (Granted re-send) is running in this state.

Receive RTP Media (R: RTP Media) (1625) will be described below.

Upon receiving the RTP media, the floor participant:

shall request the MCPTT client to render the received RTP media packets;

shall stop timer T20 (Granted re-send), if running;

shall stop timer T33 (Pending user action), if running;

shall restart timer T30 (During silence);

shall start timer T13 (no RTP media); and shall enter 'O: has no permission' state (1611).

T20 (Granted re-send) timer fired (T20 timer fired) (1632) will be described below.

On firing of timer T20 (Granted re-send), the floor participant:

shall send again the Floor Granted message toward the other floor participants. The Floor Granted message shall be populated as follows:

should indicate the list of User IDs of the MCPTT clients in the floor request queue;

should indicate the list of SSRCs of the MCPTT clients in the floor request queue;

should indicate the list of positions of the MCPTT clients in the floor request queue; and should indicate the list of priority levels of the MCPTT clients in the in the floor request queue;

shall restart the timer T20 (Granted re-send); and shall remain in 'O: pending granted' state (1628).

T20 (Granted re-send) timer fired N times (1632) will be described below.

On the $N^{th}$ firing of timer T20 (Granted re-send) with more request(s) pending in the queue, the floor participant:

shall reset the count of N; 2 shall start the timer T33 (Pending user action); and shall remain in 'O: pending granted' state (1628).

T33 (Pending user action) timer fired (T33 timer fired) (1624) will be described below.

On firing of timer T33 (Pending user action), the floor participant:

shall send a Floor Release message towards other floor participants; and, shall enter 'O: silence' state (1615).

PTT button pressed (1632) will be described below.

If the floor participant receives an indication from the MCPTT user to send media, the floor participant:

may notify the MCPTT user about rejection; and, shall remain in 'O: pending granted' state (1628).

Receive Floor Release message (R: Floor Release) (1632) will be described below.

Upon receiving a Floor Release message, the floor participant:

shall remove the sender of the Floor Release message from the queue, if the User ID in the floor release message matches the queued request of User ID; and shall remain in 'O: pending granted' state (1628).

Receive Floor Request (R: Floor Request) (1632) will be described below.

When a Floor Request message is received, the floor participant:

shall send the Floor Deny message including reason field toward the other floor participants; and shall remain in 'O: pending granted' state (1628).

State: 'O: queued (1630) will be described below.

In this state the MCPTT client is waiting for a response to a pending request.

Receive RTP media (R: RTP media) (1633) will be described below.

Upon receiving RTP media packets, the floor participant:

shall request the MCPTT client to render the RTP media packets;

shall restart timer T30 (During silence);

shall restart timer T13 (no RTP media); and shall remain in 'O: queued' state (1630).

Receive Floor Request Queue Status message (R: Floor Request Queue Status) (1633) will be described below.

Upon receiving Floor Request Queue Status message, the floor participant:

shall update the queue status, if the User ID in the Floor Request Queue Status message matches its own User ID;

may notify the MCPTT user about the queue position; and shall remain in 'O: queued' state (1630).

Receive Floor Deny message (R: Floor Deny) (1629) will be described below.

Upon receiving Floor Deny message, the floor participant:

shall stop the timer T33 (Pending user action), if running; and shall enter 'O: has no permission' state (1611).

User indication for release of pending request (1629) will be described below.

When an indication from the MCPTT user to release the pending request for the floor is received, the floor participant:

shall send a Floor Release message towards other floor participants;

shall stop the timer T33 (Pending user action), if running; and shall enter 'O: has no permission' state (1611).

Receiving Floor Granted message (R: Floor Granted to me) (1633) will be described below.

Upon receiving Floor Granted message and if the User ID in the Floor Granted message matches its own User ID, the floor participant:

shall request the MCPTT client to stop rendering received RTP media packets;

shall start timer T33 (Pending user action);

may notify the MCPTT user about waiting user indication sending RTP media; and shall remain in 'O: queued' state (1630).

T33 (Pending user action) timer fired with request pending in queue (1629) will be described below.

shall enter 'O: has no permission' state (1611).

T33 (Pending user action) timer fired with no request pending in queue (1622) will be described below.

shall enter 'O: silence' state (1615).

User indication for accept of pending request (1634) will be described below.

If the floor participant receives an indication from the user that the user wants to send media and the timer T33 (Pending user action) is running, the floor participant:

shall stop the timer T33 (Pending user action);

shall stop timer T30 (During silence), if running; and shall enter 'O: has permission' state (1635).

Receive Floor Granted message (R: Floor Granted to other) (1633) will be described below.

Upon receiving Floor Granted message and if the User ID in the Floor Granted message does not match its own User ID, the floor participant:

shall request the MCPTT client to stop rendering received RTP media packets; and, shall remain in 'O: queued' state (1630).

T13 (No RTP Media) timer fired (1620) will be described below.

On firing of T13 (No RTP Media) timer, the floor participant:

shall request the MCPTT client to stop rendering received RTP media packets;

shall send the Floor Request message to other floor participants, shall start the timer T11 (Request re-send); and shall enter 'O: pending request' state (1604).

State: 'O: contention' (1606) will be described below.

In this state the MCPTT client is trying to resolve race condition between multiple simultaneous floor requests which were buffered in 'O: silence' state.

The MCPTT client chooses the Floor Request with highest priority or highest value in 'SSRC' field if the priority is same and generates the Floor Granted message. A random back-off mechanism is in place so that only a single MCPTT client sends the Floor Granted message.

Timer T41 is running in this state.

Receive Floor Granted message to other (R: Floor Granted)

Upon receiving a Floor Grant message, the MCPTT client:

shall stop timer T41 (back-off); and shall enter 'O: has no permission' state (1611).

Timer Ty (back-off) expires

Upon expiry of timer T41 (back-off), the MCPTT client:

shall send the Floor Granted message toward the other floor participants.

shall enter 'O: has no permission' state (1611).

State: Any state (1612) will be described below.

This subclause describes the actions to be taken in all states defined for the basic state diagram with the exception of the 'Start-stop' state (1621) and the 'Releasing' state.

Receive MCPTT call release (R: MCPTT call release) (1614) will be described below.

Upon receiving an MCPTT call release request from the application and signaling plane when the MCPTT call is going to be released or firing of timer T30 (During silence), the floor participant:

shall stop sending floor control messages towards other floor participants;

shall request the MCPTT client to stop sending and receiving RTP media packets;

shall release all resources including any running timers associated with the MCPTT call;

shall terminate the instance of floor participant state transition diagram; and shall enter 'Start-stop' state (1621).

A Floor participant state diagram with resolving collision of multiple arbitrators is disclosed.

The floor participant may behave according to the state diagram and the following transitions. The received floor messages and the RTP media packets are inputs to the state machine according to their arrival order. They are not ignored unless otherwise stated. The MCPTT client also provides input to the state machine as request to talk (press PTT button) or as end of talk (release PTT button).

Figure 17:
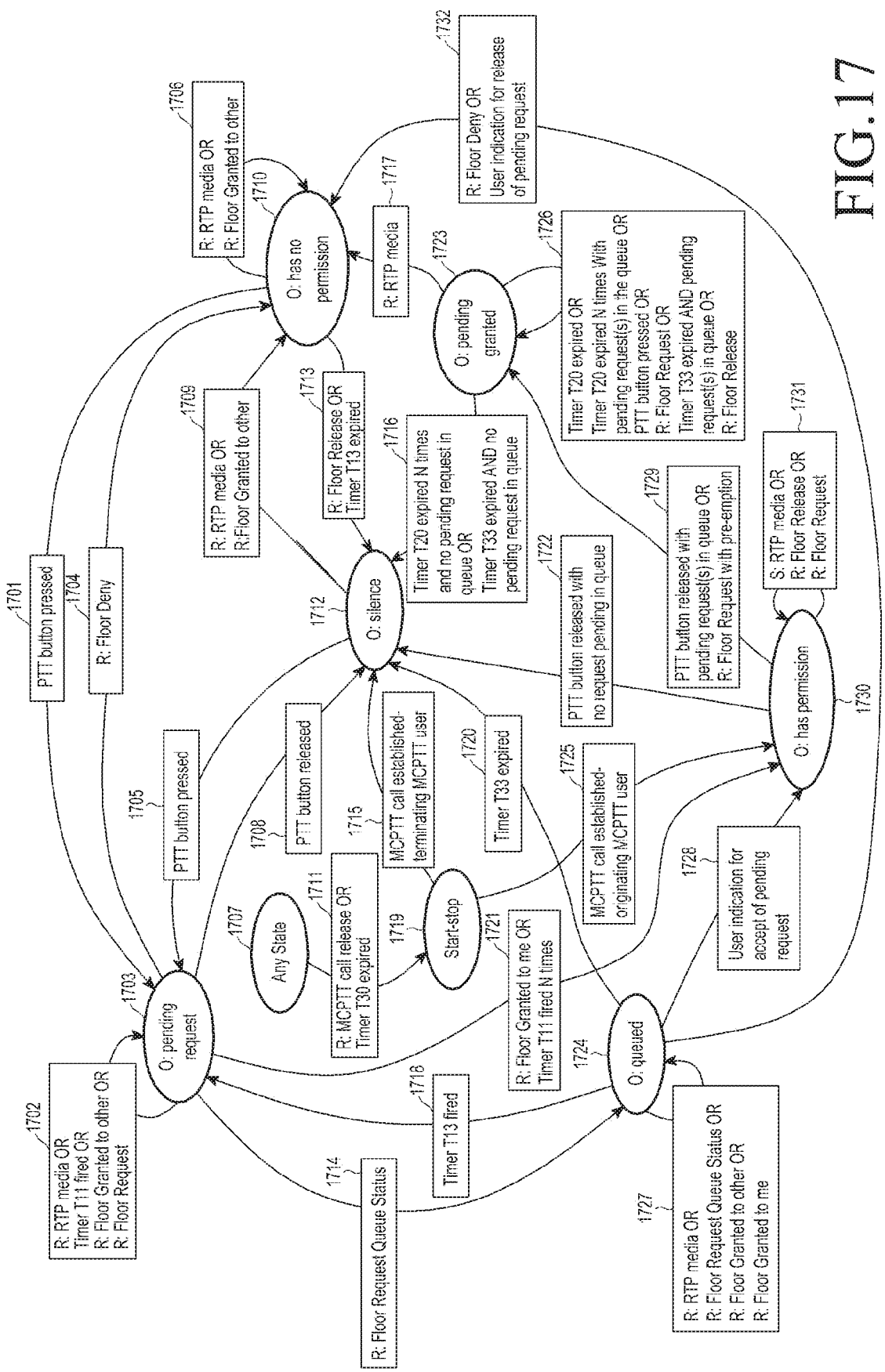
FIG. 17 shows a floor participant state diagram (basic operation).

FIG. 17 show the 'Floor participant state diagram—basic operation' to resolve collision of multiple arbitrator Referring to FIG. 17, if an RTP media packet or a floor control message arrives in a state where there is no specific procedure specified for the RTP media packet or the received floor control message, the floor participant shall discard the floor control message or the RTP media packet and shall remain in the current state. A badly formatted RTP packet or floor control message received in any state is ignored by the floor participant and does not cause any change of the current state.

An operation in the state "Start-stop" 1719 is described.

When a new instance of the state machine is created, before any floor control related input is applied, the state machine is in the 'Start-stop' state 1719. Similarly, when the call is released the state machine shall return to the 'Start-Stop' state 1719.

In the state "Start-stop" 1719, the MCPTT call may be established by an originating MCPTT user.

When an MCPTT call is established with session announcement including an explicit floor request in the state "Start-stop" 1719, in operation 1725, the originating floor participant may create an instance of a floor participant state transition diagram for basic operation state machine, and send Floor Granted message towards other floor participants The Floor Granted message may indicate the own User ID in the message. And the originating floor participant may start timer T30 (During silence), and enter 'O: has permission' state 1730.

In the state "Start-stop" 1719, the MCPTT call may be established by a terminating MCPTT user.

When an MCPTT call is established in the state "Start-stop" 1719, in operation 1715, the terminating floor participant may create an instance of a floor participant state transition diagram for basic operation state machine, start timer T30 (During silence), and enter 'O: silence' state 1712.

An operation in the state: 'O: silence' 1712 is described.

In this state a none of the MCPTT clients in the session is acting as a floor control server.

If the floor participant receives an indication from the MCPTT user to send media in the state: 'O: silence' 1712, in operation 1705, the floor participant may send the Floor Request message (PTT button pressed) to other floor participants, start the timer T11 (Request re-send), and enter 'O: pending request' state.

Upon receiving RTP media packets and if there is no stored SSRC of the current arbitrator (R: RTP media) in the state: 'O: silence' 1712, in operation 1709, the floor participant may provide a floor taken notification to the MCPTT user, restart timer T30 (During silence), set the stored SSRC of the current arbitrator to the SSRC of RTP media packet, restart (or start, if not running already) timer T13 (No RTP Media), request the MCPTT client to start rendering received RTP media packets, and enter 'O: has no permission' state 1710.

Otherwise, if SSRC of floor participant sending the media matches the stored SSRC of current arbitrator in the state: 'O: silence' 1712, in operation 1709, the floor participant may restart (or start, if not running already) timer T13 (No RTP Media), restart timer T30 (During silence), request the MCPTT client to start rendering received RTP media packets, and enter 'O: has no permission' state 1710.

When a Floor Granted message is received and if the User ID in the Floor Granted message does not match its own User ID (R: Floor Granted to other) in the state: 'O: silence' 1712, in operation 1709, the floor participant may provide a floor taken notification to the MCPTT user, set the stored SSRC of the current arbitrator to the SSRC of user to whom the floor was granted in the Floor Granted message, start timer T13 (No RTP Media), and enter 'O: has no permission' state 1710.

An operation in the state: 'O: has no permission' 1710 is described.

In this state another floor participant does not have permission to send media.

If the floor participant receives an indication from the user that the user wants to send media (PTT button pressed) in the state: 'O: has no permission' 1710, in operation 1701, the floor participant may send the Floor Request message to other clients. The Floor Request message may be populated by starting the timer T11 (Request re-send), and entering 'O: pending request' state 1703.

When a Floor Release message is received and if the SSRC in the Floor Release message matches the SSRC in the last RTP media packet received (R: Floor Release) in the state: 'O: has no permission' 1710, in operation 1709, the floor participant may request the MCPTT client to stop rendering received RTP media packets, stop timer T13 (No RTP Media), clear the stored SSRC of the current arbitrator, enter 'O: silence' state 1712, and provide floor idle notification to the MCPTT user.

On expiry of T13 (No RTP Media) timer in the state: 'O: has no permission' 1710, in operation 1709, the floor participant may request the MCPTT client to stop rendering received RTP media packets, clear the stored SSRC of the current arbitrator, enter 'O: silence' state 1712, and provide floor idle notification to the MCPTT user.

When a Floor Granted message is received and if the User ID in the Floor Granted message does not match its own User ID and SSRC of floor participant sending the Floor Granted message matches the stored SSRC of current arbitrator (R: Floor Granted to other) in the state: 'O: has no permission' 1710, in operation 1706, the floor participant may request the MCPTT client to stop rendering received RTP media packets, and set the stored SSRC of the current arbitrator to the SSRC of user to whom the floor was granted in the Floor Granted message, and remain in the 'O: has no permission' state 1710.

Upon receiving RTP media packets (R: RTP media) in the state: 'O: has no permission' 1710, in operation 1706, the floor participant may request the MCPTT client to render the received RTP media packets, restart timer T30 (During silence), restart timer T13 (No RTP Media), and remain in 'O: has no permission' state 1710.

An operation in the state: 'O: has permission' 1730 is described.

In this state the MCPTT client is acting as a floor control server and has the permission to send media.

Upon receiving encoded media from the user or if encoded media is already buffered (S: RTP Media) in the state: 'O: has permission' 1730, in operation 1731, the floor participant may request the MCPTT client to start sending RTP media packets towards other MCPTT clients, and remain in 'O: has permission' state 1730.

Upon receiving a Floor Release message (R: Floor Release) in the state: 'O: has permission' 1730, in operation 1731, the floor participant may remove the sender of the Floor Release message from the queue, if the User ID in the floor release message matches the queued request of User ID, and remain in 'O: has permission' state 1730.

When a Floor Request message is received in a session where queuing mode is not used (R: Floor Request) in the state: 'O: has permission' 1730, in operation 1731, the floor participant may send the Floor Deny message including reason field toward the other floor participants, and remain in 'O: has permission' state 1730.

When a Floor Request message is received in a session where queuing mode is used and if the priority level of the message is not higher (R: Floor Request) in the state: 'O: has permission' 1730, in operation 1731, the floor participant may store the received Floor Request messages, and send the Floor Queue Position Info message. The Floor Queue Position Info message may be populated by indicating the User ID of the MCPTT client in the floor request queue, indicating the SSRC of the MCPTT client in the floor request queue, indicating the position of the MCPTT client in the floor request queue, and indicating the priority level of the MCPTT client in the in the floor request queue. And the floor participant may remain in 'O: has permission' state 1730.

Upon receiving an indication from the MCPTT user to release permission to send RTP media in the state: 'O: has permission' 1730, the floor participant may send a Floor Release message towards other floor participants (PTT button released with no pending request in queue), if no queued requests exist. The Floor Release message shall be populated as follows by starting timer T30 (During silence), clearing the stored SSRC of the current arbitrator, and entering 'O: silence' state 1712.

When no more encoded media is received from the user and if at least one Floor Request message is stored (i.e. queuing mode is used in the session) in the state: 'O: has permission' 1730, in operation 1729, the floor participant may request the MCPTT client to stop sending RTP media packets towards other MCPTT clients, and send the Floor Granted message toward the other floor participants (PTT button released with pending request(s) in queue). The Floor Granted message shall be populated by indicating the User IDs of the MCPTT clients in the floor request queue, including the SSRCs of the floor participants in the floor request queue, including the positions of the floor participants in the floor request queue, and including the priority levels of the floor participants in the in the floor request queue.

And the floor participant may set the stored SSRC of the current arbitrator to the SSRC of user to whom the floor was granted in the Floor Granted message, start timer T20 (Granted re-send), start timer T30 (During silence), and enter the 'O: pending granted' state 1723.

Receive Floor Request with pre-emption indication (R: Floor Request with pre-emption) (1729) will be described below.

When a Floor Request message is received with a pre-emption priority higher than priority of the floor participant, the floor participant:
  may request the MCPTT client to stop sending RTP media packets towards other MCPTT clients;
  may send a Floor Granted message;
  may start timer T20 (Granted re-send);

if floor control queuing mode is used in the session, the Floor Granted message may be populated as follows:
    may include User IDs of the floor participants in the floor request queue;
    may include SSRCs of the floor participants in the floor request queue;
    may include queue positions of the floor participants in the floor request queue; and
    may include the priority levels of the floor participants in the in the floor request queue;
  may a start timer T30 (During silence); and
  may enter the 'O: pending granted' state (1723).

State: 'O: pending request' (1703) will be described below.

In this state, the MCPTT client is waiting for a response to a Floor request message.

In this state, a timer T11 (request re-send) is running.

To resolve a race condition between multiple simultaneous floor requests, the MCPTT client resets the counter associated with T1, if another floor request with higher priority or higher SSRC, in case the priority is same, is received.

Receive RTP media (R: RTP media) (1717) will be described below.

Upon receiving RTP media packets and if there is no stored SSRC of the current arbitrator, the floor participant:
  may request the MCPTT client to render the RTP media packets;
  may reset the counter associated with T11 (request re-send);
  may restart timer T30 (During silence);
  may set the stored SSRC of the current arbitrator to the SSRC of RTP media packet;
  may restart (or start, if not running already) the timer T13 (No RTP media); and
  may remain in 'O: pending request' state (1703).

Otherwise, if SSRC of floor participant sending the media matches the stored SSRC of current arbitrator, the floor participant:
  may request the MCPTT client to render the RTP media packets;
  may reset the counter associated with T11 (request re-send);
  may restart timer T30 (During silence);
  may restart (or start, if not running already) the timer T13 (No RTP media); and
  may remain in 'O: pending request' state (1703).

Receive Floor Queue Position Info message (R: Floor Queue Position Info) will be described below.

Upon receiving Floor Request Queue Status message, the floor participant:
  may update the queue status, if the User ID in the Floor Request Queue Status message matches its own User ID;
  may notify the MCPTT user about the queue position;
  may stop the timer T11 (Request re-send); and
  may enter 'O: queued' state (1724).

Receive Floor Deny message (R: Floor Deny) (1704) will be described below.

Upon receiving Floor Deny message, the floor participant:
  may stop the timer T11 (Request re-send), if the User ID in the Floor Deny message matches its own User ID; and,
  may enter 'O: has no permission' state (1710).

Send Floor Release message (PTT button released) (1708) will be described below.

When an indication from the MCPTT user to release the pending request for the floor is received, the floor participant:

may send a Floor Release message towards other floor participants;
may stop the timer T11 (request re-send);
may clear the stored SSRC of the current arbitrator; and
may enter 'O: silence' state (1712).

Send Floor Granted to me message (Timer T11 expired N times) (1721) will be described below.

On the $N^{th}$ expiry of timer T11 (request re-send), the floor participant:
may send the Floor Granted message toward the other floor participants. The Floor Granted message may be populated as follows:
may indicate the own User ID in the message
may stop timer T13 (no RTP media), if running;
may stop timer T30 (During silence), if running; and
may enter 'O: has permission' state (1730).

Receive Floor Granted message (R: Floor Granted to me) (1721) will be described below.

Upon receiving Floor Granted message and if the User ID in the Floor Granted message matches its own User ID and SSRC of floor participant sending the Floor Granted message matches the stored SSRC of current arbitrator, the floor participant:
may request the MCPTT client to stop rendering received RTP media packets;
may stop timer T13 (No RTP Media), if running;
may stop the timer T11 (request re-send);
may stop timer T30 (During silence), if running; and
may enter 'O: has permission' state (1730).

Receive Floor Granted message (R: Floor Granted to other) (1706) will be described below.

Upon receiving Floor Granted message and if the User ID in the Floor Granted message does not match its own User ID and SSRC of floor participant sending the Floor Granted message matches the stored SSRC of current arbitrator, the floor participant:
may request the MCPTT client to stop rendering received RTP media packets;
may set the stored SSRC of the current arbitrator to the SSRC of user to whom the floor was granted in the Floor Granted message;
may reset the counter associated with T11 (request re-send);
may re-start timer T11 (request re-send); and
may remain in 'O: pending request' state (1703).

T11 (Request re-send) timer expired (T11 timer expired) (1702) will be described below.

On expiry of timer T11 (Request re-send), the floor participant:
may send the Floor Request message to other floor participants;
may restart the timer T11 (Request re-send); and
may remain in the 'O: pending request' state (1703).

Receive Floor Request message (R: Floor request) (1702) will be described below.

Upon receiving Floor Request message, if the priority of received request is higher than priority of the floor participant or if the SSRC of received request is higher, if the priority is same, the floor participant:
may reset the counter associated with T1 (request re-send);
may re-start timer T11 (request re-send); and
may remain in 'O: pending request' state (1703).

State: 'O: pending granted' (1723) will be described below.

In this state the MCPTT client is waiting for another client to take over the role of floor controller.

The Timer T20 (Granted re-send) is running in this state.

Receive RTP Media (R: RTP Media) (1717) will be described below.

Upon receiving the RTP media and the SSRC of RTP media packet matches with the stored SSRC of current arbitrator, the floor participant:
may request the MCPTT client to render the received RTP media packets;
may stop timer T20 (Granted re-send), if running;
may stop timer T33 (Pending user action), if running;
may restart timer T30 (During silence);
may start timer T13 (no RTP media); and
may enter 'O: has no permission' state (1710).

T20 (Granted re-send) timer expired (T20 timer expired) (1726) will be described below.

On expiry of timer T20 (Granted re-send), the floor participant:
may send again the Floor Granted message toward the other floor participants. The Floor Granted message may be populated as follows:
may indicate the list of User IDs of the MCPTT clients in the floor request queue;
may indicate the list of SSRCs of the MCPTT clients in the floor request queue;
may indicate the list of positions of the MCPTT clients in the floor request queue; and
may indicate the list of priority levels of the MCPTT clients in the in the floor request queue;
may restart the timer T20 (Granted re-send); and
may remain in 'O: pending granted' state (1723).

T20 (Granted re-send) timer expired N times (with pending request(s) in the queue (Timer T20 expired N times AND pending request(s) in queue) (1726) will be described below.

On the expiry of timer T20 (Granted re-send) for a configurable number of times with request pending in the queue, the floor participant:
may reset the count of N;
may start the timer T33 (Pending user action); and
may remain in 'O: pending granted' state (1723).

T20 (Granted re-send) timer expired N times with no pending request in the queue (Timer T20 expired N times AND no pending request in queue) (1716) will be described below.

On the expiry of timer T20 (Granted re-send) for a configurable number of times with no request pending in the queue, the floor participant:
may reset the count of N;
may clear the stored SSRC of the current arbitrator; and
may enter 'O: silence' state (1712).

T33 (Pending user action) timer expires with no pending request in the queue (T33 timer expires AND no pending request in queue) (1716) will be described below.

On expiry of timer T33 (Pending user action) with no request pending in the queue, the floor participant:
may send a Floor Release message towards other floor participants;
may clear the stored SSRC of the current arbitrator; and
may enter 'O: silence' state (1712).

T33 (Pending user action) timer expires with pending request(s) in the queue (T33 timer expired AND pending request(s) in queue) (1726) will be described below.

On the expiry of timer T33 (Pending user action) with more request(s) pending in the queue, the floor participant:
may send the Floor Granted message for the next pending request in the queue towards other floor participants. The Floor Granted message may be populated as follows:

may indicate the list of User IDs of the MCPTT clients next in the floor request queue;

may indicate the list of SSRCs of the MCPTT clients next in the floor request queue;

may indicate the list of positions of the MCPTT clients next in the floor request queue; and may indicate the list of priority levels of the MCPTT clients next in the in the floor request queue;

may set the stored SSRC of the current arbitrator to the SSRC of user to whom the floor was granted in the Floor Granted message;

may start the timer T20 (Granted re-send); and may remain in 'O: pending granted' state (1723).

PTT button pressed (1701) will be described below.

If the floor participant receives an indication from the MCPTT user to send media, the floor participant:

may notify the MCPTT user about rejection; and, may remain in 'O: pending granted' state (1723).

Receive Floor Release message (R: Floor Release) (1726) will be described below.

Upon receiving a Floor Release message, the floor participant:

may remove the sender of the Floor Release message from the queue, if the User ID in the floor release message matches the queued request of User ID; and may remain in 'O: pending granted' state (1723).

Receive Floor Request (R: Floor Request) (1726) will be described below.

When a Floor Request message is received, the floor participant:

may send the Floor Deny message including reason field toward the other floor participants; and may remain in 'O: pending granted' state (1723).

State: 'O: queued (1724) will be described below.

In this state the MCPTT client is waiting for a response to a pending request.

Receive RTP media (R: RTP media) (1727) will be described below.

Upon receiving RTP media packets and the SSRC of RTP media packet matches with the stored SSRC of current arbitrator, the floor participant:

may request the MCPTT client to render the RTP media packets;

may restart timer T30 (During silence);

may restart timer T13 (no RTP media); and may remain in 'O: queued' state (1724).

Receive Floor Queue Position Info message (R: Floor Queue Position Info) will be described below.

Upon receiving Floor Queue Position Info message, the floor participant:

may update the queue position, if the User ID in the Floor Queue Position Info message matches its own User ID:

may notify the MCPTT user about the queue position; and may remain in 'O: queued' state (1724).

Receive Floor Deny message (R: Floor Deny) (1732) will be described below.

Upon receiving Floor Deny message, the floor participant:

may stop the timer T33 (Pending user action), if running; and may enter 'O: has no permission' state (1710).

User indication for release of pending request (1728) will be described below.

When an indication from the MCPTT user to release the pending request for the floor is received, the floor participant:

may send a Floor Release message towards other floor participants may stop the timer T33 (Pending user action), if running; and may enter 'O: has no permission' state (1710).

Receiving Floor Granted message (R: Floor Granted to me) (1727) will be described below.

Upon receiving Floor Granted message and if the User ID in the Floor Granted message matches its own User ID and SSRC of floor participant sending the Floor Granted message matches the stored SSRC of current arbitrator, the floor participant:

may request the MCPTT client to stop rendering received RTP media packets;

may start timer T33 (Pending user action);

may notify the MCPTT user about of the floor grant; and may remain in 'O: queued' state (1724).

T33 (Pending user action) timer expires (1720) will be described below.

may enter 'O: silence' state (1712).

User indication for accept of pending request (1728) will be described below.

If the floor participant receives an indication from the user that the user wants to send media and the timer T33 (Pending user action) is running, the floor participant:

may stop the timer T33 (Pending user action);

may stop timer T30 (During silence), if running; and may enter 'O: has permission' state (1730).

Receive Floor Granted message (R: Floor Granted to other) (1727) will be described below.

Upon receiving Floor Granted message and if the User ID in the Floor Granted message does not match its own User ID and SSRC of floor participant sending the Floor Granted message matches the stored SSRC of current arbitrator, the floor participant:

may request the MCPTT client to stop rendering received RTP media packets;

may set the stored SSRC of the current arbitrator to the SSRC of user to whom the floor was granted in the Floor Granted message; and may remain in 'O: queued' state (1724).

T13 (No RTP Media) timer expires (1718) will be described below.

On expiry of T13 (No RTP Media) timer, the floor participant:

may request the MCPTT client to stop rendering received RTP media packets;

may send the Floor Request message to other floor participants;

may start the timer T11 (Request re-send);

may clear the stored SSRC of the current arbitrator; and may enter 'O: pending request' state (1703).

State: Any state (1707) will be described below.

This subclause describes the actions to be taken in all states defined for the basic state diagram with the exception of the 'Start-stop' state.

Receive MCPTT call release or timer T30 (during silence) expired (R: MCPTT call release OR Timer T30 expired) (1711) will be described below.

Upon receiving an MCPTT call release request from the application and signaling plane when the MCPTT call is going to be released or expiry of timer T30 (During silence), the floor participant:

may stop sending floor control messages towards other floor participants;

may request the MCPTT client to stop sending and receiving RTP media packets;

may release all resources including any running timers associated with the MCPTT call;

may terminate the instance of floor participant state transition diagram; and may enter 'Start-stop' state (1719).

Next, floor control detail messages will be described below.

A format of a RTCP APP message according to an embodiment of the present disclosure will be described with reference to FIG. 18.

Figure 18:
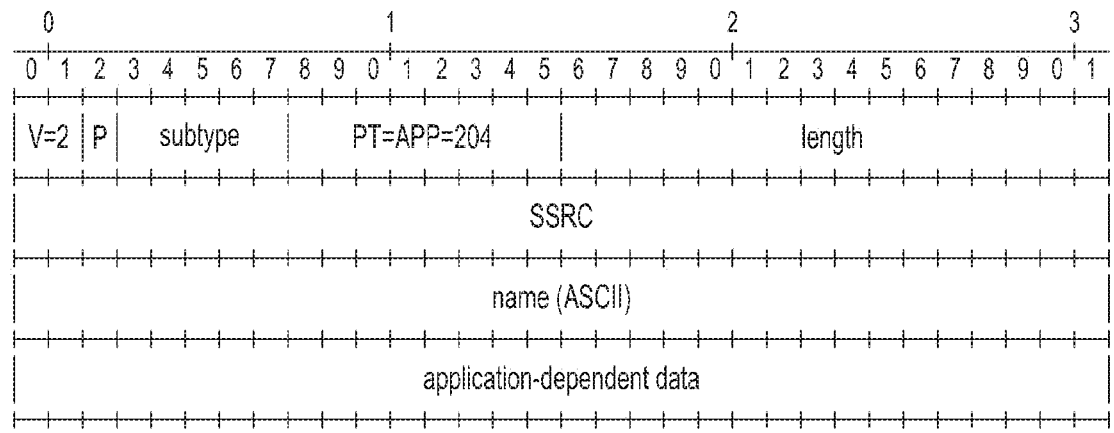
FIG. 18 shows an APP message format.

FIG. 18 schematically illustrates a format of a RTCP APP message according to an embodiment of the present disclosure.

Referring to FIG. 18, a floor control protocol is based on the RTCP Application Packets (RTCP: APP), as defined in IETF RFC 3550, but the floor control messages do not conform to the rules for compound RTCP packets or RTCP packet transmission.

Each floor control message may be one RTCP: APP packet. These RTCP: APP packets may not be sent in compound RTCP packets, but more than one floor control message may be sent in a single IP packet. The structure of each floor control message is defined below.

The definition of the fields in the RTCP APP packet is found in IETF RFC 3550.

The RTCP APP message includes P, Length, Name, and Application-dependent data.

Here, each of P, Length, Name, and Application-dependent data will be described below.

(1) P

The padding bit P may be set to 0.

(2) Length

The length field in the RTCP header is the length of the packet in 32-bit words, not counting the first 32-bit word in which the length field resides.

NOTE 1: The length field can indicate message size longer than specified in this version of the protocol. This can be the case e.g. if message is of later version of this protocol.

(3) Name

The 4-byte ASCII string in the RTCP header may be used to define the set of floor control messages to be unique with respect to other APP packets that the application might receive.

For the floor control protocol specified in present document the ASCII name string may be: MCPT.

NOTE 2: The ASCII name field value i.e. MCPT does not correspond to the floor control protocol version.

(4) Application-Dependent Data

The use of application dependent data is specified in the subclause where the floor control message is specified. If the length of the application dependent data is not a multiple of 4 bytes, the application dependent data may be padded to a multiple of 4 bytes. The value of the padding bytes may be set to zero. The floor control client may ignore the value of the padding bytes.

Handling of unknown fields and messages will be described below.

When a message is received the floor control client may:
ignore the whole message, if the subtype is unknown;
ignore the unspecified fields in the message (e.g. specified in future version of the floor control protocol) and
ignore the syntactically incorrect optional fields.

Floor control protocol specific fields will be described below.

This subclause describes fields specific for the floor control protocol specified in the present specification.

The floor control messages can include the floor control protocol specific fields and if included, the floor control specific fields are contained in the application-dependent data of the floor control message.

Each floor control protocol specific field consists of an 8-bit Field ID, an 8-bit octet count describing the length of the field value not including this two-octet header, and the field value.

Table 2 lists the available fields including the assigned Field ID.

TABLE 2

| Floor control specific fields | | |
|---|---|---|
| Field name | Field ID | Description |
| — | 000-099 | Used by RTCP |
| UserID | 100 | MCPPTT user identity |
| Queue | 101 | Waiting list |
| Priority-level | 102 | Priority value |
| — | 103-255 | Reserved for future use |

Table 2 includes UserID, Queue, and Priority-level. Each of UserID, Queue, and Priority-level will be described below.

(1) UserID

The UserID field may include the value 100 (decimal) indicating that this information field is used to indicate the MCPTT user identification.

The Identity-length field may include the value indicating the length of this item except padding.

If the length of the identity is not a multiple of 4 bytes except first 16-bit words, the identity value field may be padded to a multiple of 4 bytes except first 16-bit words. The value of the padding bytes may be set to zero. The floor control client may ignore the value of the padding bytes.

(2) Queue

The Queue field may include the value 101 (decimal) indicating that this additional information field is used to indicate the number of waiting clients as next talker in the MCPTT call.

The Queue-length field may include the value 2 indicating the length of this item.

(3) Priority-Level

The Priority-level field may have the value 102 (decimal). The Priority-length field may have the value 2 indicating the length of this item.

The Priority value field may consist of 16 bit parameter giving a defined Media Burst request priority level.

The defined priority levels that can be included in a Floor Request message are:

1 Normal priority.
2 High priority.
3 Pre-emptive priority.

All other values are reserved and may not be used.

A format of a Floor Request message according to an embodiment of the present disclosure will be described with reference to FIG. 19.

Figure 19:
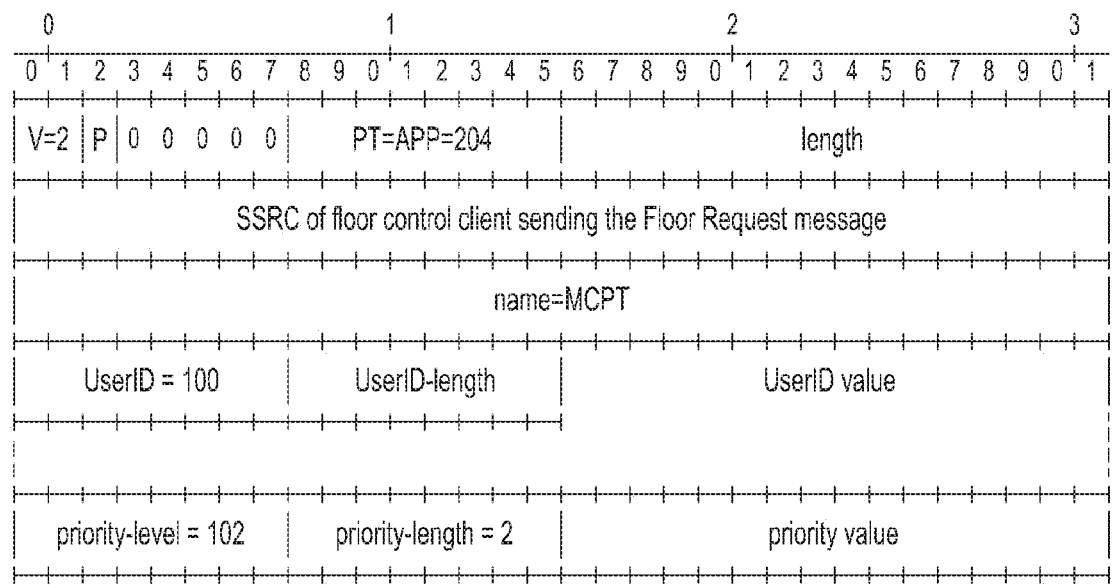
FIG. 19 shows a floor request message format.

FIG. 19 schematically illustrates a format of a Floor Request message according to an embodiment of the present disclosure.

Referring to FIG. 19, the Floor Request message is a request from a floor control client to get permission to send media.

The following bit pattern in the subtype field may be used for the Floor Request message: 00000.

The Floor Request message includes SSRC, UserID, and Priority. Each of SSRC, UserID, and Priority will be described below.

(1) SSRC

The SSRC field may carry the SSRC of the floor control client.

(2) UserID

The UserID field may carry the MCPTT User ID of the floor control client.

(3) Priority

The priority-level may be included if between the floor control clients have agreed to support queuing of floor requests.

The floor control client may include the Priority-level field if the MCPTT user has indicated that the floor request is desired at a level other than normal priority, or if the floor control client wishes to change the Priority-level of a queued floor request.

The coding of the floor request priority is specified in subclause 4.1.2.4.

A format of a Floor Granted message according to an embodiment of the present disclosure will be described with reference to FIG. 20.

Figure 20:
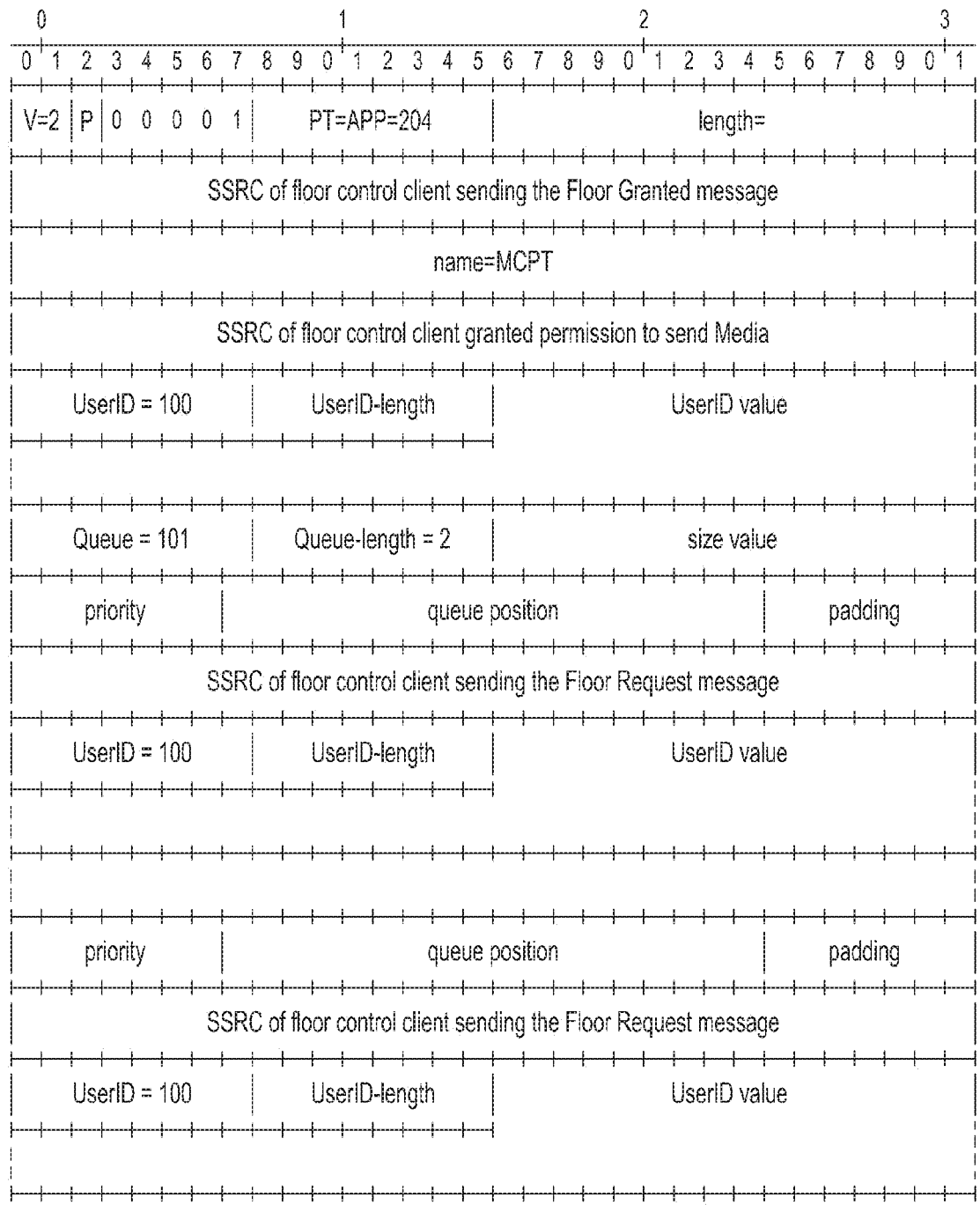
FIG. 20 shows a floor granted message format.

FIG. 20 schematically illustrates a format of a Floor Granted message according to an embodiment of the present disclosure.

Referring to FIG. 20, the Floor Granted message is an action from the floor control client which have a permission to transmit media to inform the requesting floor control client that it has been granted the permission to send media.

The following bit pattern in the subtype field may be used for the Floor Granted message: 00001.

The Floor Granted message includes SSRC, UserID, Queue, Priority, Queue position, Padding, SSRC, and UserID. Each of SSRC, UserID, Queue, Priority, Queue position, Padding, SSRC, and UserID will be described below.

(1) SSRC

The SSRC field may carry the SSRC of the floor control client sending the floor control granted message.

The SSRC field may carry the SSRC of the floor control client granted a permission to send.

(2) UserID

The UserID field may carry the MCPTT User ID of the floor control client granted the permission to send media.

(3) Queue

The size field is the numbers of waiting clients in the MCPTT call. The Queue includes set of priority, queue position, padding, SSRC, and userID.

(4) Priority

The priority level field is a 1 byte field which defines the priority level that is currently held by floor control client granted the permission to send the media.

The defined priority levels that can be included in a Floor Granted message are:

1—normal priority
2—high priority
3—pre-emptive priority

The default value if the priority option was not negotiated at MCPTT call setup may be 1.

All other values are reserved.

(5) Queue Position

The queue position field defines the number of floor control clients in the Floor Request Queue Status message that are ahead of the floor control client.

(6) Padding

The last 8 bits are padding bits and may be set to zero.

(7) SSRC

The SSRC field may carry the SSRC of the floor control client.

(8) UserID

The UserID field may carry the MCPTT User ID of the floor control client held by floor control client granted the permission to send the media.

NOTE: The Priority, Queue position, Padding, UserID are a set indicating the floor control client waiting for receiving the Floor Granted message. The set can be one or more floor control clients.

A format of a Floor Taken message according to an embodiment of the present disclosure will be described with reference to FIG. 21.

Figure 21:
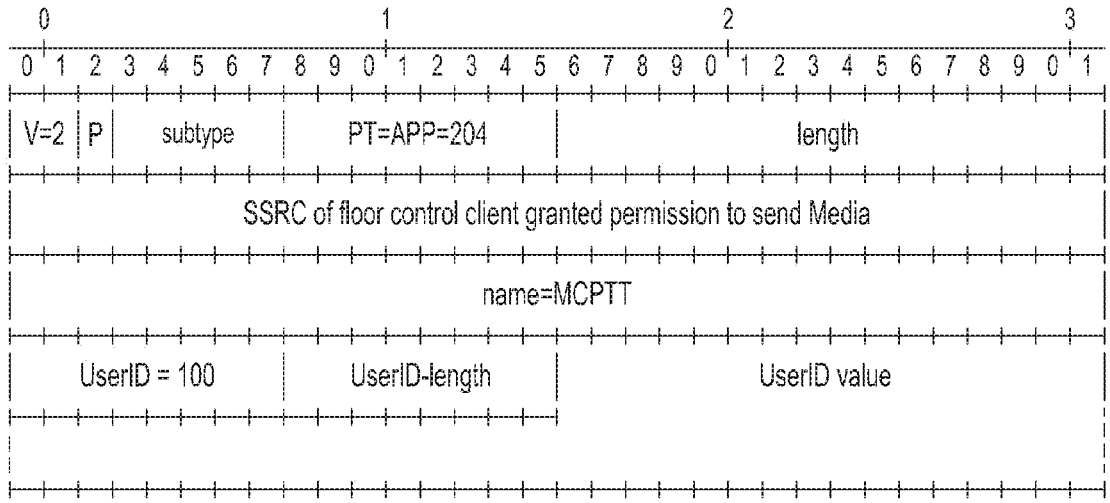
FIG. 21 shows a floor taken message format.

FIG. 21 schematically illustrates a format of a Floor Taken message according to an embodiment of the present disclosure.

Referring to FIG. 21, the Floor Taken message is sent to inform non-requesting floor control client(s) that someone has been granted permission to send media.

The following bit pattern in the subtype field may be used for the Floor Taken message: 00010, when no acknowledgement reply is expected.

The Floor Taken message includes SSRC and UserID. Each of SSRC and UserID will be described below.

(1) SSRC

The SSRC field may carry the SSRC of the floor client granted a permission to send media.

(2) UserID

The UserID field may carry the MCPTT User ID of the floor control client.

A format of a Floor Deny message according to an embodiment of the present disclosure will be described with reference to FIG. 22.

Figure 22:
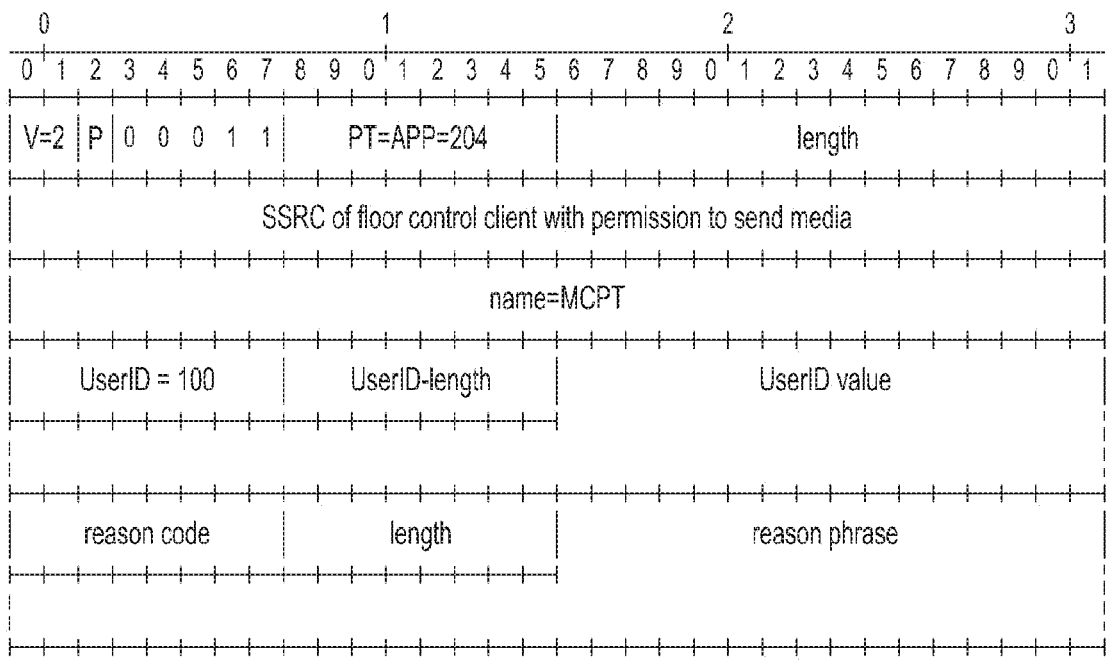
FIG. 22 shows a floor deny message format.

FIG. 22 schematically illustrates a format of a Floor Deny message according to an embodiment of the present disclosure.

Referring to FIG. 22, the Floor Deny message is sent as an action from floor control client granted the permission to send the media to the requesting floor control client to inform that the floor request was rejected.

The following bit pattern in the subtype field may be used for the Floor Deny message: 00011.

Application-dependent data for the Floor Deny message includes a reason in the reason code field and possibly followed by a text-string in the reason phrase field describing why the request was rejected. Therefore, the length of the packet will vary depending on the size of the application dependent field.

The Floor Deny message includes SSRC, UserID, and Reason code and reason phrase.

Each of SSRC, UserID, and Reason code will be described below.

(1) SSRC

The SSRC field may carry the SSRC of the floor control client granted the permission to send the media.

(2) UserID

The UserID field may carry the MCPTT User ID of the floor control client sending floor request message.

(3) Reason Code and Reason Phrase

The first 8 bits in the application-dependent data field is used for the reason code field.

The length field gives the length of the reason phrase field in bytes. If the length field is set to 0, there is no reason in the reason phrase field. The reason phrase field can contain a text string with additional information. The text string may use the same encoding as the text strings in the SDES item CNAME as specified in IETF RFC 3550.

A format of a Floor Release message according to an embodiment of the present disclosure will be described with reference to FIG. 23.

Figure 23:
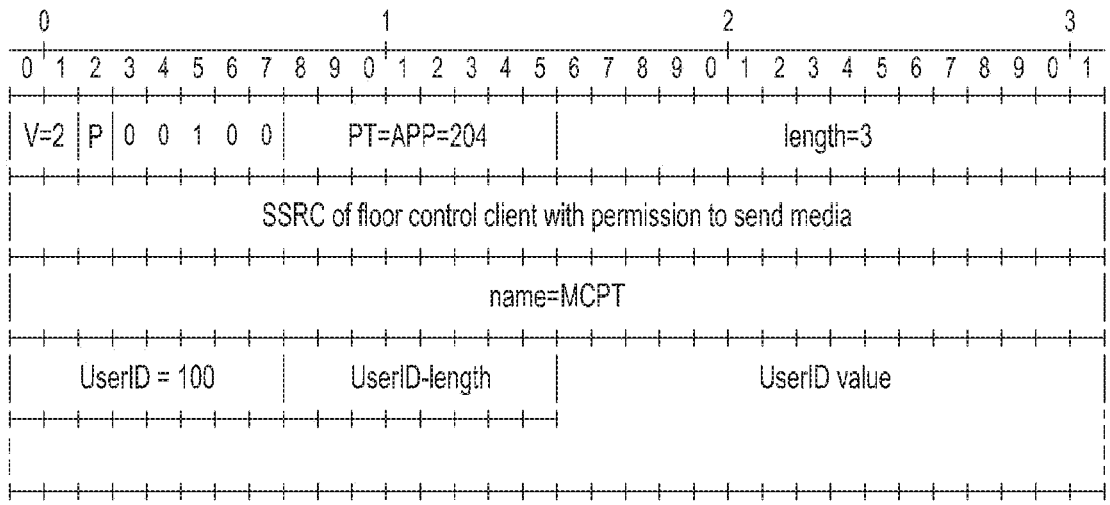
FIG. 23 shows a floor release message format.

FIG. 23 schematically illustrates a format of a Floor Release message according to an embodiment of the present disclosure.

Referring to FIG. 23, the Floor Release message is sent as an action from the floor control client sending floor request message to the floor control client granted the permission to send the media to inform that the floor can be released.

The Floor Release message may also be sent if the floor control client has a request in the floor request queue. In this case, the Floor Release message is sent to cancel the floor request in the queue is cancelled.

The following bit pattern in the subtype field may be used for the Floor Release message: 00100.

The Floor Release message includes SSRC and UserID. Each of SSRC and UserID will be described below.

(1) SSRC

The SSRC field may carry the SSRC of the floor control client with permission to send media.

(2) UserID

The UserID field may carry the MCPTT User ID of the floor control client sending floor request message or granted the permission to send the media.

A format of a Floor Request Queue Status message according to an embodiment of the present disclosure will be described with reference to FIG. 24.

Figure 24:
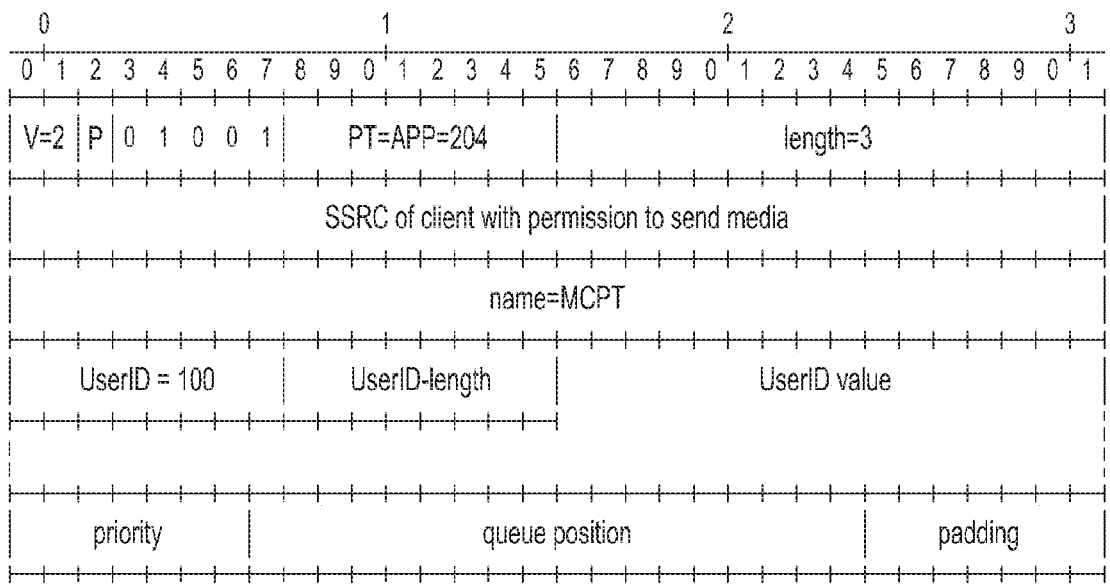
FIG. 24 shows a floor request queue status message format.

FIG. 24 schematically illustrates a format of a Floor Request Queue Status message according to an embodiment of the present disclosure.

Referring to FIG. 24, the Floor Request Queue Status message is sent by the client with permission to notify the floor control client of its position in the floor request queue. The message is sent in response to a Floor Request message if the request is queued or as the response to the Floor Request Queue Status Request message. It can be sent at other times, e.g. if the floor control client is removed from the floor request queue or if the position or priority of the request is changed.

The following bit pattern in the subtype field may be used for the Floor Request Queue Status message: 01001.

The Floor Request Queue Status message includes SSRC, UserID, Priority, Queue position, and Padding. Each of SSRC, UserID, Priority, Queue position, and Padding will be described below.

(1) SSRC

The SSRC field may carry the SSRC of the client with permission to send media (2) UserID The UserID field may carry the MCPTT User ID of the floor control client sending Floor Request message.

(3) Priority

The priority level field is a 1 byte field which defines the priority level that is currently held by floor control client granted the permission to send the media.

The defined priority levels that can be included in a Floor Granted message are:

1—normal priority
2—high priority
3—pre-emptive priority

The default value if the priority option was not negotiated at MCPTT call setup may be 1.

All other values are reserved.

(4) Queue Position

The queue position field defines the number of floor control clients in the Floor Request Queue Status message that are ahead of the floor control client.

(5) Padding

The last 8 bits are padding bits and may be set to zero.

Meanwhile, Timers in the floor control participant will be described with reference to Table 3.

Table 3 recommends timer values, describes the reason for of starting the timer, normal stop and the action on expiry.

Table 3: Floor participant timers

TABLE 3

| Floor participant timers | | | | |
| --- | --- | --- | --- | --- |
| Timer | Timer value | Cause of start | Normal stop | On expiry |
| T11 'Request re-send' | — | When the floor participant sends a Floor Request message | The reception of a Floor Granted message or a Floor Deny message or Floor Request Queue Status message or when User release PTT button. | If the counter is less than N, a new Floor Request message is sent and counter is increased by 1. |
| T13 'no RTP media' | Value should be greater than max waiting time (T33*max size of queue) | Reception of an RTP media packet. T13 is reset and started again every time an RTP media packet is received. When the floor participant enters 'O: has no permission' (e.g. receiving Floor Granted message for other and Floor Taken message) | Reception of a Floor Release message and Floor Granted to me When the floor participant enters 'O: has permission' (e.g. receiving Floor Granted message) | When T13 expires the floor control client concludes that the there is no floor arbitrator at present. |
| T20 'Granted re-send' timer | — | When the floor arbitrator grants the permission to send media to a floor participant, which was queued. T20 is also started again when the floor control server sends a Floor | The reception of an RTP Media packet in 'O: pending granted' | If the counter is less than M, a new Floor Granted message is sent and counter is increased by 1. |

TABLE 3-continued

Floor participant timers

| Timer | Timer value | Cause of start | Normal stop | On expiry |
|---|---|---|---|---|
| T30 'during silence' | Value should be greater than T13. | Granted message upon T20 expiry. Reception of an RTP media packet. T30 is reset and started again every time an RTP media packet is received. When the floor participant leaves 'O: has permission' | Release of the call. When the floor participant enters 'O: has permission' | The floor control entity is released. |
| T33 'Pending user action' | Value should be greater than T20*M. | Reception/Transmission of floor granted message for queued request. | When a floor participant in 'O: queued' state pushes PTT button. Reception of RTP media in 'O: pending granted' | Assume the participant is out of coverage or doesn't push PTT button. Grant to next in queue if any, otherwise assume silence. |
| T41 'back-off' | — | Reception of more than 1 Floor Request messages during T40 | Reception of a Floor Granted message. | Send a Floor Granted message to the selected client. Reception of Floor Granted message to other |
| T40 'Request buffer' | — | Receipt of Floor Request message during silence | — | If the value of associated counter is greater than 1 enter 'O: contention' state. Otherwise, ignore. |

Further, counters in the floor control participant (off-network) will be described with reference to Table 4.

The table 4 enlists counters, their limits and the action on expiry.

TABLE 4

Floor participant counters:

| Counter | Limit | Associated timer | On expiry |
|---|---|---|---|
| C11 'Request re-send' | — | T11 | Assume there is no floor arbitrator and send Floor Taken message |
| C20 'Granted re-send' | — | T20 | Start T33 (Pending user action) timer to wait for response of client (i.e. RTP media packets) |
| C40 'Request buffer' | Not applicable | T40 | Not applicable |

While the invention has been shown and described with reference to certain exemplary embodiments thereof, it will be understood by those skilled in the art that various changes in form and details may be made therein without departing from the scope of the invention as defined by the appended claims and their equivalents.

What is claimed:

1. A method performed by a user equipment (UE), the method comprising:
    repeatedly receiving, from an other UE included in a group call in which the UE is included, a first message for requesting permission for transmission, in case that the UE does not transmit, to the other UE, a second message in response to the first message, wherein the first message is repeatedly transmitted from the other UE, each time a timer expires until a counter value of resets of the timer is reached;
    receiving, from the other UE, a third message indicating that the permission for transmission is granted to the other UE, wherein the third message is transmitted from the other UE after the timer expires and the counter value is reached;
    identifying that the permission for transmitting media data, is granted to the other UE based on the third message;
    entering a no-permission state; and
    receiving the media data from the other UE.

2. The method of claim 1, wherein the counter value indicates a maximum number of transmissions of the first message.

3. The method of claim 1, further comprising:
    transmitting, to the other UE, a fourth message indicating rejection of the permission for transmission in response to the first message in case that the UE has the permission for transmission.

4. The method of claim 3, further comprising:
    transmitting media data to the other UE after transmitting the fourth message.

5. A user equipment (UE) comprising:
    a transceiver; and
    a controller configured to:
        repeatedly receive, via the transceiver, from an other UE included in a group call in which the UE is included, a first message for requesting permission for transmission, in case that the UE does not transmit, via the transceiver, to the other UE, a second message in response to the first message, wherein the first message is repeatedly transmitted from the other UE, each time a timer expires until a counter value of resets of the timer is reached,
        receive, via the transceiver, from the other UE, a third message indicating that the permission for transmission is granted to the other UE, wherein the third message is transmitted from the other UE after the timer expires and the counter value is reached, identify that the permission for transmitting media data, is granted to the other UE based on the third message, enter a no-permission state, and receive, via the transceiver, the media data from the other UE.

6. The UE of claim 5, wherein the counter value indicates a maximum number of transmissions of the first message.

7. The UE of claim 5, wherein the controller is further configured to:

transmit, via the transceiver, to the other UE, a fourth message indicating rejection of the permission for transmission in response to the first message in case that the UE has the permission for transmission.

8. The UE of claim 7, wherein the controller is further configured to:

transmit, via the transceiver, media data to the other UE after transmitting the fourth message.

\* \* \* \* \*